US011813537B2

(12) United States Patent
Guinn et al.

(10) Patent No.: US 11,813,537 B2
(45) Date of Patent: *Nov. 14, 2023

(54) SMART TARGET CO-WITNESSING HIT ATTRIBUTION SYSTEM AND METHOD

(71) Applicant: Gel Blaster, LLC, Austin, TX (US)

(72) Inventors: Colin Guinn, Hutto, TX (US); Ben Godwin, Hutto, TX (US); Jay Ramirez, Hutto, TX (US); Eric Davis, Hutto, TX (US); Obediah Klopfenstein, Hutto, TX (US)

(73) Assignee: GEL BLASTER, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,911

(22) Filed: Jan. 11, 2023

(65) Prior Publication Data
US 2023/0211239 A1 Jul. 6, 2023

Related U.S. Application Data

(63) Continuation-in-part of application No. 17/862,001, filed on Jul. 11, 2022.
(Continued)

(51) Int. Cl.
*A63F 13/837* (2014.01)
*A63F 13/212* (2014.01)
(Continued)

(52) U.S. Cl.
CPC .......... *A63F 13/837* (2014.09); *A63F 13/212* (2014.09); *A63F 13/216* (2014.09);
(Continued)

(58) Field of Classification Search
None
See application file for complete search history.

(56) References Cited

U.S. PATENT DOCUMENTS 4,351,026 A * 9/1982 Phillips ...................... F41J 5/06
367/906
4,545,583 A * 10/1985 Pearman ............... F41G 3/2655
434/22
(Continued)

FOREIGN PATENT DOCUMENTS

WO 2013049901 A1 4/2013
WO 2018224847 A2 12/2018

OTHER PUBLICATIONS

International Search Report and Written Opinion issued in PCT/US22/36718.
Office Action issued in U.S. Appl. No. 18/095,383.

*Primary Examiner* — Jason A Pringle-Parker
(74) *Attorney, Agent, or Firm* — Brennan C. Swain, Esq.; Jeffer Mangels; Butler & Mitchell LLP

(57) ABSTRACT

A smart target co-witnessing hit attribution system includes a network, a projectile-firing device that includes a projectile repository and an infrared emitter, a smart target that includes a piezoelectric sensor, an infrared sensor, and control circuitry, and an extended-reality gaming application. After confirming a successful hit on the smart target, the application receives target state data and updates gaming metric data to attribute a successful impact on the smart target by the projectile-firing device.

32 Claims, 25 Drawing Sheets

Related U.S. Application Data

(60) Provisional application No. 63/409,582, filed on Sep. 23, 2022, provisional application No. 63/220,343, filed on Jul. 9, 2021.

(51) Int. Cl.
  *A63F 13/216* (2014.01)
  *A63F 13/65* (2014.01)
  *A63F 13/53* (2014.01)
  *A63F 13/46* (2014.01)

(52) U.S. Cl.
  CPC .............. *A63F 13/53* (2014.09); *A63F 13/65* (2014.09); *A63F 13/46* (2014.09); *A63F 2300/8082* (2013.01)

(56) References Cited

U.S. PATENT DOCUMENTS

| | | | | |
|---|---|---|---|---|
| 4,770,527 | A * | 9/1988 | Park | G01P 3/685 73/12.05 |
| 5,195,752 | A * | 3/1993 | Reeves | F41G 3/26 273/374 |
| 5,354,057 | A * | 10/1994 | Pruitt | G06F 3/011 463/47.1 |
| 5,566,951 | A * | 10/1996 | Dart | A63F 13/213 273/358 |
| 5,669,608 | A * | 9/1997 | Thomson | F41J 5/04 273/373 |
| 6,349,201 | B1 * | 2/2002 | Ford | H04B 1/385 455/66.1 |
| 6,807,959 | B1 * | 10/2004 | Murdock | A63B 69/409 124/61 |
| 7,796,155 | B1 | 9/2010 | Neely | |
| 8,105,087 | B2 * | 1/2012 | Valentini | F41J 5/056 434/11 |
| 8,303,421 | B1 * | 11/2012 | Farley | A63F 9/02 434/21 |
| 8,360,042 | B2 * | 1/2013 | Skilling | F41B 11/70 124/71 |
| 8,523,185 | B1 * | 9/2013 | Gilbreath | F41J 5/14 434/23 |
| 9,028,312 | B1 * | 5/2015 | Wei | A63F 13/28 463/2 |
| 9,355,583 | B2 | 5/2016 | Geisner | |
| 9,429,397 | B1 * | 8/2016 | Hill | F41J 5/06 |
| 9,573,064 | B2 | 2/2017 | Kinnebrew | |
| 9,759,530 | B2 * | 9/2017 | Miller | F41J 5/14 |
| 10,458,758 | B2 * | 10/2019 | Miller | F41J 5/056 |
| 10,712,133 | B2 * | 7/2020 | Kerley | F41J 5/14 |
| 10,866,071 | B2 * | 12/2020 | Huang | F41J 5/00 |
| 11,156,424 | B1 * | 10/2021 | Cai | F41A 33/02 |
| 2001/0056000 | A1 * | 12/2001 | Hori | A63B 47/002 473/453 |
| 2003/0060288 | A1 * | 3/2003 | Oakes | F42B 5/025 463/51 |
| 2006/0183546 | A1 * | 8/2006 | Addington | A63F 13/245 463/37 |
| 2007/0151551 | A1 * | 7/2007 | Verini | F41B 11/721 124/74 |
| 2007/0260407 | A1 * | 11/2007 | Van Albert | F41H 1/02 702/57 |
| 2008/0009245 | A1 * | 1/2008 | Valentini | F41J 5/14 455/73 |
| 2008/0274809 | A1 * | 11/2008 | Chang | A63F 13/812 463/33 |
| 2009/0102129 | A1 * | 4/2009 | Isoz | F41J 5/06 273/372 |
| 2010/0013860 | A1 * | 1/2010 | Mandella | G06F 3/04815 345/157 |
| 2010/0038854 | A1 * | 2/2010 | Mraz | F41J 5/041 273/371 |
| 2010/0083733 | A1 * | 4/2010 | Russell | F41H 1/02 2/455 |
| 2010/0093436 | A1 * | 4/2010 | Lander | F41G 3/2655 463/37 |
| 2012/0183930 | A1 * | 7/2012 | Dribben | G04F 10/00 434/19 |
| 2014/0343701 | A1 * | 11/2014 | Song | A63B 71/10 700/92 |
| 2014/0361976 | A1 * | 12/2014 | Osman | G02B 27/017 345/156 |
| 2015/0080071 | A1 * | 3/2015 | Eyal | A63F 13/213 463/2 |
| 2015/0260474 | A1 * | 9/2015 | Rublowsky | F41A 33/00 434/16 |
| 2015/0330749 | A1 * | 11/2015 | Miller | F41J 5/14 340/539.1 |
| 2016/0000374 | A1 * | 1/2016 | Dandekar | A61B 90/98 600/587 |
| 2016/0041391 | A1 * | 2/2016 | Van Curen | A63F 13/211 345/633 |
| 2016/0138895 | A1 * | 5/2016 | Beine | F41J 5/10 434/19 |
| 2016/0180532 | A1 * | 6/2016 | Katramados | G06T 7/73 382/103 |
| 2016/0292924 | A1 * | 10/2016 | Balachandreswaran | G06F 3/012 |
| 2016/0313097 | A1 * | 10/2016 | Miller | F41J 5/056 |
| 2016/0370156 | A1 * | 12/2016 | Elizondo | F41J 5/056 |
| 2017/0116874 | A1 * | 4/2017 | Holcomb | G09B 9/003 |
| 2017/0146493 | A1 * | 5/2017 | Passmore | A61B 5/489 |
| 2017/0148339 | A1 * | 5/2017 | Van Curen | G06T 19/006 |
| 2017/0191800 | A1 * | 7/2017 | Fischer | F41J 5/02 |
| 2017/0204241 | A1 * | 7/2017 | Nicolay | C08L 65/00 |
| 2018/0202777 | A1 * | 7/2018 | Green | G05B 19/042 |
| 2019/0041172 | A1 * | 2/2019 | Kerley | F41J 5/06 |
| 2019/0321718 | A1 | 10/2019 | Margareten | |
| 2019/0353457 | A1 * | 11/2019 | Northrup | G01S 5/16 |
| 2019/0374857 | A1 * | 12/2019 | Deller | G06T 13/40 |
| 2021/0072001 | A1 * | 3/2021 | Alexandre | F41J 7/00 |
| 2021/0102781 | A1 * | 4/2021 | Lee | F41G 3/2694 |
| 2021/0199408 | A1 * | 7/2021 | Reed | G06N 3/08 |

* cited by examiner

FIG. 18 — Message Protocol (458)

Target (400) — Dev Mode (462)

| Command | ID | Parameters | | | | | | | | | |
|---|---|---|---|---|---|---|---|---|---|---|---|
| Set Target Index | 0xA0 | Target Index | 0x00 | 0x00 | 0x00 | 0x00 | 0x00 | 0x00 | Target ID | 0x00 | 0x00 |
| Clear All Hit Count | 0xA1 | 0x00 | 0x00 | 0x00 | 0x00 | 0x00 | 0x00 | 0x00 | Target ID | 0x00 | 0x00 |
| Time Between Cycles | 0xA2 | Time Between Cycles | Time Between Cycles | 0x00 | 0x00 | 0x00 | 0x00 | 0x00 | Target ID | 0x00 | 0x00 |
| Cycles Between Hits | 0xA3 | Cycles between Hits | Cycles between Hits | 0x00 | 0x00 | 0x00 | 0x00 | 0x00 | Target ID | 0x00 | 0x00 |
| Start Slice Min Value | 0xA4 | Slice Min Value 1 | Slice Min Value 2 | 0x00 | 0x00 | 0x00 | 0x00 | 0x00 | Target ID | 0x00 | 0x00 |
| Minimum Read Value | 0xA5 | Min Read Value 1 | Min Read Value 2 | 0x00 | 0x00 | 0x00 | 0x00 | 0x00 | Target ID | 0x00 | 0x00 |
| Hit Read Value | 0xA6 | Hit Read Value 1 | Hit Read Value 2 | 0x00 | 0x00 | 0x00 | 0x00 | 0x00 | Target ID | 0x00 | 0x00 |

Target — Game Mode (480)

| Command | ID | Parameters | | | | | | | | | |
|---|---|---|---|---|---|---|---|---|---|---|---|
| Reset All Targets | 0xA0 | 0x00 | 0x00 | 0x00 | 0x00 | 0x00 | 0x00 | 0x00 | Target ID | 0x00 | 0x00 |
| Activate Target | 0xB0 | Target 0 State | Target 1 State | Target 2 State | Target 3 State | Target 4 State | Target 5 State | Target 6 State | Target ID | 0x00 | 0x00 |
| Color Test | 0xC0 | R (Hex Value) | G (Hex Value) | B (Hex Value) | 0x00 | 0x00 | 0x00 | 0x00 | Target ID | 0x00 | 0x00 |

App (492) — Dev Mode

| Command | ID | Parameters | | | | | | | | | |
|---|---|---|---|---|---|---|---|---|---|---|---|
| Sensor Hit Count | 0xA0 | Target Index | Hit Count 1 | Hit Count 2 | 0x00 | 0x00 | 0x00 | 0x00 | 0x00 | 0x00 | 0x00 |
| Dev App Settings | 0xA1 | Time Between Cycles | Time Between Cycles | Cycles between Hits | Cycles between Hits | Slice Min Value 1 | Slice Min Value 2 | Min Read Value 1 | Min Read Value 2 | Hit Read Value 1 | Hit Read Value |
| Dev Sensor Readings | 0xA2 | Dev Sensor Settings | Dev Sensor Settings | 0x00 | 0x00 | 0x00 | 0x00 | 0x00 | Target ID | 0x00 | 0x00 |

App — Game Mode (498)

| Command | ID | Parameters | | | | | | | | | |
|---|---|---|---|---|---|---|---|---|---|---|---|
| Hit Message | 0xAA | Target 1 Hit Count | Target 2 Hit Count | Target 3 Hit Count | Target 4 Hit Count | Target 5 Hit Count | Target 6 Hit Count | Target 7 Hit Count | Player ID | 0x00 | 0x00 |
| Miss Message | 0xBB | Target 1 Miss Count | Target 2 Miss Count | Target 3 Miss Count | Target 4 Miss Count | Target 5 Miss Co | Target 6 Miss Co | Target 7 Miss Co | Player ID | 0x00 | 0x00 |
| Active State | 0xCC | Target 1 State | Target 2 State | Target 3 State | Target 4 State | Target 5 State | Target 6 State | Target 7 State | Player ID | 0x00 | 0x00 |

Target States (256) Possible States

| ID | State | Color |
|---|---|---|
| 0x00 | Off | #000000 |
| 0x01 | Hit | #00FF00 (Green) |
| 0x02 | MIss | #FF0000 (Red) |
| 0x03 | BT not connected | #FFFF00 (Yellow) |
| 0x04 | BT connected | #00FFFF (Cyan) |
| 0x05 | Player 1 | #FF00FF (Magenta) |
| 0x06 | Player 2 | #0000FF (Blue) |
| -- | -- | -- |
| 0xFF | -- | -- |

FIG. 19

Message Protocol — 542

| Sent to Target 400 | Command 466 | ID 500 | Parameters 502 | | | | | | | |
|---|---|---|---|---|---|---|---|---|---|---|
| Game Mode — 462 | | | | | | | | | | |
| 488 — | Reset All Targets | 0xA0 | 0x00 | 0x00 | 0x00 | 0x00 | 0x00 | 0x00 | 0x00 | 0x00 |
| 544 — | Deactivate Target | 0xA1 | 0x00 | 0x00 | 0x00 | 0x00 | 0x00 | 0x00 | 0x00 | Target ID |
| 490 — | Activate Target | 0xB0 | Pad 0 State | Pad 1 State | Pad 2 State | Pad 3 State | Pad 4 State | Pad 5 State | Pad 6 State | Target ID |
| 546 — | Activate Pad | 0xB1 | Pad Index | | | | | | | Target ID |
| | Activate Hidden Pad | 0xB2 | Pad Index | | | | | | | Target ID |
| 548 — | Set All Color | 0xC0 | R (Hex Value) | G (Hex Value) | B (Hex Value) | 0x00 | 0x00 | 0x00 | 0x00 | Target ID |
| 550 — | Set Color State | 0xC1 | Pad 0 State | Pad 1 State | Pad 2 State | Pad 3 State | Pad 4 State | Pad 5 State | Pad 6 State | Target ID |
| 552 — | Set Device Name (not active) | 0xD0 | String (Hex Value) Array | | | | | | | |
| 554 — | Set Device Mode | 0xF0 | Device Mode Index | 0x00 | 0x00 | 0x00 | 0x00 | 0x00 | 0x00 | Target ID |
| 556 — | | | | | | | | | | |

| Sent to App 464 | Command 466 | ID 500 | Parameters 502 | | | | | | | |
|---|---|---|---|---|---|---|---|---|---|---|
| Game Mode | | | | | | | | | | |
| 494 — | Hit Message | 0xAA | Pad 1 Hit Count | Pad 2 Hit Count | Pad 3 Hit Count | Pad 4 Hit Count | Pad 5 Hit Count | Pad 6 Hit Count | Pad 7 Hit Count | Player ID |
| 496 — | Miss Message | 0xBB | Pad 1 Miss Count | Pad 2 Miss Count | Pad 3 Miss Count | Pad 4 Miss Count | Pad 5 Miss Count | Pad 6 Miss Count | Pad 7 Miss Count | Player ID |
| 498 — | Active State | 0xCC | Pad 1 State | Pad 2 State | Pad 3 State | Pad 4 State | Pad 5 State | Pad 6 State | Pad 7 State | Player ID |
| 558 — | Display State | 0xCD | Pad 1 State | Pad 2 State | Pad 3 State | Pad 4 State | Pad 5 State | Pad 6 State | Pad 7 State | Player ID |

FIG. 20

Target States (256) Possible States — 510

| ID | State | Color |
|---|---|---|
| 0x00 | Off | #000000 |
| 0x01 | Hit | #00FF00 (Green) |
| 0x02 | Miss | #FF0000 (Red) |
| 0x03 | BT not connected | #FFFF00 (Yellow) |
| 0x04 | BT connected | #00FFFF (Cyan) |
| 0x05 | Player 1 | #FF00FF (Magenta) |
| 0x06 | Player 2 | #0000FF (Blue) |
| 0x07 | (Activate) | #FF4000 (Orange) |
| 0x08 | (Activate) | #C9FF00 (Light Green) |
| 0x09 | (Activate) | #00FF2A (Teal) |
| 0x0a | | |
| 0x0b | | |
| ⋮ | ⋮ | ⋮ |
| 0xFF | | |

FIG. 21A

Target Modes (256) Possible States — 560

| ID | State |
|---|---|
| 0x00 | Rainbow Animation |
| 0x01 | Flipper Game |
| 0x02 | Eliminator Game |
| 0x03 | IR Dev Game |
| 0x04 | |
| 0x05 | |
| 0x06 | |
| ⋮ | ⋮ |
| 0xFF | |

FIG. 21B

SMART TARGET CO-WITNESSING HIT ATTRIBUTION SYSTEM AND METHOD

CROSS-REFERENCE TO RELATED APPLICATIONS

This application is a continuation-in-part of U.S. patent application Ser. No. 17/862,001 filed Jul. 11, 2022, which claims the benefit of U.S. Provisional Patent Application No. 63/220,343, filed on Jul. 9, 2021. This application also claims the benefit of U.S. Provisional Patent Application No. 63/409,582, filed on Sep. 23, 2022, the entirety of which is incorporated by reference herein.

FIELD OF THE INVENTION

The present invention relates generally to projectile-firing gaming systems and more particularly to a smart target co-witnessing hit attribution system and method.

BACKGROUND OF THE INVENTION

Indoor or outdoor shooting, blaster or skirmish sports, such as paintball, laser tag, air soft and the like are popular games and hobbies that allow people to run, exercise and have fun. Other shooting exercises, such as hunting, military and police training also involve physical activity. One example of a popular shooting device and game is Gel Blaster. Many people also enjoy video games and, in particular, video games that include guns or shooting (e.g., first-person shooter video games). Unlike video games, however, it is difficult to accurately keep track of hits and how to appropriate attribute a particular hit with a particular shooting device or user. There therefore exists a need to accurately determine when a target or user is hit during a gameplay scenario, particularly when utilizing projectiles. U.S. Pat. Nos. 7,796,155, 9,355,583 and 9,573,064 are incorporated by reference herein in their entireties.

The background description disclosed anywhere in this patent application includes information that may be useful in understanding the present invention. It is not an admission that any of the information provided herein is prior art or relevant to the presently claimed invention, or that any publication specifically or implicitly referenced is prior art.

SUMMARY OF THE PREFERRED EMBODIMENTS

The present invention includes "video gamifying" a real life paintball/gel blaster/combat experience using augmented reality. The present invention in a preferred embodiment includes a system of wirelessly interconnected blasters, targets, wearables, and "battlefield" objects that allow players to engage in precisely tracked and managed projectile sports and games, resulting in an experience of "Video Games Outside". This system contrasts with projectile-only sports such as airsoft and paintball, which provide tactile feedback but lack automatic score tracking and other digital features. It also contrasts with laser tag or non-projectile-firing sports, which may provide real-time access and control over scoring, game modes, weapon features, etc., but lack tactile feedback, and has to make use of non-intuitive and mostly invisible light physics. In contrast, the present invention includes a system utilizing visible projectile physics and methodology to keep track of score and other gameplay features.

In a preferred embodiment, the present invention includes digitizing an outdoor/indoor blaster gameplay experience thereby providing a mixed reality video game experience through the use of augmented reality (AR), virtual reality (VR), and/or extended-reality (XR) eyewear (goggles, glasses, helmet, etc.) while also including blasters that shoot or fire actual projectiles. It will be appreciated that the projectiles cause the human target a sufficient amount of sensation such that it makes the experience engaging. It will be appreciated that the use of the blaster shown in the accompanying drawings is only exemplary and not limiting. Any type of blaster, gun, etc., that shoots projectiles (e.g., projectile-firing device) is within the scope of the present invention.

The AR/VR/XR eyewear and/or other wearable items, such as vests, pants, belts, shoes, uniforms, jerseys, suits, and the like and the connected system (including all software, programming, architecture, sensors, wireless connectivity, networking, tracking codes, trackers, etc.) allows the participants to integrate video game type elements and graphics (e.g., having a life bar, different types of ammunition, levels, etc.) within a blaster game, experience or training.

In a preferred embodiment, the present invention includes a vest/jersey or other wearable that can sense or determine when a player is hit or struck by a projectile (in an embodiment, at least within certain areas on the outer surface of the wearable). For example, the wearable and connected system can sense or log a hit from the front or the back. In a preferred embodiment, the wearable can log or determine the strength, level or intensity of the impact of the projectile. Alternatively, the application, or a combination of the wearable and the application, can log or determine the strength, level or intensity of the impact of the projectile. Therefore, when a player (or the wearable) is struck from a closer range the player loses a greater amount of health points than from a further range.

In a preferred embodiment, the system can determine which other participant or player shot the player that is hit. This may be done using a location and direction solution in each blaster, e.g., ultra-wide band (UWB) sensors, magnetometer, GPS, WiFi, etc., combined with knowing who is shooting at any given time (so the system can know or determine the approximate time delay between a player firing and when the wearable is hit). The wearable may include buttons or other switches that when pushed or switched cause actions to be taken within the game whether in the AR/VR/XR/virtual environment or in the physical world. For example, pushing a button or touching a predetermined location on the wearable or on a strap or other worn item may cause the player's health points or level to increase after they were previously earned. Any gaming event can be associated with the switch, button or the like.

In a preferred embodiment, a software application ("app" or "application") is configured to be usable by all players or participants. The app can provide many different features, including app/game-controlled rate of fire on the blaster. The rate of fire feature (and any other game or invention related feature described herein) can be changeable or upgradeable based on gameplay and other predetermined features. For example, if the player visits a predetermined location and finds a upgraded weapon gun or the like or plays the game for a predetermined length of time, the player may earn a higher rate of fire. If a player has a better or higher level weapon in the game, the player has the ability to cause more damage faster to other players wearing the system connected wearables. The system may include a system-on-chip (SOC)

or system-on-module in or on a module connectable to the blaster that connects to the app wirelessly (e.g., via Bluetooth).

The app and system can then control the rate of fire of the blaster. This feature allows for a single blaster to represent many different potential digital weapons in the "game." For example, a starter weapon might only allow for one shot per second in semi-auto mode and require a four second reload time after ten shots, while the top-end weapon in the game allows for ten shots per second in fully automatic mode and does not impose any "digital reload/time requirements." As a result, a player would only need to physically reload the blaster every time the physical round hopper is emptied. This will also allow for when a player gets eliminated, their blaster does not fire anymore until a new game starts, they go re-spawn at their base, find an extra life somewhere within the battlefield, or otherwise, or other digital gameplay that is utilized during that game or round. It will be appreciated that there can be multiple scenarios where a player may not be able to use their blaster. For example, in a preferred embodiment of the invention, the system may allow the ability to download different environments (e.g., AR/VR/XR environments) that can be used during gameplay. For example, the environments can include jungles, old west, ships, snow, cities, historic, world monuments or movie, comic book and other related themes (e.g., Star Wars, Marvel, Harry Potter, etc.). These environments may provide reasons or the ability to turn off blasting or provide other features within the system gameplay. For example, in a Harry Potter-related environment, there may be a spell or the like that can be "cast" and prevents all the other teams blasters or weapons from working. In a Star Wars environment, the blaster or other handheld item or weapon may become a lightsaber.

Any type of AR/VR/XR system or eyewear is within the scope of the present invention. For example, the system may connect or combine with Apple's (or others') AR glasses. The use of AR/VR/XR eyewear and the connection to the system, app, etc. may provide for abilities or features for players or participants. For example, the eyewear may provide the ability to see where your teammates are through walls, around buildings, etc. The eyewear may provide the ability to see the health being lost by another participant as you shoot them, and/or see your own health stats at all times or as you are hit. Motion tracking or sensing components, sensors or reflectors on the blaster or other items allow the game to replace the look of the physical blaster or other item in the players hand. In other words, if a player has a pistol in the game, the player (and other players) will see a pistol in the AR/VR/XR eyewear and when the player upgrades to, for example, a bazooka, the gun will graphically change on the screen (e.g., similar to a first person shooter game). For example, the virtual gun shown in AR/VR/XR on the eyewear can change from a pistol to a machine gun when the player upgrades to that gun. The eyewear preferably provides the ability to see and go get supply drops (e.g., weapons, health kit, shield, potions, etc.) in the physical world (e.g., around the yard, playing area, arena, etc.). Accelerometers, gyroscopes or other motion sensing devices can be included on or within the blaster or other physical item to track movement that can be digitized and displayed on the AR/VR/XR eyewear or on the app.

In a preferred embodiment, the battlefield environment provides inflatable or other barricades that are associated with the game (and may be wirelessly connected within the game or gaming session) look like other objects in the game that a player is hiding behind. For example, an inflatable wall may look like a rock wall in AR/VR/XR. QR codes can be used on the barricades and any other object within the game for tracking purposes. The eyewear preferably shows different "skin" or outfit in the game based on your team, your personal preferences, what skins you own or have earned, etc. The wearables may include QR codes or other motion trackers for improved tracking performance.

In a preferred embodiment, the AR/VR/XR eyewear provides the ability to find virtual shields, first aid kits, better weapons, ammo, treasures, extra lives, etc. at predetermined locations (e.g., laying on the ground, on a barricade or other object). For example, the player sees an object, such as an ammunition magazine in the eyewear at a distance and has to move to the predetermined location to obtain the magazine. Once the system determines the player is at the proper location (e.g., via UWB, magnetometer, GPS, WiFi, etc.), the player obtains the extra ammunition for use in the game. The system preferably provides the ability to create or have a shield around the player so that another player cannot shoot them (the other player's gun may not be able to fire). This can be done via location services and magnetometer data to know someone is pointing at a shielded area and then prevent their blaster from firing.

In an embodiment, a mobile device, such as an iPhone, can be mounted on the side or other location on the physical blaster to allow certain of the system features discussed herein. This can be a version of the system that does not include AR/VR/XR eyewear. Many features described herein can be done without the eyewear. For example, the system connection between the app (via a mobile device on and/or connected to the blaster) can provide the system with features such as app controlled firing, earning of experience and health points, other health kit data, sensing or determination of proximity when firing (i.e., how hard the player is hit by the projectiles), etc. Any or all of the features described herein can be used together to provide a software application experience without the use of AR/VR/XR eyewear.

The system may include an accompanying PC/Mobile/Console game. For example, the applicant may partner with a game like Fortnite or one or more video games can be created or developed that accompany or can be used with the system. Any of the items described herein can be sold or provided as a kit or unit. For example, a gameplay kit can include a number of blasters, inflatable bases and/or barricades, grenades, ammunition, magazines, AR/VR/XR eyewear, downloadable app and/or game that are all sold as a unit. Modules that include components that allow connectivity to or within the system can also be sold or provided. The modules can connect or otherwise attach to items such as blasters. This allows the blaster to be used without being connected to the system (without the module) or within the system. For example, a module can be added to a blaster and a mobile device with software (e.g., a phone with an app) can be secured to the module such that the blaster can be used within the system. In another embodiment, the blaster can include the software and/or app and the necessary connectivity, etc. built therein.

Players may earn experience points (XP) in the system and game by playing outside and entering physical world tournaments. For example, the XP can be earned based on length of playing time or based on points earned on better or worse game play.

An embodiment can include remotely controlled blasters that are included at each teams' base that can be controlled by someone in a different location via the game/system/app (camera and computer controlled firing versus the opposing team).

An embodiment can include players remotely piloting drones that shoot projectiles (e.g., Gel Blaster cannons) or other shooting device and that can attack the other team remotely utilizing a computer or mobile device.

In a preferred embodiment, the system can include features, components or elements for collecting and/or monitoring health data. For example, the system can connect or otherwise be associated with Apple HealthKit, Google Health or other systems to track calories burned while playing, monitor heart rate or determine other health data. In a preferred embodiment, the calories burned and other health data can be used for gamification. For example, the system can include daily, weekly and/or monthly contests for longest/highest game play and calories burned to earn XP. The digitization of the game play experience allows for community tournaments, neighborhood tournaments, teams, monthly contests, leaderboards, etc. In a preferred embodiment, the system includes the ability to broadcast any of the gameplay via cameras mounted on the players or their equipment (e.g., the eyewear) or by connecting to the feed that is broadcast on any or all of the player's AR/VR/XR eyewear or the app. This allows games to be broadcast or streamed on television, computers, Twitch, Youtube, etc., thereby allowing for a sport, television show, channel, etc. to be based around gameplay, tournaments, etc.

The system can also include remotely operated explosives (e.g., a C4 looking Gel Ball bomb) and inflatable smart forts for each team. The forts or other location/structure may include the ability for the other team to "defeat" or finish the fort. For example, the fort can include sensors or the like so that when the other team shoots a predetermined location or area on the fort (e.g., a "death star hole") enough times it will cause the inflatable fort/base to deflate.

The system may include built in speed loading of gellets or other projectiles. The system can include the ability to digitally dispense or load ammunition. A smart ammo dispenser may be based on predetermined parameters within the gameplay. For example, a game may be set where players can only refill a certain number of times during the length of the game and after they have reached the limit the system prevents the player from reloading (e.g., locking the canister, stopping the blaster from working, etc.). The right to refill may be earned and the blaster may begin working again.

In a preferred embodiment, the module or other digitally related components of the present invention may be connectable to the power of the blaster. For example, the blaster may include leads or a jack that provides power to the external item (such as a module). This allows a module or other system related component to be retrofitted on a blaster or other similar device that includes a power source. This can provide power so that the direction sensing capability, localization, magnetometer, wideband, IR reader and/or reflector and other components can be powered. The wearable can also include infrared (IR) reflectivity that works or is operatively connected to an IR reader on gun so that the system can sense what player is shooting another player and to provide other capabilities. The system can also provide connection so that other powered accessories (e.g., projectile velocity changer) on the blaster or the barrel thereof can be operated. For example, if a player earns a higher rate of fire or a higher velocity during gameplay, the system can provide instructions (via connectivity) to move or change something mechanically or physically on the gun (e.g., slide a sleeve) to provide the higher velocity projectile firing.

The system may include projectile firing devices, such as sniper rifles, that only work in certain areas or predetermined locations in the field of play. For example, the player may earn a "large sniper rifle" within the game, but the rifle can only be used from a designated location (e.g., a certain hill). In use, based on the system sensing the location of the player the rifle cannot be fired unless the player is in a predetermined location (e.g., on the hill).

It will be appreciated by those of ordinary skill in the art that the present invention allows or provides for the incorporation of elements of arena survival video games into a mixed-reality AR/VR/XR environment. In a preferred embodiment, the system includes guns/blasters that include the capability of connecting to a mobile device that includes an app thereon. In a preferred embodiment, the system includes the ability for players or users to "level up" based on outside playing time, etc. Leveling up can include actions such as the ability to obtain better equipment (e.g., guns, ammunition, etc.), and other aspects desired by the player. This can also utilize or connect to exercise related apps or devices (e.g., Apple Watch, Fitbit, etc.). In a preferred embodiment, the system includes wearables that have sensors or the like thereon that can determine when it is struck. This may include capacitive indicator(s) on the wearable and communication/connectivity to a processor that provides feedback on AR eyewear/glasses or the equivalent. The vest or other armor can also provide sensing of the proximity of a shooter based on impact of the projectile.

In a preferred embodiment, the blaster includes one or more holes or openings that are auto-adjusted to modify feet-per-second of gel and communication/connectivity to AR interface for different types and levels of blasters. In a preferred embodiment, the system includes Bluetooth or other wireless connectivity between elements of the system that are not physically connected (i.e., vest, glasses, blaster, etc.). Any of the elements or components of the system described herein can be wirelessly connected (or wired). Any of the physical items, e.g., barricades, magazines, forts, bases, wearables, blasters, eyewear and the like can include connectivity to the system.

In a preferred embodiment, the system includes location or other proximity based features (e.g., so a player can see the location of teammates, for providing higher assessed damage based on how close the shooter is to the target, the type of blaster). In a preferred embodiment, the system includes a heads-up-display in AR glasses with mixed reality to accommodate data from vest/blaster and other connected components while engaging with the real, physical environment simultaneously. It will be appreciated that the system can also be utilized for applications in law enforcement, military, training, hunting and other shooting or physical scenarios.

The present invention generally includes a smart target co-witnessing hit attribution system and method. In a preferred embodiment, the present invention includes providing accurate counting of projectile hits on a smart target integrated with an application to keep track of successful hits in order to provide a more rich, immersive, and accurate gaming or shooting experience.

In an embodiment, the smart target system is a stationary, modular device that uses piezoelectric sensors to detect and positively identify impact strikes from gellets (or other projectiles) while filtering out other types of impacts. The smart target includes wireless networking technology to communicate over a mesh network using a particular communications protocol to effectively keep "real-time" or near-real time track of successful hits on the smart target.

In an embodiment, the smart target is a gameplay element in a projectile-firing gaming system that may be affixed, embedded, or modular with wearables, shields, drones, turrets, or other physical objects. Anything that is a physical object within a gameplay environment that a projectile is intended to impact may include a smart target. The smart target preferably includes a piezoelectric (PE) sensor configured to determine an impact of a particular projectile upon (or near) the smart target. One of ordinary skill in the art would understand that a PE sensor is an electromechanical device that uses the piezoelectric effect to measure changes in pressure, strain, force (or other physiological effects) by converting them to an electrical charge. In smart target parlance, the PE sensor is utilized for hit detection.

In accordance with another aspect of the present invention there is provided a smart target that includes a housing for receiving at least two sensors configured to co-witness an impact of an object at or near a predetermined distance from a predetermined location, a first sensor of the at least two sensors configured to detect an impact of an object at or near a predetermined distance from a predetermined location and generate a first sensor signal corresponding to the detected impact, a second sensor of the at least two sensors configured to receive information relating to the detected impact and generate a second sensor signal corresponding to the detected impact, and control circuitry configured to receive the first sensor signal and the second sensor signal, confirm whether the first sensor and the second sensor signals have co-witnessed the same impact of the object by determining whether they were received within a predetermined period of time, and provide a target state update via a network in accordance with at least one protocol.

The control circuitry may be configured to confirm, from the first sensor signal, whether the object includes a projectile based on a trained model configured to recognize impacts of projectiles, and generate projectile impact data when the object is confirmed to be a projectile, wherein the target state update includes the projectile impact data.

The second sensor signal may include one of an infrared signal from an infrared sensor, a brain-computer interface signal from an electroencephalogram sensor, a computer-vision signal from a computer-vision system, a radio-frequency signal from a radio frequency sensor, or a fabric-deformation signal from a smart textile sensor.

In accordance with another aspect of the present invention there is provided a smart target that includes a first target location, a first piezoelectric sensor configured to detect an impact of an object on or within a predetermined distance from the first target location and generate a first piezoelectric sensor signal corresponding to the detected impact, a first infrared sensor configured to detect infrared radiation at a predetermined wavelength and generate a first infrared sensor signal, control circuitry configured to confirm a successful projectile impact on the first target location when the object is determined to be a projectile by comparing the first piezoelectric sensor signal with a piezoelectric impact signal model trained to detect impact of the projectile and when an impact time of the object and a detection time of the infrared radiation each occurred within a first predetermined period of time, generate first target location state data indicating that the first target location was successfully impacted by the projectile, and transmit the first target location state data via a network in accordance with at least one protocol.

The first piezoelectric sensor signal may be filtered before it is compared with the piezoelectric impact signal model.

The first infrared sensor signal may include an angle of detection and an intensity of infrared radiation.

The first piezoelectric sensor may be further configured to detect the impact of the object on or within a predetermined distance from a second target location.

The smart target may further include a second target location, a second piezoelectric sensor configured to detect an impact of an object on or within a predetermined distance from the second target location and generate a second piezoelectric sensor signal corresponding to the detected impact, and a second infrared sensor configured to detect infrared radiation at a predetermined wavelength and generate a second infrared sensor signal.

The control circuitry may be further configured to confirm a successful projectile impact on the second target location when the object is determined to be a projectile by comparing the second piezoelectric sensor signal with the piezoelectric impact signal model trained to detect impact of the projectile and when an impact time of the object and a detection time of the infrared radiation each occurred within the first predetermined period of time, generate second target location state data indicating that the second target location was successfully impacted by the projectile, and transmit the second target location state data via a network in accordance with at least one protocol.

The smart target may include a frame configured to receive the first target location. The first target location may be located on a wearable device.

The first target location state data may be configured to be received by an extended-reality gaming application configured to control the projectile-firing device and the wearable device in accordance with a gaming session having a gameplay configuration for providing an extended-reality environment, receive projectile-firing device data from the projectile-firing device, the projectile-firing device data comprising an orientation and location of the projectile-firing device and a time at which the projectile-firing device was fired, update gaming metric data to indicate a successful impact of the fired projectile on the first target location and attribute a successful hit to the projectile-firing device on the first target location when the time the impact occurred on the first target location and the time the projectile-firing device was fired occur within a second predetermined period of time.

The gaming metric data may be updated to indicate the successful impact of the fired projectile on the first target location and the successful hit is attributed to the projectile-firing device on the first target location when the location of the projectile-firing device is within a predetermined range from the first target location and the orientation of the projectile-firing device is aligned at a predetermined area associated with the first target location. The updated gaming metric data may be configured to be displayed to a user.

In accordance with another aspect of the present invention there is provided a smart target co-witnessing hit attribution system that includes a network configured to provide communication and control connectivity in accordance with at least one protocol, a projectile-firing device comprising a projectile repository configured to carry projectiles for firing and an infrared emitter configured to emit infrared radiation at a predetermined wavelength and beamwidth, a smart target that includes a piezoelectric sensor configured to detect an impact of an object at or near a predetermined distance from a predetermined location relative to the smart target and generate a piezoelectric sensor signal corresponding to the detected impact, an infrared sensor configured to detect infrared radiation at a predetermined wavelength and generate an infrared sensor signal, control circuitry configured to confirm a successful projectile impact on the smart target when the object is determined to be a projectile by comparing the piezoelectric signal with a predetermined piezoelectric impact signal model trained to detect impact of the projectile and the impact of the object and the detection of the infrared radiation occurred within a first predetermined period of time, generate target state data comprising the successful projectile impact, and provide the target state data via the network, an extended-reality gaming application configured to control the projectile-firing device and the wearable device in accordance with a gaming session having a gameplay configuration for providing an extended-reality environment, receive projectile-firing device data from the projectile-firing device, the projectile-firing device data comprising an orientation and location of the projectile-firing device and a time at which the projectile-firing device was fired, receive the target state data from the smart target, the target state data comprising a time the smart target was impacted by the projectile, update gaming metric data to indicate a successful impact of the fired projectile on the smart target and attribute a successful hit to the projectile-firing device on the smart target when the time the impact occurred on the smart target and the time the projectile-firing device was fired occur within a second predetermined period of time.

The gaming metric data may be updated to indicate the successful impact of the fired projectile on the smart target and the successful hit is attributed to the projectile-firing device on the smart target when the location of the projectile-firing device is within a predetermined range from the smart target and the orientation of the projectile-firing device is aligned at a predetermined area associated with the smart target.

The network may be a target mesh network configured to transmit messages including the target state data to the extended-reality gaming application. The at least one protocol may be configured to effectuate transmission and reception of data to nodes within the network using hexadecimal values. The hexadecimal values may specify data concerning a status of the target. The hexadecimal values specify data concerning a status of a user.

In accordance with another aspect of the present invention there is provided a smart target co-witnessing hit attribution method. A first sensor signal is received corresponding to detection of an impact of an object at or near a predetermined distance from a predetermined location relative to a first smart target location, a second sensor signal relating to the detected impact is received; the first sensor signal and the second sensor signal are determine to be received within a first predetermined period of time, and a target state update is provided via a network in accordance with at least one protocol.

From the first sensor signal, it is determined that the object comprises a projectile based on a trained model configured to recognize impacts of projectiles, and projectile impact data is generated, wherein the target state update includes the projectile impact data.

The method may further include wherein the target state update is received, projectile-firing device data from a projectile-firing device is received, the projectile-firing device data comprising an orientation and location of the projectile-firing device and a time at which the projectile-firing device was fired, and gaming metric data is updated to indicate a successful impact of the fired projectile on the first smart target location and attribute a successful hit to the projectile-firing device on the first smart target location when the time the impact occurred on or near the first smart target location and the time the projectile-firing device was fired occur within a second predetermined period of time.

The gaming metric data may be updated to indicate the successful impact of the fired projectile on the first smart target location and the successful hit is attributed to the projectile-firing device on the first smart target location when the location of the projectile-firing device is within a predetermined range from the smart target and the orientation of the projectile-firing device is aligned at a predetermined area associated with the first smart target location.

BRIEF DESCRIPTION OF THE DRAWINGS

The invention may be more readily understood by referring to the accompanying drawings in which:

FIG. 13-1 depicts a first portion of a schematic diagram of a circuit for a smart target co-witnessing hit attribution system in accordance with a preferred embodiment of the present invention;

FIG. 13-2 depicts a second portion of a schematic diagram of a circuit for a smart target co-witnessing hit attribution system in accordance with a preferred embodiment of the present invention;

FIG. 13-3 depicts a second portion of a schematic diagram of a circuit for a smart target co-witnessing hit attribution system in accordance with a preferred embodiment of the present invention;

FIG. 18 is a table of a message protocol in accordance with a preferred embodiment of the present invention;

FIG. 19 is a table of smart target states in accordance with a preferred embodiment of the present invention;

FIG. 20 is a table of a message protocol in accordance with a preferred embodiment of the present invention;

FIG. 21A is a table of smart target states in accordance with a preferred embodiment of the present invention;

FIG. 21B is a table of smart target modes in accordance with a preferred embodiment of the present invention;

Like numerals refer to like parts throughout the several views of the drawings.

DETAILED DESCRIPTION OF THE PREFERRED EMBODIMENTS

Figure 1:
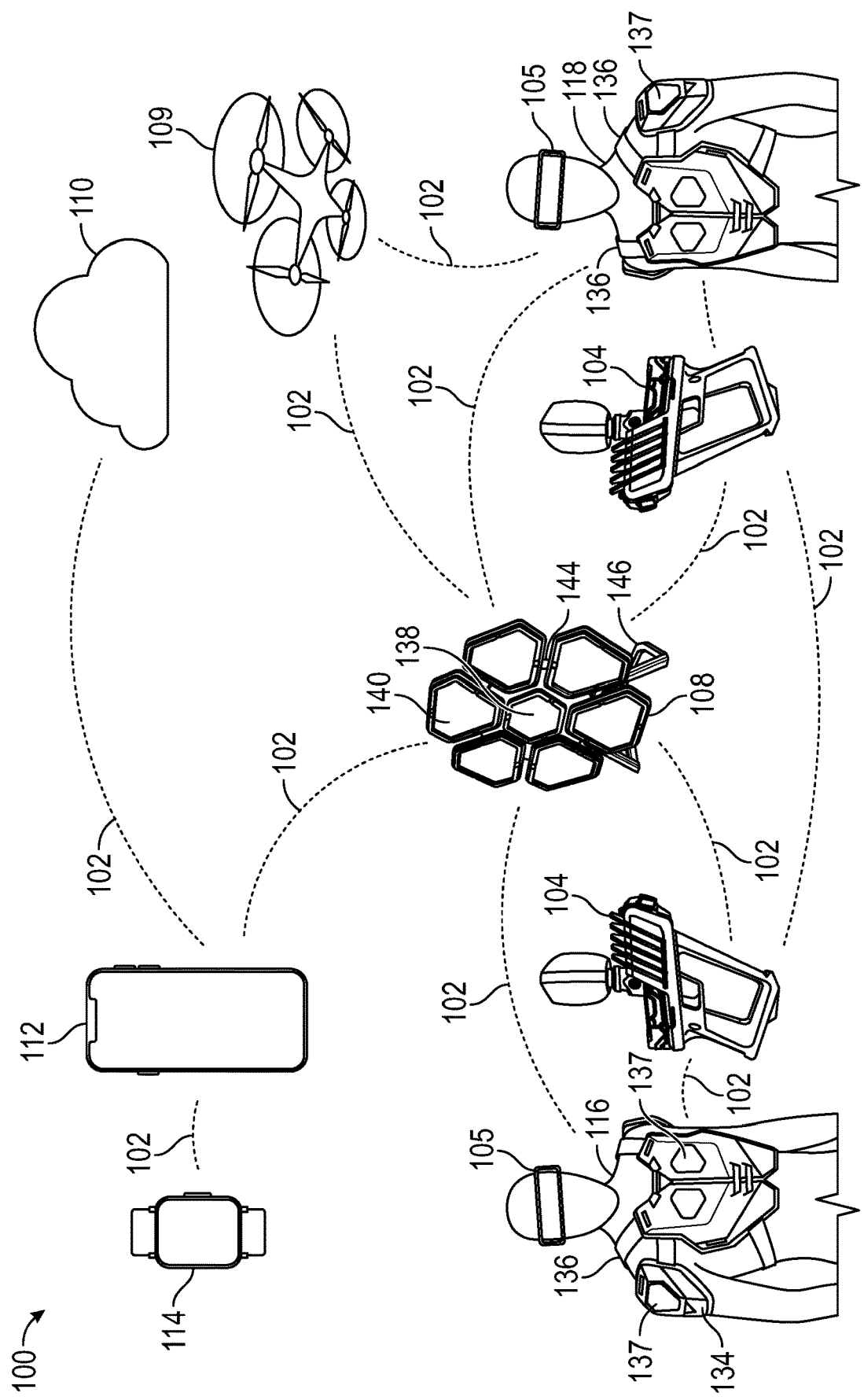
FIG. 1 is a diagram of an extended-reality projectile-firing gaming system in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional. Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 7:
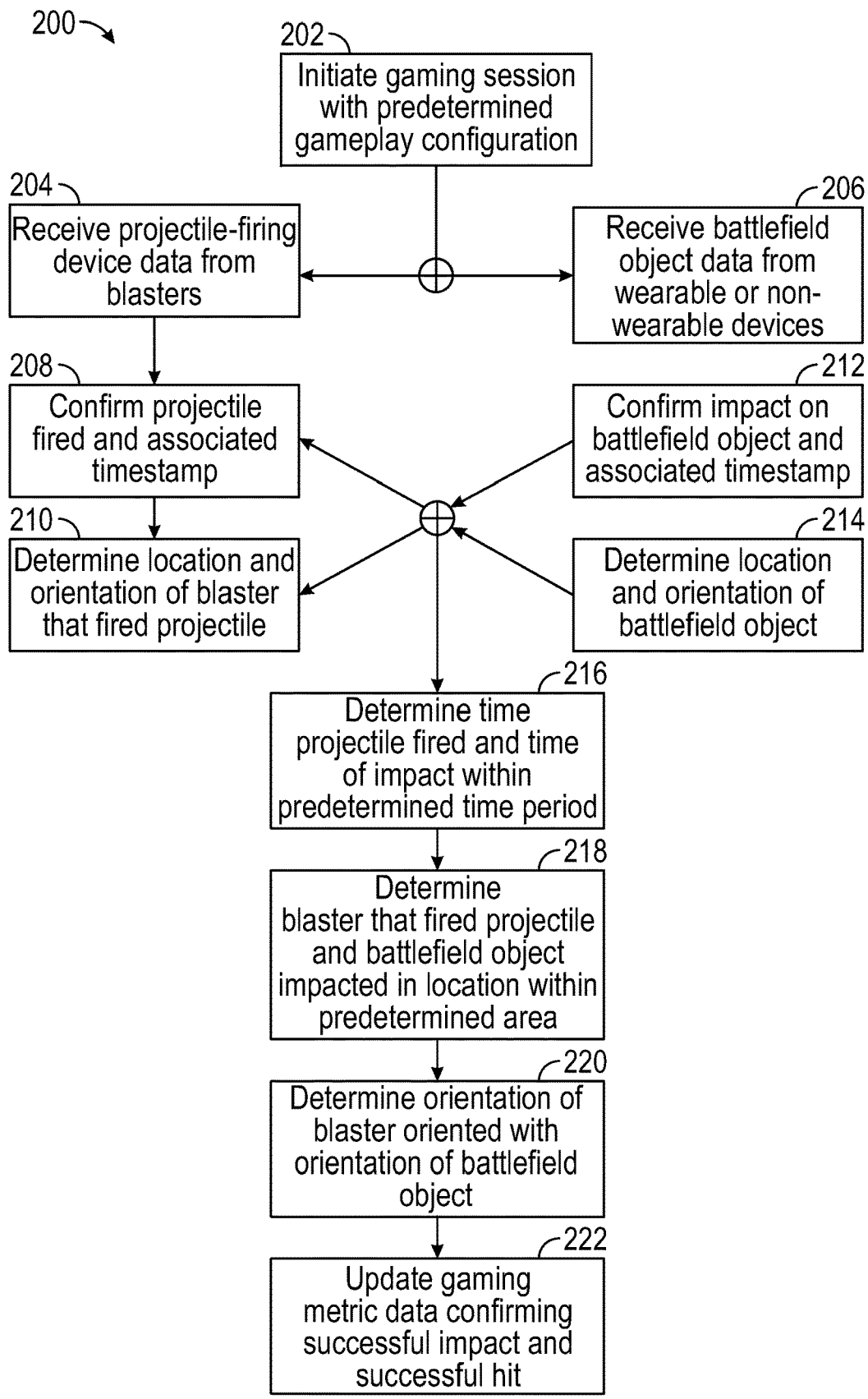
FIG. 7 is a flow diagram of an extended-reality projectile-firing gaming method in accordance with a preferred embodiment of the present invention.
Figure 8:
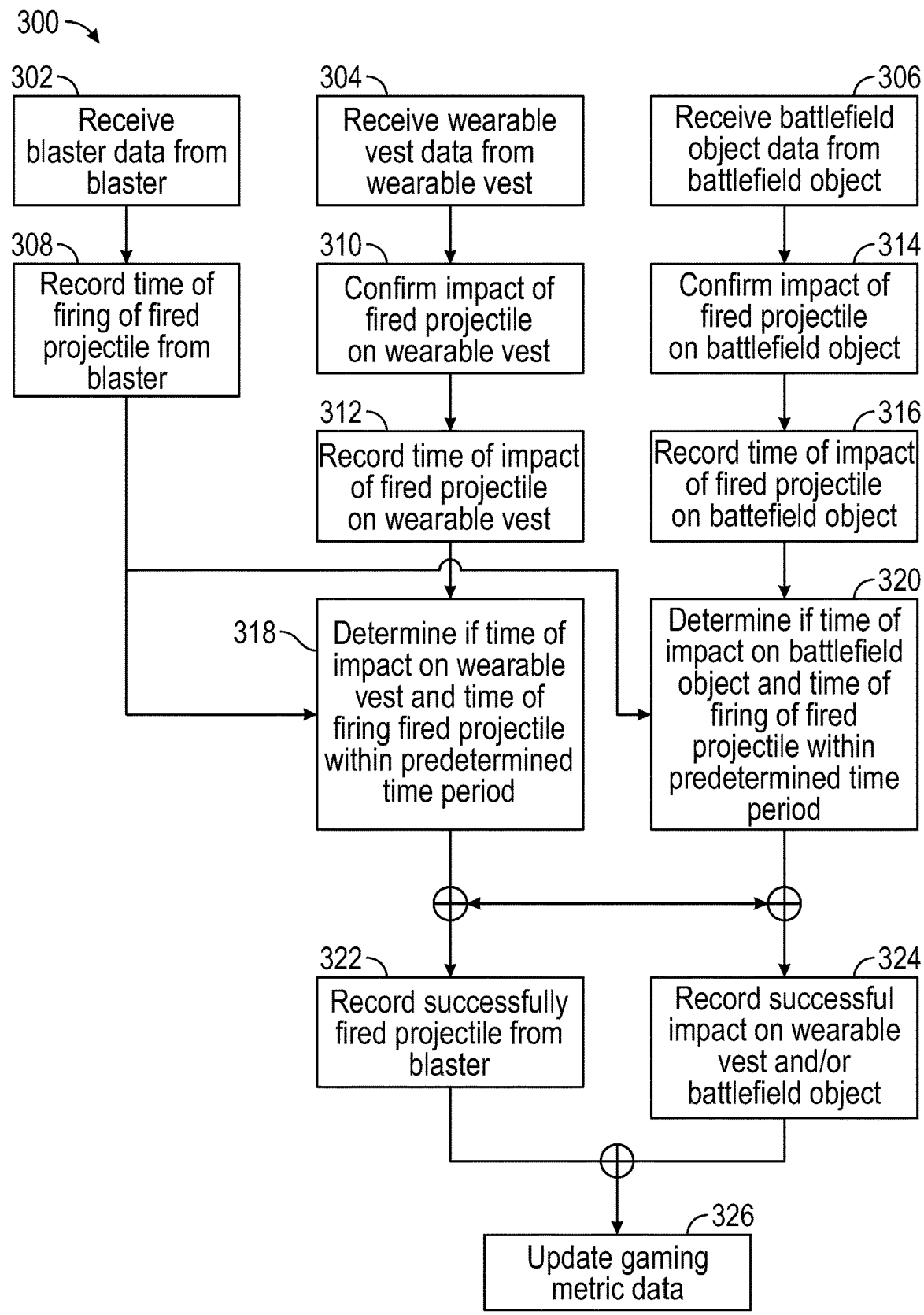
FIG. 8 is a flow diagram of an extended-reality projectile-firing gaming method in accordance with a preferred embodiment of the present invention.

Referring now to the drawings, which are for purposes of illustrating the present invention and not for purposes of limiting the same, the drawings show devices and components (and related methods) therein in accordance with preferred embodiments of an extended-reality projectile-firing gaming system and method. As shown in FIGS. 1-6, the extended-reality projectile-firing gaming system generally includes a system of wirelessly interconnected blasters, targets, wearables, and "battlefield" objects that allow players to engage in precisely tracked and managed projectile sports and games, resulting in an experience of "Video Games Outside". As shown in FIGS. 7-8 extended-reality projectile-firing gaming methods are shown, further illustrating preferred methods for attributing scoring to particular players or users of the extended-reality projectile-firing gaming system. As shown in FIGS. 9-24, a smart target co-witnessing hit attribution system and method are shown, illustrating particular embodiments of accurately determining "hits" and correctly attributing those hits to a particular projectile-firing device.

Referring now to FIG. 1, FIG. 1 is a diagram of an extended-reality projectile-firing gaming system 100 in accordance with a preferred embodiment of the present invention. FIG. 1 depicts two users utilizing a network 102 in connection with the system 100. The system 100 includes a projectile-firing device 104, an extended-reality device 105, a wearable device 106, a standalone target 108, a drone 109, a cloud-based computing system 110, a remote device 112, and a fitness monitoring device 114. The network protocol may include Bluetooth, WiFi, radio frequency (RF), or other suitable network protocol.

The network 102 is configured to utilize one or more network protocols to facilitate communication by and between the various components of the system 100. For example, as disclosed herein, the network 102 may consist of any network type, including but not limited to a local area network (LAN), wide area network (WAN), and/or the internet. One of ordinary skill in the art would understand that a variety of networks and/or network protocols may be implemented to provide connectivity between the various components of the system 100.

Figure 2:
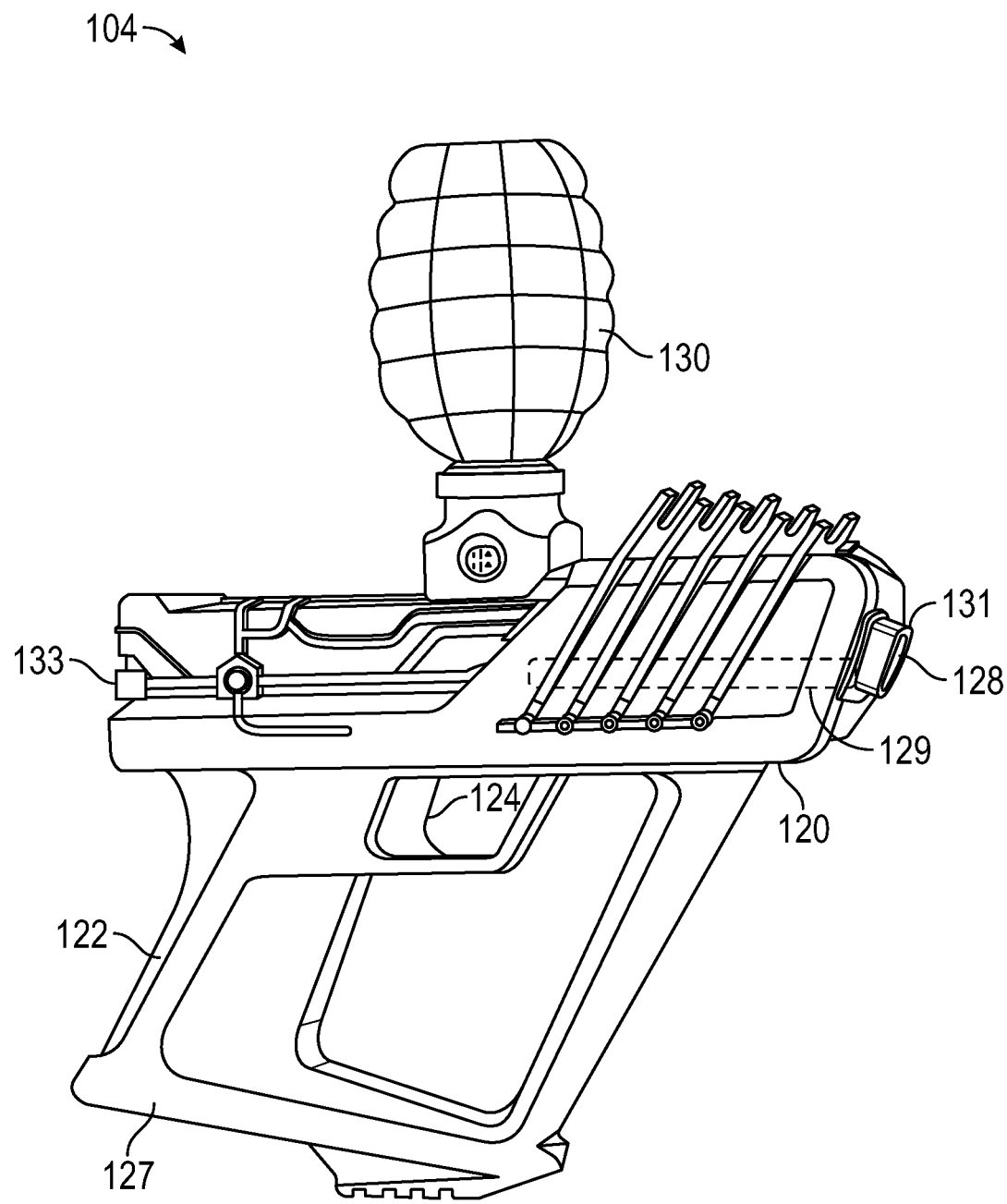
FIG. 2 is a diagram of a projectile-firing device in accordance with a preferred embodiment of the present invention.

Referring to FIG. 1, two projectile-firing devices 104 are depicted. The first projectile-firing device 104 is associated with a first user 116 and the second projectile firing device 104 is associated with a second user 118. One of ordinary skill in the art would understand that more than two devices 104 may be utilized and that the system 100 is scalable to include more than two users 116, 118. FIG. 2 is a diagram of a projectile-firing device 102 in accordance with a preferred embodiment of the present invention. The projectile-firing device 102, in a preferred embodiment, includes a housing 120, a handle 122, a trigger 124, a battery pack 126 (internal to the handle 122 in FIG. 2), a muzzle 128, and a hopper 130. The housing 120 preferably is configured to receive the handle 122, the trigger 124, the battery pack 126, the muzzle 128, and the hopper 130. The housing 120 is also preferably configured to embody electromechanical apparatus to receive commands and/or instructions via the network 102, feed projectiles from the hopper 130 to be fired by the projectile-firing device 104, and mechanically fire one or more projectiles from the muzzle 128. The electromechanical apparatus may include a gearbox configured to load and fire gellets, small biodegradable projectiles configured to be fired from the muzzle 128. The handle 122 is configured to receive the trigger 124 and used by the user 116, 118 to depress the trigger 124 to fire the projectiles from the muzzle 128. When the trigger 124 is depressed by the user 116, 118, the device 104 may be configured to fire a single projectile, or multiple projectiles (e.g., automatic fire mode). In an embodiment, the device 104 includes a switch 133 to change the fire mode from single fire to automatic fire modes. Alternatively, or in combination with the switch 133, the device 104 includes a display 152 (shown in FIG. 4) that is configured to change the fire mode from single fire to automatic fire modes. In an embodiment, the fire mode is configured to fire three projectiles upon the trigger being depressed once by the user 116, 118. The fire mode may also be controlled by the application via the network 102 to vary the fire mode depending upon the gaming configuration in accordance with a gaming session.

The muzzle 128 is configured to permit the projectile from exiting the projectile-firing device 104. The projectile-firing device, in a preferred embodiment, is configured to vary the velocity of a projectile from 90 feet-per-second (FPS) to 170 FPS. In other embodiments, the velocity is configured to reach 200 FPS or greater. For example, the projectile-firing device receives commands and/or instructions from the application via the network 102 to electromechanically adjust the velocity at which the projectile-firing device 104 is fired. The velocity may be adjusted electromechanically through a variety of methodologies, all within the scope of the present invention.

In an embodiment, the electromechanical functionality of the projectile-firing device 104 includes a barrel 129 (shown internally with dashed lines) to be inserted into the muzzle 128 and/or muzzle area. The barrel 129 may be configured to increase or decrease a velocity at which the projectile-firing device 104 fires a projectile. For example, a first barrel 129 is configured to achieve a muzzle velocity of 170 FPS, while another barrel 129 is configured to achieve a muzzle velocity of 90 FPS. Alternatively, or in combination with the barrel 129, a barrel tip 131 is preferably configured to be affixed to the muzzle 128 and/or muzzle area. The barrel tip 131 also may be configured to achieve muzzle velocities within the velocity ranges described herein. In yet another embodiment, the barrel tip 131 may be configured to reduce the velocity from a predetermined "default" range; thus, for example, when the barrel tip 131 is not affixed to the muzzle 128, the velocity is 170 FPS, while when the barrel tip 131 is affixed to the muzzle 128, the velocity is 90 FPS. The barrel tip 131 may be configured to allow beginners or those desiring a less aggressive gameplay experience to lower the velocity. Still further, in any of the aforementioned embodiments, the mechanical components of the muzzle 128, the barrel 129, and the barrel tip 131 may be combined with electronically adjusted velocity increments so as to achieve FPS velocities greater or lower than the predetermined velocities of the mechanical components. Still further, the projectile-firing device 104 may include physically adjustable areas alongside the barrel 129 to open or close to vary the velocity mechanically. In an embodiment, the velocity is decreased when the physically adjustable areas are opened further, while the velocity is increased when the physically adjustable areas are closed further. The opening and closing of the physically adjustable areas may be controlled by the application via the network and/or internal electronic components of the projectile-firing device 104.

Other methods of lengthening or shortening ranges mechanically are within the scope of the present invention. In an embodiment, electronic adjustment of blaster spring tension may be utilized, meaning that certain weapon types can be made to fire physically longer or shorter distances as determined by the system, allowing for "range" as an attribute; e.g., Sniper vs Revolver (e.g., Table 1).

The device 104 preferably includes electronic circuitry, or the like, to provide relatively accurate position and direction of the device 104. This data preferably is utilized to provide confirmation, in connection with the application, of a "hit" by a particular user 116, 118 on another user's 116, 118 wearable device 106 or a particular standalone target 108/monolithic target 148 or other target/battlefield object. The device 104 may also include an IR reader so that the system 100 in connection with the application can sense that a particular device 104 has reflected IR radiation on a wearable device 106 or target for further confirmation of a "hit."

Referring still to FIG. 2, the battery pack 126 is configured to provide power to device 104. For example, the device 104 includes electromechanical apparatus such as internal electronic circuitry configured to be powered by the battery pack 126. The battery pack 126 is also preferably configured to operate mechanical firing apparatus of the device 104. The battery pack 126 preferably is a rechargeable battery pack 126 configured to receive a USB-C input to recharge the battery pack 126. In other embodiments, the battery pack 126 may be recharged by a variety of recharge methods, all within the scope of the present invention, including a mini-USB input, or the like. The device 104 preferably includes a recharge port 127 configured to receive a recharge input.

The hopper 130 preferably is configured to hold a "depot" of projectiles to be fed to the electromechanical apparatus within the device 104 for firing. In various embodiments, the hopper is configured to hold 100, 200, 300, 400, 500, 600, 700, 800, 1000, or greater or fewer projectiles. The gaming configuration in accordance with a gaming session may limit the number of projectiles held by the hopper 130. The hopper 130 is configured to gravity feed projectiles into the device 104.

In a preferred embodiment, the projectile-firing device 104 is configured to uniquely receive instructions and/or commands from the application via the network 102 to increase or decrease electromechanical functionality of the projectile-firing device 104 when receiving "damage," receiving points or "health," or during a variety of other scenarios, preferably in connection with a gaming configuration. The physical consequences of this capability impact the first user's 116 ability to inflict "damage" to the second user 118. As a result, the rate of fire may be increased or decreased, a reload interval may be increased or decreased, a velocity of the device 104 may be increased or decreased, and an amount of "damage" inflicted can be varied depending on the commands and/or instructions, including the type and configuration of the gaming profile (e.g., gaming configuration) that is configured to be set during a gaming session. A projectile-firing device 104, for example, may be set in a configuration as a sniper rifle, a pistol, or a shotgun. Each of these configurations, in a preferred embodiment, are preset with specified rates of fire, reload intervals, damage capabilities, range of fire, or the like. The projectile-firing device 104 set in sniper rifle mode, for example, would have a slower rate of fire, a more frequent reload interval, and a higher damage capability than the projectile-firing device set in pistol mode, for example. The projectile-firing device 104 is configured to be electromechanically controlled by the application via the network 102 such that any of the above configurable options may be varied in real- or near-real-time.

The system 100 in accordance with the application gameplay configuration will allow or disallow the refill or usage of projectiles according to gameplay modes where a "reload" can be physically controlled from electromechanical assembly and connected via the network 102 and given instructions from the application. A projectile dispenser may be based on predetermined parameters within the gameplay and may embody or be part of the hopper 130. For example, a game may be set where the users 116, 118 (e.g., players) can only refill a certain number of times during the length of the game and after they have reached the limit the system prevents the player from reloading (e.g., locking the canister, stopping the blaster from working, etc.). The right to refill may be earned and the blaster may begin working again. In an embodiment, a home base/capture point station 172 may be utilized that permits the users 116, 118 to refill projectiles literally (e.g., within the existing hopper 130), as well as virtually per the game mode (e.g., gaming configuration).

The projectile-firing device 104 is configured to monitor and track the time when a projectile is fired from the device 104, and to provide this information to the application. As described herein, the system 100 is configured to receive the time the projectile was fired and correlate the time with the time a wearable device 106 was impacted by a projectile to determine that the user 116, 118 associated with the wearable device was hit by the user 116, 118 associated with a particular projectile-firing device 104. This methodology achieves benefits above and beyond traditional projectile-firing game systems because it can monitor and track who is responsible for a hit, allowing for more interactive gameplay and immersion.

The device 104 preferably includes a display configured to provide useful game information, such as hits, health, ammo, blaster "type", team alignment, remaining players, etc. The device 104 preferably includes electronic circuitry and a network interface to receive data from the network 102 in accordance with the application and the gaming configuration of that particular gaming session.

Referring again to FIG. 1, two extended-reality devices 105 are depicted, separately worn by and associated with the users 116, 118. The extended-reality devices 105 are configured to communicate via the network 102 with the application. The extended-reality devices 105 may be augmented reality (AR), virtual reality (VR), or extended-reality (XR) devices configured to receive and display data via the network 102 to the users 116, 118. The extended-reality device 105 is configured to enhance game modes and game attributes by mixed and/or augmented reality. Any suitable head-mounted display, including those of Meta Quest or Nreal, now and in the future may be utilized to display relevant game information in heads-up-display (HUD) style, allowing the users 116, 118 to track gameplay configurations, statistics, etc., in a video-game-like manner. For example, the extended-reality device 105 includes a HUD display 142 configured to display current health, ammunition (i.e., projectiles), weapon/blaster/projectile-firing device 104 type, shields, and the like. The HUD display 142 may also display "kills," "deaths," and a "kill/death" and/or success/failure ratio, including a ranking of users taking part in the gaming session. In a gaming session where certain of the users 116, 118 have been eliminated from the gaming session in accordance with the gameplay configuration, the remaining team members and opponents are displayed. In an embodiment, alerts, game start/end, timers, and special game states are displayed. The accuracy of the users 116, 118 may also be displayed as a shots/hits ratio. The HUD display 142 may also include display of the current objectives, game modes, progress, capture/flag/base status/health in accordance with the gameplay configuration. In certain embodiments, the gameplay configuration may utilize battlefield roles (e.g., medic, engineer, tank, sniper, etc.). These roles may include specialized perks and restrictions that may be displayed to the users 116, 118 via the HUD display 142.

Each of these displayable items may also utilize real-time or near-real-time virtual overlays on the battlefield environment displayed through the HUD display 142. For example, health and shield bars, team affiliation, badges, status, role, username, etc. can appear over the users' 116, 118 heads. Battlefield objectives can be highlighted in the distance, and capture or base areas can be defined and shown virtually, object pickups can be described and highlighted, weapon skins can be virtualized and overlaid on the device 104, and team colors, player skins, and other aesthetics can be mapped to human users 116, 118 in real-time or near-real-time. The HUD display 142 may also display zones of special status, such as neutral or safe, which can be virtually displayed on the battlefield environment, and hits, shield depletion, firing, etc. can be displayed as real-time or near-real-time virtual animations. Battlefield objects, skins, the environment, etc. can be themed to match game mode, user preference, and/or brand tie-ins, such as the Marvel Universe, WWII, or Sci-Fi themes. The application can restrict or unlock certain themes, nomenclatures, modes, etc., based upon player progress, preference, or parental controls. For example, realistic weapon terminology, violent descriptions such as "killed," or "bloody" animation effects can be restricted to older players or turned off entirely.

QR code/motion-capture-type patterns can be printed on blasters, targets, and battlefield objects to aid the extended-reality device 105 in overlaying virtualized animations/skins accurately utilizing the HUD display 142.

Referring again to FIG. 1, two wearable devices 106 are depicted. One of ordinary skill in the art would understand that while the wearable devices 106 are depicted as wearable vests, other wearables or body adornments affixed to other parts of the body may be utilized without departing from the scope of the present invention. The wearable devices 106 can have lighting profiles, sounds, and other controlled actions to integrate with gameplay. The first wearable device 106 is associated with the first user 116 and the second wearable device is associated with the second user 118. The wearable device 106 includes a torso portion 132 and a shoulder portion 134. As shown in FIG. 1, the torso portion 132 and the shoulder portions 134 are attached via straps 136. The torso portion 132 and the shoulder portions 134 of the wearable device 106 include wearable device targets 137 configured to detect impacts of projectiles on the wearable device 106. The wearable device targets 136 are in communication with one or more of the device 104, the standalone target 108, the drone 109, the cloud-based computing system 110, the remote device 112, and the fitness monitoring device 114. Each of these components is configured to communicate with one or more of the components of the system 100 via the network 102.

Upon detection of a "hit," the wearable device 106 is configured to send a message via the network 102 to the application indicating that the user 116, 118 associated with the wearable device 106 has been hit by a projectile. As mentioned herein, when the application receives the message that the wearable device 106 has been hit, the application correlates the time the projectile was impacted on the wearable device 106 with a time a projectile was fired by a projectile-firing device 104. The user 116, 118 associated with the projectile-firing device 104 that was correlated with the impact on the wearable device 106 is then credited with a hit against the user 116, 118 associated with the wearable device 106.

The standalone target 108 is depicted as a "flower" arrangement in a preferred embodiment. The standalone target 108 includes a central portion 138 (e.g., "pistil" of flower) and a plurality of outer portions 140 (e.g., "petals" of flower). As shown in FIG. 1, the standalone target 108 includes six outer portions 140, but in other embodiments, the number of outer portions 140 may be greater or fewer than six. Each of the central portion 138 and the outer portions 140 are configured to separately determine whether a projectile has impacted that portion of the standalone target 108. For example, the same target impact methodology is utilized for the wearable device targets 136 and the central and outer portions 138, 140 of the standalone target 108. In accordance with the gameplay configuration, "gamifying" the standalone target 108 may include a requirement to separately "hit" each of the portions 138, 140 in order to credit a gameplay objective. In other embodiments, one or more of the central portion 138 and outer portions 140 are required to be hit in accordance with the gameplay configuration. The standalone target 108 permits a variety of gameplay options and/or objectives, all within the scope of the present invention.

The standalone target 108 is preferably in communication with the application via the network 102 so that real-time or near-real-time data may be provided to the application, and visa versa. For example, upon a hit of the central portion 138 of the standalone target 108, the application may credit a "hit" using similar methodology as that used to credit a "hit' on the wearable device 106. The standalone target 108 may also be configured to include a physical indication (i.e., a red lighted portion) to indicate a hit upon a certain portion 138, 140 of the standalone target 108. In addition, or alternatively, the application, upon receiving data from the network 102, may be configured to provide a virtual overlay on the target displayed on the display of the extended-reality device 105.

Figure 3A:
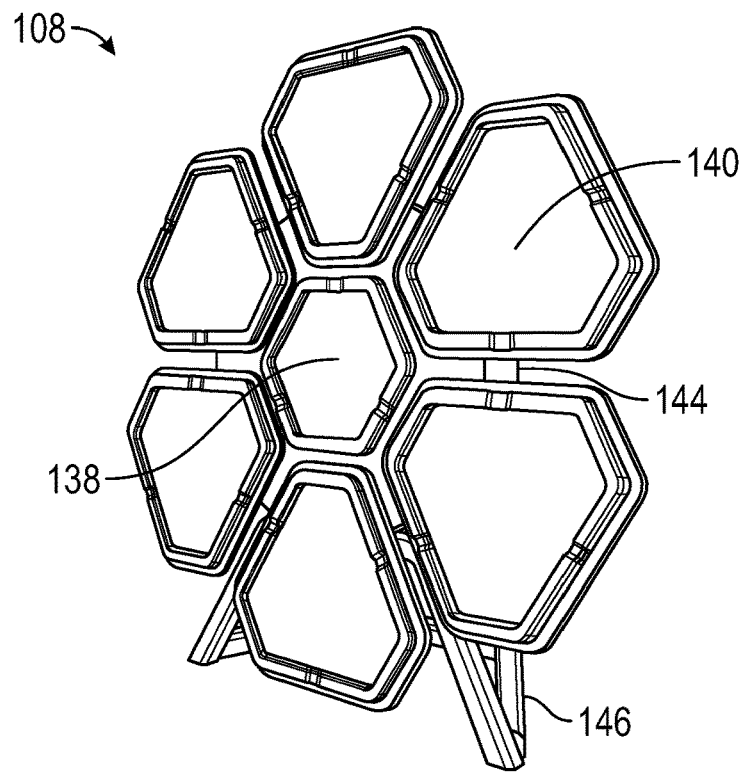
FIG. 3A is a perspective view of a standalone target in accordance with a preferred embodiment of the present invention.
Figure 3B:
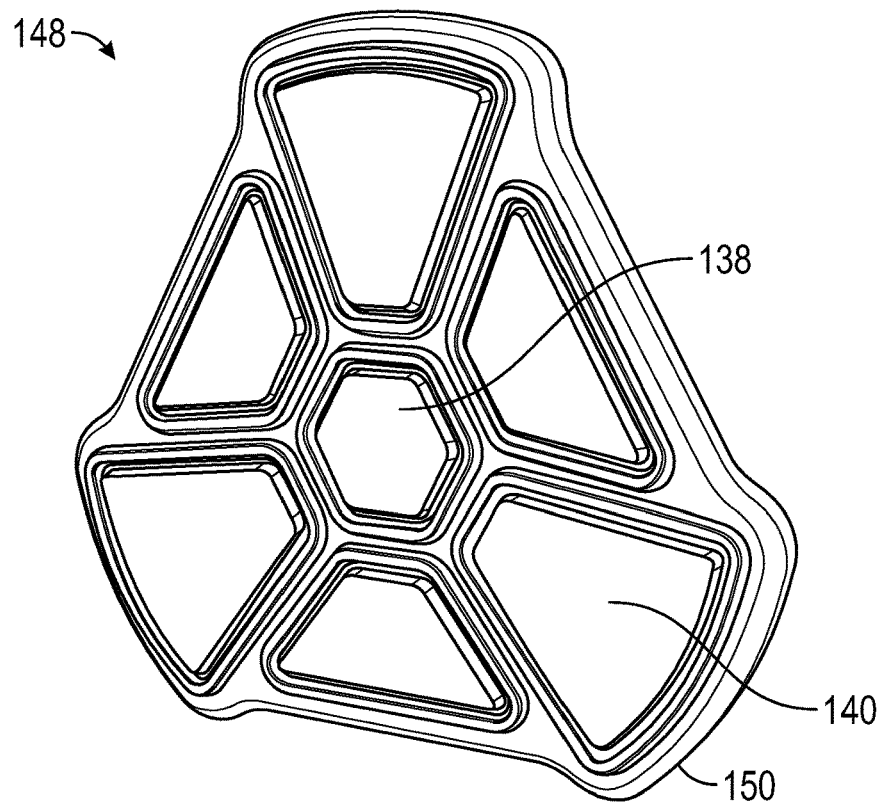
FIG. 3B is a perspective view of a monolithic target in accordance with a preferred embodiment of the present invention.

Referring now to FIGS. 3A and 3B, the standalone target 108 in FIG. 3A is shown in the same configuration as that shown in FIG. 1. The standalone target 108 includes support members 144 to support the central portion 138 and the outer portions 140. The standalone target 108 also includes a stand 146 configured to support the standalone target 108 in an upright position. As shown in FIG. 3B, a monolithic target 148 is shown, which is an alternative configuration of the standalone target 108. The monolithic target 148 includes a similar arrangement including a central portion 138 and outer portions 140, each configured to determine whether a projectile has impacted that particular portion of the monolithic target 148. The monolithic target 148 is constructed so that the central portion 138 and the outer portions 140 are embedded in the same structure (i.e., monolithic construction) or mold 150. The monolithic target 148 may be affixed to a structure such as a barrier or battlefield object, or may be positioned in an upright position using a stand, similar to that shown in FIG. 3A. Similarly to the standalone target 108, the monolithic target 148 is preferably configured to communicate with the application via the network 102, and includes the same "hit" confirmation methodology as that described herein in connection with the standalone target 108 and the wearable device 106.

While specific seven-panel-shaped targets (e.g., standalone target 108, monolithic target 148) have been shown, other shapes or configurations are within the scope of the present invention.

The system 100 as shown in FIG. 1 includes a drone 109. The drone 109 is configured to communicate via the network 102 with the application. The drone 109 may be preprogrammed to provide a "passive" target similar to the standalone target 108 or the monolithic target 148, and/or may be an "active" target or participant preprogrammed to be controlled remotely. In an embodiment, the drone 109 includes a projectile-firing device 104 affixed thereto. One of ordinary skill in the art would understand that the particular projectile-firing device 104 depicted in FIG. 1 would be modified to be affixed to the drone 109.

Referring still to FIG. 1, the cloud-based computing system 110 is configured to provide on-demand availability of computer system resources. The cloud-based computing system 110 preferably includes data storage and computing processor resources to offload storage and processing into a cloud environment. One of ordinary skill in the art would be familiar with cloud-based computing systems and would understand that a variety of configurations of components are within the scope of the present invention. The cloud-based computing system 110 is preferably configured to store and run the application.

The remote device 112 as depicted in FIG. 1 is preferably a smartphone and includes direction-sensing and location-sensing capabilities. For example, the remote device 112 includes GPS and a magnetometer to determine position and direction of the device 112. As disclosed herein, the remote device 112 may be affixed to the projection-firing device 104 to provide relatively accurate position and direction of the device 104. This data preferably is utilized to provide confirmation, in connection with the application, of a "hit" by a particular user 116, 118 on another user's 116, 118 wearable device 106 or a particular standalone target 108/monolithic target 148 or other target/battlefield object. The remote device 112 may also include an infrared (IR) reader so that the system 100 in connection with the application can sense that a particular device 104 has reflected IR radiation on a wearable device 106 or target (e.g., the targets 106, 148, the drone 109) for further confirmation of a "hit."

The remote device 112 is preferably connected to the network 102 and configured to communicate with the application. The remote device 112 in a preferred embodiment is configured to receive real- or near-real-time data from the network 102 to provide commands and/or instructions to the user 116, 118, and to display the commands and/or instructions thereon in accordance with the gaming configuration for that particular gaming session. The remote device 112 may display useful game information, such as hits, health, ammo, blaster "type", team alignment, remaining players, etc.

The fitness monitoring device 114 as depicted in FIG. 1 is configured to communicate with the application via the network 102. The device 114 may be a smart watch such as Apple Watch and Samsung Gear for integration with additional mobile applications. For example, the device 114 may be configured to integrate with health apps and features via an API. In an embodiment, the users 116, 118 may gain XP or other in-game features through increased physical activity and exertion. Users 116, 118 that exhibit more active gameplay, monitored through the fitness monitoring device 114, may earn increased XP. The users 116, 118 may use the XP to unlock special items, exclusive products, free items, or the like.

As mentioned herein, the application is configured to be stored and run on the cloud-based computing system 110. For example, the application is configured to receive, via the network 102, data from all physical components of the system 100 and stored on a database associated with the cloud-based computing system 110. The application may be configured to receive data from one or more wireless protocols such as Bluetooth (e.g., Bluetooth Low Energy (BLE)), WiFi, RF, etc.). The application preferably is configured to allow the users 116, 118 to download new game modes, receive commands and/or instructions, display score and skill-improvement tracking, and the like. The application may be configured to communicate with the remote device 112 to receive and display this information to the users 116, 118. The application is also configured to provide historical, up-to-date information concerning global and/or local scoreboards, such as those provided in video gaming environments.

The application is also configured, in an embodiment, to provide control over light and/or sound preferences, customized gaming mode/gaming configuration creation or sharing, and the like.

The application, in a preferred embodiment, is also configured to control and communicate with the various targets and physical objects in the system 100 via the network 102. For example, the application is configured to control the start/stop of a gaming session, provide live, real- or near-real-time scoring updates, and visual/audible/haptic user feedback in real- or near-real-time. In accordance with a gaming configuration, the application configures the various components of the system 100 initially in a gaming session setup. Each of the "nodes" within the system 100 is configured to communicate with nearby "nodes" such that the application need only be connected via the network 102 to one other component within the system 100. Thus, sharing and communication of data, information, commands and/or instructions, and the like may be shared between devices, and not necessarily through a "central" hub or routing station.

Figure 4:
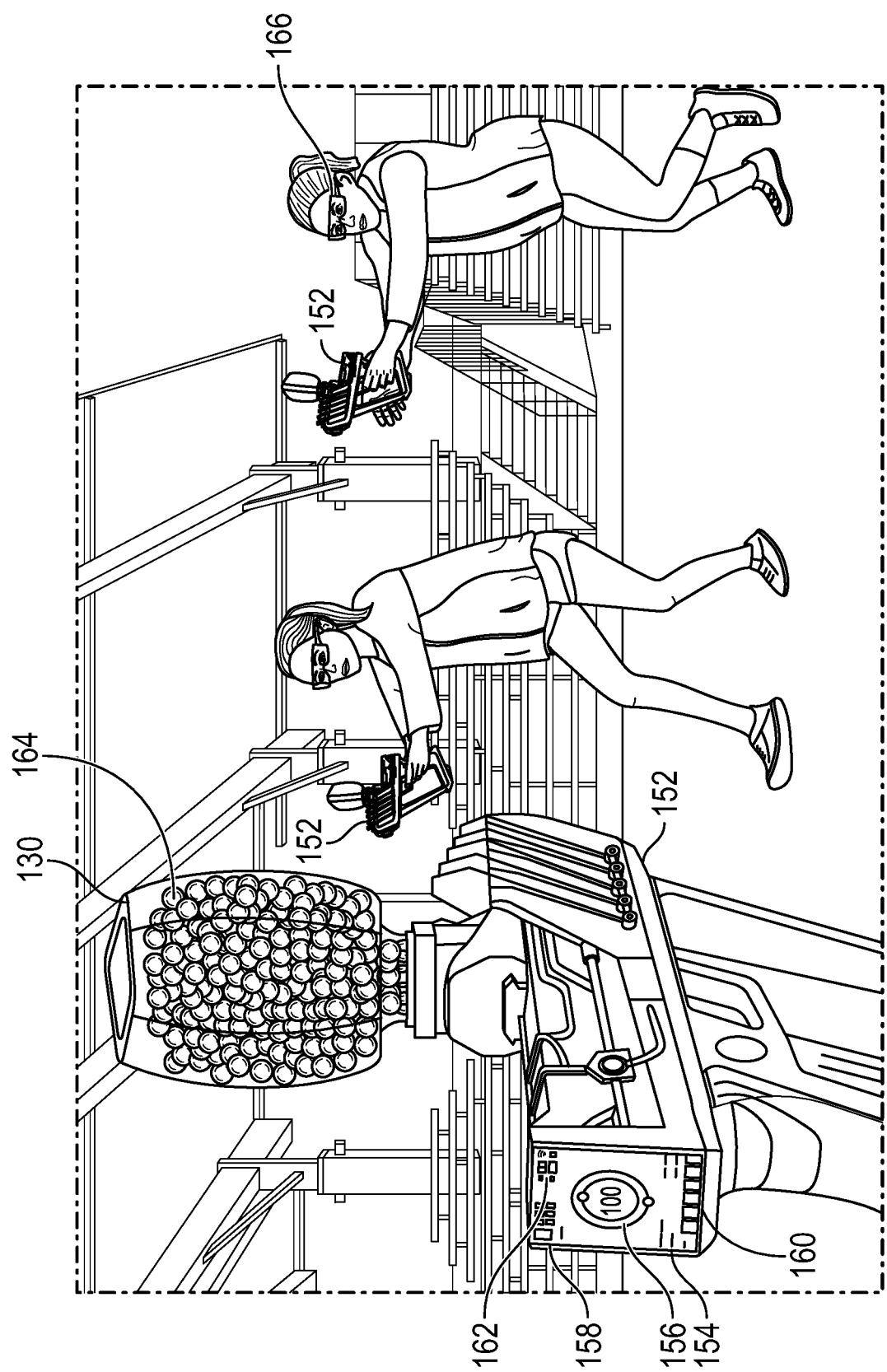
FIG. 4 is a perspective view of a battlefield environment depicting exemplary components of the extended-reality projectile-firing system in accordance with a preferred embodiment of the present invention.

Referring now to FIG. 4, a battlefield environment depicting exemplary components of the extended-reality projectile-firing system 100 is shown. The battlefield environment depicted in FIG. 4 is an outside arena setting showing multiple users 116, 118 each with a projectile-firing device 152. The device 152 is the same or substantially the same as that depicted in FIGS. 1 and 2, but includes a display 154 on the housing 120 facing the user 116, 118. One of ordinary skill in the art would understand that the display 154 may be placed on other areas of the housing 120 without departing from the scope of the present invention. The display 154 is configured to provide useful game information, such as hits, health, ammo, blaster "type" (e.g., projectile-firing device 104, 152), team alignment, remaining players, etc. For example, a health/shield meter 156 depicted in FIG. 4 shows that the user 116 has 100% of the available health points remaining, and a fully available shield. For example, the inner ring depicted on the health/shield meter 156 may signify the remaining health, while the outer ring depicted on the health/shield meter 156 may signify the remaining shield. The upper left corner of the display 154 shows team information 158 including a team affiliation, players on the team, and opponent players. The team information 158 may also indicate that one or more players have been eliminated from game play. The display 154 also includes, on the lower right corner, device information 160, which includes the current weapon type (e.g., SURGE), the firing mode (e.g., semi-automatic, full automatic), the range (e.g., RNG: 4), the damage capacity per round (e.g., DMG: 5), and the number of rounds remaining (e.g., nine rounds). The range, for example, may be determined by a level system wherein a "default" blaster may be given a Level 1 rating. For example, the Level 1 specifications for the blaster may be represented by a single star next to the type of blaster, and include RNG: 4 (out of 10), DMG: 5 (out of 20), set to semi-automatic only, and 9 rounds available per reload. The range may be a limiting range, such that once a blaster fires at a target or user beyond that range, the "hit" will not be credited toward the blaster's user. Alternatively, the range may be a dampening factor such that beyond the optimum range the blaster's damage capabilities is depleted significantly. Through the networked system 100, the application can determine the range at which a device 152 was fired at a target 108, 148 or a user 116, 118, and attribute damage to the user associated with that particular device 152 based on the distance between the device 152 and the target 108, 148 or the user 116, 118.

Through gameplay, upgrades to the blaster level can be acquired in addition to other blaster types. Upgrades may increase the range, damage, and rounds available of a given blaster type. Other blaster types such as "shotguns" could be picked up, and would have specifications balanced differently, such as very high damage ceilings, reduced range ceilings, and varying round capacities.

The display further includes, on the upper right corner, power/connectivity information 162, which includes icons representing, for example, WiFi and Bluetooth signals, remaining device power, etc. In this embodiment, both the WiFi and Bluetooth protocols are utilized to provide the network 102.

The device 152 depicted in FIG. 4 also shows a hopper 130 with projectiles 164 therein. As described herein, the projectiles 164 may be gellets, paintballs, or any other type of projectile suitable for gameplay. The users 116, 118 depicted in FIG. 4 are shown wearing glasses 166. The glasses 166 may be simple safety glasses, or in an embodiment, may be extended-reality devices 105.

Figure 5:
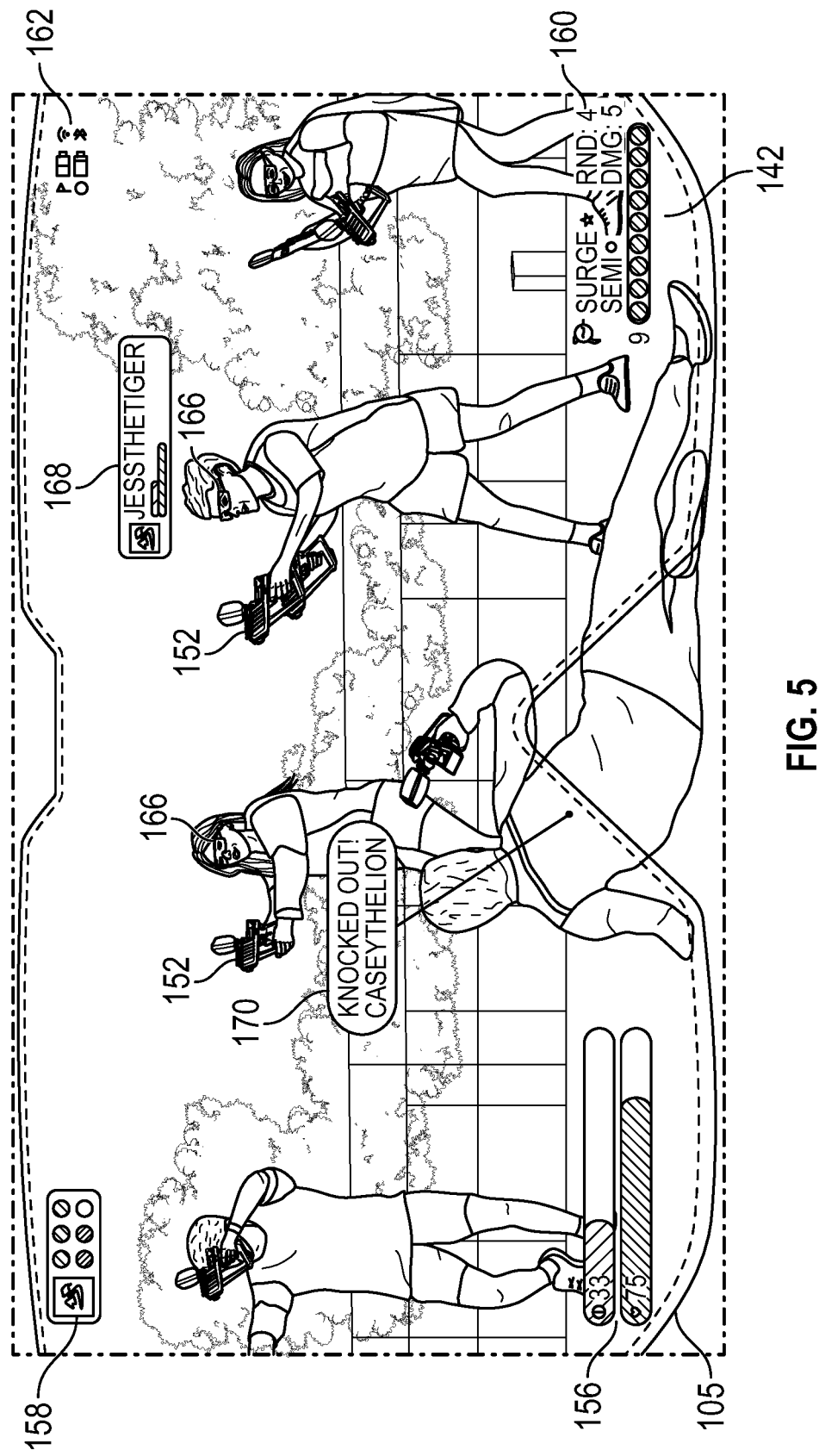
FIG. 5 is a perspective view of a mixed-reality battlefield environment depicting exemplary components of the extended-reality projectile-firing system in accordance with a preferred embodiment of the present invention.

Referring now to FIG. 5, a mixed-reality battlefield environment depicting exemplary components of the extended-reality projectile-firing system 100 is shown. FIG. 5 depicts a first-person view looking through an extended-reality device 105. As shown, the extended-reality device 105 includes the HUD display 142 through which both real-world physical objects such as the users 116, 118, trees, and ground are viewable, as well as virtual objects such as the health/shield meter 156, the team information 158, the device information 160, and the power/connectivity information 162. FIG. 5 also includes player information 168 displayed in a pop-up style banner above the user 116, 118. For example, as shown in FIG. 5, the player information 168 identifies the name of the player (e.g., JESSTHETIGER), the player's affiliation (e.g., shown by the icon to the left of the player's name), and the player's health/shield meter 156 within the pop-up banner. FIG. 5 further includes an in-game message 170 configured to provide the user 116, 118 associated with the extended-reality device 105 information about the gaming session. For example, as shown in FIG. 5, the user 116 identified as "CASEYTHELION" is shown to be "KNOCKED OUT!", indicating that the user 116 has been eliminated from gameplay. Other information and/or data, as described herein, may be displayed to the users 116, 118 through the HUD display 142 without departing from the scope of the present invention.

Figure 6:
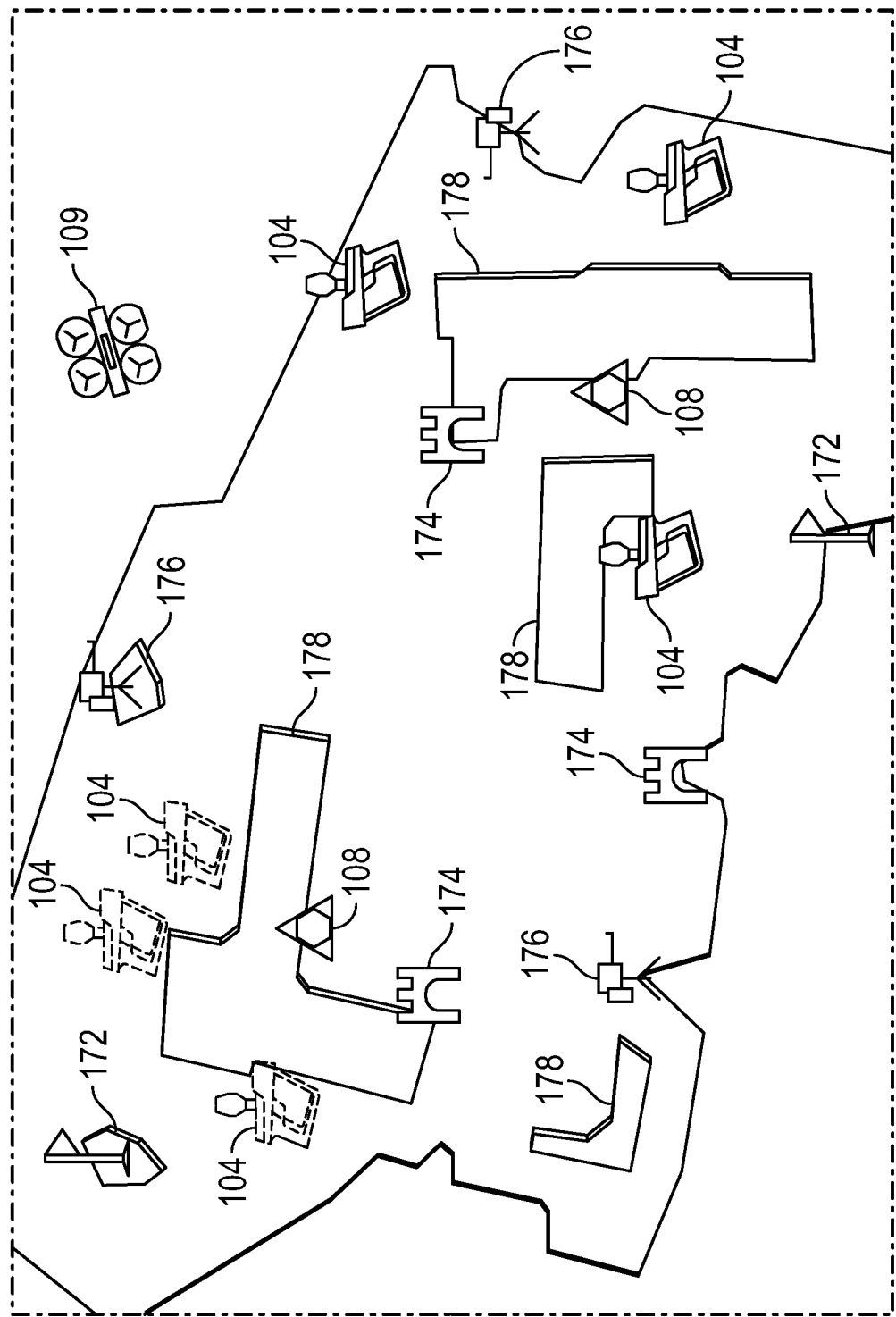
FIG. 6 is a top-down view of a battlefield environment depicting exemplary components of the extended-reality projectile-firing system in accordance with a preferred embodiment of the present invention.

Referring now to FIG. 6, a top-down view of a battlefield environment in accordance with an exemplary extended-reality projectile-firing system 100 is shown. The various components depicted in the battlefield environment of FIG. 6 include projectile-firing devices 104, 152 (e.g., blasters), standalone targets 108 (or monolithic targets 148), a drone 109, home base/capture point stations 172, bunkers 174, turrets 176, and barriers 178.

As described herein, the projectile-firing devices 104, 152 are each associated with a user 116, 118 (not shown in FIG. 6). The user 116, 118 preferably is associated with an extended-reality device 105, a wearable device 106 (e.g., wearable vest), a remote device 112 (e.g., a smartphone), and a fitness monitoring device 114. In addition to these components, a user 116, 118 may utilize physical player-borne shields, designed to shield or deflect projectiles 164. These could be provided to certain "roles" (e.g., Tank, Heavy), or picked up on the battlefield. An iteration of this device could have a collapse/expand function, so that it only activates under certain game conditions, or for certain time intervals with a recharge period, but can be equipped during the whole game.

Each of these components are capable of being in communication with the application via the network 102, as described more fully herein. Not all components associated with the user 116, 118 must be operatively connected to a "central" routing station, but may communicate data with nearby elements, associated with the user 116, 118, another user 116, 118, or any of the networked components described herein. For example, the standalone targets 108, the drone 109, the home base/capture point stations 172, the bunkers 174, and the turrets 176 are all configured to be in communication with the network 102.

The battlefield environment of FIG. 6 depicts two teams or "sides", each comprising three users 116, 118 (e.g., players). The first team comprises three players on the eastern (right) side of the battlefield, while the second team comprises three players on the western (left) side of the battlefield. On the first team's side of the battlefield, a standalone target 108 is associated with the first team. Thus, in an embodiment, one objective of the second team is to eliminate the standalone target 108 on the first team's side. For example, the target 108 may require a team to inflict damage or cause a certain number of hits to win, to unlock bonuses, "debuff" the enemy team, or as a target training game mode. Debuffing an opposing team may include reducing the team's rate of fire, reload times, number of health points, reduce shields, or a variety of other reduction methodologies. The debuff may be configured to be on a timer, such that when the timer expires, the debuff is removed.

In addition, the first team's side includes a drone 109 (which may or may not be associated, or on the same team, as the first team; i.e., neutral, or otherwise), a home base/capture point station 172, two bunkers 174, a turret 176, and two barriers 178. The second team's side includes a stand-alone target 108, a home base/capture point station 172, a bunker 174, two turrets 176, and two barriers 178. All of these battlefield components may be networked via the network 102 and configured and controlled by the application.

A battlefield objective may include "capturing" the drone 109 to bring it onto the first team's side or the second team's side. The drone 109 may include a projectile-firing device 104 mounted and independently remotely controlled by an operator or user 116, 118. The drone 109 may include a kit enabling attachment of a projectile-firing device 104, a standalone target 108, or the like, to an existing drone platform. In an embodiment, the drone 109 may be integrated with these components and provided as an integrated unit.

If risk of physical damage to the drone 109 is a factor, actual projectile firing could be disabled when the projectile-firing device 104 (e.g., a blaster held by a user 116) is aimed at the drone 109, counting as being "shot down" when the trigger is depressed while aimed at the drone 109. The drones 109 may be configured to be "unlocked" as a perk for accomplishing certain objectives. The drones 109 may have certain automated features, allowing them to fly patterns remotely, such as hovering over the home base/capture point station 172 acting as defense, or following a given player, such as in certain video games. The drone 109 may be configured to execute "air strikes," to be unlocked and called in, where the drone 109 takes off automatically and goes to a point or target, takes an action such as blasting it, and then flies back to a preset location.

While the drone 109 is shown in FIG. 6, other mobile platforms such as rovers or other motorized objects may be utilized for enhanced gameplay. For example, the motorized objects may implement navigational controls, live streaming video, control of projectile-firing devices 104 installed onto the motorized objects, and hit detection and correlation in connection with standalone targets affixed to the motorized objects.

In an embodiment, the motorized objects are ground-based remote controlled vehicles with mounted blasters (e.g., projectile-firing devices 104) or "explosives" (e.g., mines, grenades, etc.), which can be activated by the user 116, 118 or a remote operator. Both rovers and drones may be used as intelligence gathering with or without mounted blasters, where a camera feed is shown on the display 154 of a device 152, the HUD display 142, remote device 110, or other viewable display. Control over these units could be contested as part of gameplay, where there is only one available rover (or drone 109), and certain successful actions give one player or team access to it for a period of time.

The home base/capture point stations 172 are configured to communicate with the application via the network 102. The stations 172 allows players to refill projectiles (e.g., ammunition or rounds) physically, as well as digitally, per the gaming mode or configuration. Proximity to the stations 172 can offer "healing," restoring lost health points while in-game. The stations 172 may also serve as a respawn point; for example, if a player is eliminated during gameplay, the player must physically return to the player's team station 172 in order to return to the game. The game mode or configuration may determine the respawn timer (i.e., how long a player must wait to respawn), as well as the number of respawns possible per player. In addition, these stations 172 can serve as extensible capture points in appropriate game modes, where one team must hold multiple points simultaneously by positioning their players near it and keeping the opposing players away. Proximity can be determined by RF, NFC, GPS, blasting the object within a repeating time window, or a combination of these and/or other methods.

The bunkers 174 in an embodiment are rapidly inflating and self-storing inflatable fold-out panels composed of rubber sheets, bistable spring sheets, and inflatable structural beams. The bunkers 174 include an attached pump or compressed air storage tank whereby the inflatable structural beams are inflated and the air pressure folds out the panels. Fixtures at the base of the unit can assist in maintaining the panel firmly in place. Inflation and deflation of the bunkers 174 may be controlled by the application and/or the users 116, 118 utilizing any of the methods described herein to activate or deactivate battlefield objects. For example, the users 116, 118 may deploy the bunkers 174 by activating the bunkers 174 via the remote device 112, the display 154, or through an interface available through the extended-reality device 105 and/or the HUD display 142. The bunkers 174 may also be manually inflated/deflated by the users 116, 118. The application may also keep track of which bunkers 174 are deployed/inflated, and their location or proximity to other battlefield objects in accordance with several embodiments disclosed herein.

The turrets 176 are configured to be in communication with the network 102 and controllable through a variety of methods, as disclosed herein. For example, global, connected true "video games" can be augmented into the application to allow for control of a turret 176 via the internet from users worldwide. The turret 176 may be controllable via the application by a team's user 116. Controlling the turret 176 may include placing the turret 176 in a "sentry" mode, where if an opposing player is within a range of the turret 176, the turret 176 will fire projectiles 164 at the opposing player. The turret 176 may include motion sensors or body-detecting cameras to allow for "sentry" functionality. The turrets 176 may be configured to be semi-autonomous (e.g., partially player controlled) and fully autonomous (e.g., player puts turret 176 into "mode"). The turrets 176 preferably include a standalone target 108 so that hit detection and correlation may occur. This functionality would allow a team to "take out" or deactivate a turret 176 during gameplay, or capture the turret 176 for the opposing team's advantage. The ability to detect hits and correlate the hits with particular players in the battlefield scenario may enhance gameplay with rewards, loot, or other asymmetrical advantages to players for completing interactions according to the active gameplay mode or configuration.

In an embodiment, according to an "adversarial" target mode, a device 104 mounted on or near the target is aimed at the user 116. Under certain game modes, the turret 176 would fire back at the player (e.g., a "wild west quick draw" mode). If the user 116 does not hit the target quickly enough, the turret 176 shoots back and the user 116 loses the round. This same mode could also be configured to operate with a standalone target 108. The adversarial mode can also be configured to enable a human player to remotely control the adversarial blaster via internet through the network 102.

As with the bunkers 174, the turrets 176 may be player-deployable or "permanent" (e.g., at a venue) turrets 176 that can be controlled directly or remotely, and/or be automated via motion detection, computer vision, or at random. The turrets 176 preferably would contain the same hit detection systems as the wearable devices 106, the standalone targets 108, and the monolithic targets 148, allowing players to "destroy" them by hitting them a number of times, and allowing attribution of the turrets' 176 hits to the appropriate player or team. These turrets 176 could allow disabled or remote players to engage with their friends on the battlefield, either via the internet, nearby RF, or hands-on controls.

The barriers 178 preferably are deployable static barriers, similar to the bunkers 174, but "permanent" for that particular gaming session. For example, teams could be given a number of player-portable barriers to set up before the match, enabling a more interesting playspace on an otherwise flat arena such as a sports field. The barriers 178 can be constructed of lightweight but durable fabric on a collapsible frame similar to a folding chair or umbrella. They can also be printed with branded or themed livery.

As described herein, global, connected true "video games" can be augmented into the application to allow for control via the internet from users worldwide. Semi-autonomous or fully autonomous extensions may include "swarms" or "strikes" from mobile platforms for tournaments or larger-scale battles.

In place of the permanent or semi-permanent battlefield objects illustrated in FIG. 6, capturable objects may be deployed in accordance with certain game modes. For example, in "capture-the-flag" gaming modes, the capturable objects preferably can detect their proximity to a team's home base/capture point station 172 through RF or NFC, or the like, and know when they are in motion via accelerometer and/or GPS, allowing the network to alert players when a "flag" is being captured.

Beyond capturable objects, the battlefield objects illustrated in FIG. 6 may include battlefield "ordinance" and accessories. For example, the battlefield objects may include mines that are deployable, proximity detonated battlefield objects that blast projectiles outward. In an embodiment, the mines do not blast projectiles outward, but are controlled by the application to credit a "hit" from the mine in connection with a particular user 116 within range of the mine proximity. In this case, a player coming too close to a mine is notified via audio/video/haptic feedback that they have been hit, and the hit credited against the player. This can also work without projectiles, where a player coming too close is simply notified via A/V/H feedback that they have been hit. Alternately, the projectiles can be ejected, outward but not be required to impact the player-worn target in order to count, and thus simply providing tactile feedback for the hit.

The battlefield objects may also include thrown objects by the player. Similar to the mines described above, "grenades" may be utilized and would simulate an explosion.

As described herein, the type of weapon or projectile-firing device 104 may be virtual, utilizing the network 102 and NFC or other electronic means to allow for battlefield pickup of different weapon types or accessories. For example, a small object preferably can be picked up and placed near or attached to the Smart Blaster (or via interaction with a static battlefield object, e.g., shooting a target), telling it to change configuration and registering it in the system as a new weapon type. Table 1 below illustrates potential examples of various weapon types within the scope of the present invention in accordance with a gaming mode or configuration.

TABLE 1

| Type | Capacity | Reload Time | DMG per hit | Rate of Fire |
|---|---|---|---|---|
| Revolver | 6 rounds | 3 seconds | 1 | 1 shot per sec. |
| Automatic | 30 rounds | 5 seconds | 2 | physical |
| Bazooka | 1 round | 10 seconds | 20 (splash) | N/A |
| Sniper | 1 round | 4 seconds | 7 | N/A |

The "Revolver" of Table 1 includes a six-round capacity, requiring a player to reload the Revolver after firing six shots. To reload another six rounds, the Revolver is controlled to wait 3 seconds before being able to fire another round from the next six rounds. Each round inflicts 1 DMG per successful hit. The rate of fire is limited to 1 shot per second. The "Automatic" blaster of Table 1 includes a 30-round capacity with a reload time of 5 seconds. The DMG per hit for the Automatic is higher than the Revolver, at 2 DMG per hit. The rate of fire is not limited and may utilize the physical rate of fire available to the projectile-firing device 104. Alternatively, the rate of fire may be limited. The Bazooka of Table 1 is a "splash-damage" capable option. Since the Bazooka is a slower-firing weapon type, and inflicts greater damage per hit, its reload time is slower than other types of weapons and does not have more than one round in its capacity. The Sniper of Table 1 includes a 1 round capacity with a 4-second reload time, which limits the rate of fire by a 4-second interval. The Sniper has a greater damage capacity of 7 damage than the Revolver or the Automatic. One of ordinary skill in the art would understand that the various weapon types and parameters are fluid and may change depending on the gameplay configuration. For example, a range or "overheat" timer could be specified by weapon type.

In an embodiment, the trigger 124 of the device 104 is electronic; thus, the "reload" and related reload time can be enforced by disabling the trigger until the player hits a reload button, after which a reload timer is activated. Audible, visual, and haptic feedback can be provided for all of these actions and states (e.g., out of "digital" rounds/ammunition).

Similarly, the rate of fire can be controlled, only registering a trigger 124 pull or firing a projectile 164 at the appropriate time interval. Semi and fully automatic modes may be manually or automatically controlled, as described herein.

The system 100 calculates damage digitally through data received from the network 102. For example, the device 104 provides a signal indicating its weapon type; if the target 108, 148 or wearable device 106 is "hit," the target 108, 148 or wearable device 106 will know the weapon type and use the weapon characteristics (e.g., as disclosed in Table 1) to calculate the damage. Alternatively, or in combination, the application calculates damage inflicted on a battlefield object by a particular weapon type. The application, hosted in the cloud-computing system 110, may store a lookup table or other suitable tracking method within a database, or the like, to track and credit hits by/to certain battlefield objects, as more fully described herein. In an embodiment, the damage inflicted by a particular weapon type may be degraded or decreased at outer limits of the weapon type's range.

Splash damage, such as from a Bazooka, mine, or grenade, can be calculated by a proximity system, as more fully described herein. The splash damage may be greater the closer the battlefield object/target 108, 148 or wearable device 106 is from the epicenter of the "explosion." An IR device associated with the projectile-firing device 104 may be utilized to track splash damage. For example, a number of targets may be "pre-painted" with IR, which will hold them as painted for a fixed period of time, and if one is hit with a projectile within that window, they each receive damage.

Various means of swapping weapon types is within the scope of the present invention. For example, a variety of "skins" could be implemented, such as shells that attach or slide over the projectile-firing device 104. These skins could have the necessary electronics to tell the blaster what weapon type to become. The skins could combine both physical and virtual objects in accordance with a particular weapon type.

Other objects could be utilized to provide users 116, 118 with varying attributes for in-game performance. For example, stickers containing passive NFCs can be provided as packs, and players can affix them to objects of their choice to place around the battlefield, allowing loot drops including weapon types and upgrades; these objects could be misplaced without much loss, as new stickers can be easily replaced. In addition, scopes or silencers may be provided as accessories to the device 104 to provide relative effects on gameplay. For example, the scope could increase the range at which a particular weapon type is effective.

FIG. 7 is a flow diagram of an extended-reality projectile-firing gaming method 200. At Step 202, a gaming session in accordance with a predetermined gameplay configuration is initiated. The extended-reality gaming application is configured, in a preferred embodiment, to control and communicate instructions and/or messages to initiate the gaming session. Alternatively, or in combination, the remote device 112 is configured to initiate the gaming session.

At Step 204, projectile-firing device data is received from one or more blasters (e.g., projectile-firing devices 104, 152.) The projectile-firing device data preferably includes data configured to update gaming metric data in accordance with a gameplay configuration. The gameplay configuration may specify requirements for the gaming session, including available health points, shields, blaster types, available rounds, reload interval times, rounds per magazine, and battlefield objectives, among other things. The gaming metric data in a preferred embodiment tracks player scores, updating the gaming metric data to confirm successful impacts (e.g., projectile hits) from particular blasters 104 against particular wearable 106 and non-wearable battlefield objects 108, 148, 172, 176, etc. Thus, the projectile-firing device data includes data indicating that a projectile was fired, the time the projectile was fired, and location and orientation information. The projectile-firing device data may also include information obtainable from one or more sensors, such as near-field communication, radio frequency, infrared, magnetometer, and global positioning satellite sensory data.

At Step 206, battlefield object data is received from one or more battlefield objects such as wearable or non-wearable devices. The battlefield object data preferably includes data configured to update gaming metric data in accordance with a gameplay configuration. Thus, the battlefield object data preferably includes information that the battlefield object 106, 108, 148, 172, 176, etc., was impacted with a fired projectile, the time of impact, and the location and orientation of the battlefield object. The battlefield object data may also include information obtainable from one or more sensors, such as near-field communication, radio frequency, infrared, magnetometer, and global positioning satellite sensory data. The battlefield object data may wholly, or partly, be provided via an affixed remote device 112 configured to provide the sensory data.

As described above, at Steps 204 and 206, the projectile-firing device data and the battlefield object data are received. In a preferred embodiment, these data are received by the cloud-based computing system 110 via the network 102 and usable by the extended-reality gaming application. In other embodiments, these data are received by a standalone application at the physical location of the gaming session, or may be a combination of cloud-based and physical location-based computing and processing. One or more remote computing centers or systems may be utilized to receive and process the data.

At Step 208, the firing of a projectile is confirmed, and a time stamp is associated with the firing of the projectile. For example, the data tracks the projectiles as they are fired by the projectile-firing device 104, and provides time stamps when each projectile was fired in real- or near-real-time. At Step 210, the location and orientation of the blaster that fired the projectile are determined. As described above, the sensory data from the projectile-firing device data is preferably utilized to determine the location and orientation of the blaster.

At Step 212, an impact on a battlefield object is confirmed, and a time stamp is associated with the impact on the battlefield object. For example, the battlefield object is tracked to perceive impacts on wearable devices 106 and/or non-wearable devices 108, 148, 172, 176, etc. At Step 214, the location and orientation of the battlefield object are determined. As described above, the sensory data from the projectile-firing device data is preferably utilized to determine the location and orientation of the battlefield object.

At Step 216, it is determined whether the time the projectile was fired and the time of the impact on the battlefield object are within a predetermined time period. For example, the predetermined time is measured in milliseconds, as the blaster's projectile velocity is preferably at least 90 FPS and can exceed 200 FPS. This determination provides confirmation that the blaster shot the particular projectile that was detected by the particular battlefield object.

At Step 218, it is determined whether the location of the blaster that fired the projectile and the battlefield object detecting the impact are at locations within a predetermined area. As described herein, the physical range of the blaster 104 is limited, but the blaster 104 may be further limited by the application such that certain impacts outside of the predetermined area are outside of the permitted blaster's 104 range. The location determination permits further confirmation that the blaster shot the particular projectile that was detected by the particular battlefield object.

At Step 220, it is determined whether the orientation of the blaster that fired the projectile is oriented with the orientation of the battlefield object detecting an impact by a projectile. If the orientation is within a predetermined direction or orientation, the orientation determination permits further confirmation that the blaster shot the particular projectile that was detected by the particular battlefield object.

At Step 222, the gaming metric data is updated confirming a successful impact on the battlefield object and a successful hit by the blaster 104. The updated gaming metric data attributes a decrease in health points to a user or battlefield object that was impacted by the blaster 104, in accordance with the gaming configuration, and attributes damage inflicted upon the user or battlefield object to the user associated with the blaster 104. The gaming metric data in a preferred embodiment tracks player scores, updating the gaming metric data to confirm successful impacts (e.g., projectile hits) from particular blasters 104 against particular wearable 106 and non-wearable battlefield objects 108, 148, 172, 176, etc. in real- or near-real-time.

The determinations in Steps 216, 218, and 220 and the updating of the gaming metric data in Step 222 are preferably conducted using the gaming application.

FIG. 8 is a flow diagram of an extended-reality projectile-firing gaming method 300. At Step 302, blaster data is received from a blaster 104. The blaster data is preferably the projectile-firing device data associated with method 200. At Step 304, wearable vest data is received from a wearable vest 106. The wearable vest data is preferably the battlefield object data associated with method 200. At Step 306, battlefield object data is received from a battlefield object 108, 148, 172, 176, etc. The battlefield object data is preferably the same battlefield object data associated with method 200.

At Step 308, the time of firing of a fired projectile from the blaster 104 is recorded. Preferably the time of firing is recorded and stored in connection with the gaming application. At Step 310, an impact of the fired projectile on the wearable vest 106 is confirmed. The methodology for determining an impact on a wearable vest 106 is disclosed elsewhere herein. At Step 312, the time of impact of the fired projectile on the wearable vest 106 is recorded. At Step 314, an impact of the fired projectile on the battlefield object 108, 148, 172, 176, etc. is confirmed. The methodology for determining an impact on a battlefield object 108, 148, 172, 176, etc. is disclosed elsewhere herein. At Step 316, the time of impact of the fired projectile on the battlefield object 108, 148, 172, 176, etc. is recorded.

At Step 318, it is determined whether the time of impact on the wearable vest 106 and the time of firing the fired projectile is within a predetermined time period. This determination provides confirmation that the blaster shot the particular projectile that was detected by the particular wearable vest. At Step 320, it is determined whether the time of impact on the battlefield object 108, 148, 172, 176, etc. and the time of firing the fired projectile is within a predetermined time period. This determination provides confirmation that the blaster shot the particular projectile that was detected by the particular battlefield object. For example, the predetermined time is measured in milliseconds, as the blaster's projectile velocity is preferably at least 90 FPS and can exceed 200 FPS.

At Step 322, a successfully fired projectile attributed to the blaster 104 is recorded. Preferably the application records the successful hit of the projectile and associates the successful hit with the blaster 104 and the associated user. At Step 324, a successful impact on the wearable vest 106 and/or the battlefield object 108, 148, 172, 176, etc. is recorded. Preferably the application records the successful impact of the projectile on either the wearable vest 106 and/or the battlefield object 108, 148, 172, 176, etc. In practice, a blaster's 104 projectile will likely only be attributable to a single wearable vest 106 or a single battlefield object 108, 148, 172, 176, etc. However, when another projectile-firing device such as a Bazooka, mine, or grenade involves splash damage, one or more wearable vests 106 and/or battlefield object 108, 148, 172, 176, etc. may be impacted by a single "explosion."

At Step 326, the gaming metric data is updated to record the successful impact and the successful hit and attribute each to corresponding devices and their associated users.

It will be appreciated by one of ordinary skill in the art that method 300 does not specifically include location and/or orientation confirmation of successful impacts or hits. However, those confirmations may be implemented in the method 300. Alternatively, any combination of timing, location, and orientation data and/or information may be provided to confirm successful impacts or hits, and are within the scope of the present invention.

It will also be appreciated that the updated gaming metric data identified in the methods 200, 300 preferably is provided to the projectile-firing devices 104, 152, the display 154, and/or the HUD display 142, and/or the like, to provide updated gaming score information in accordance with the gaming configuration during the gaming session in real- or near-real-time.

Figure 9:
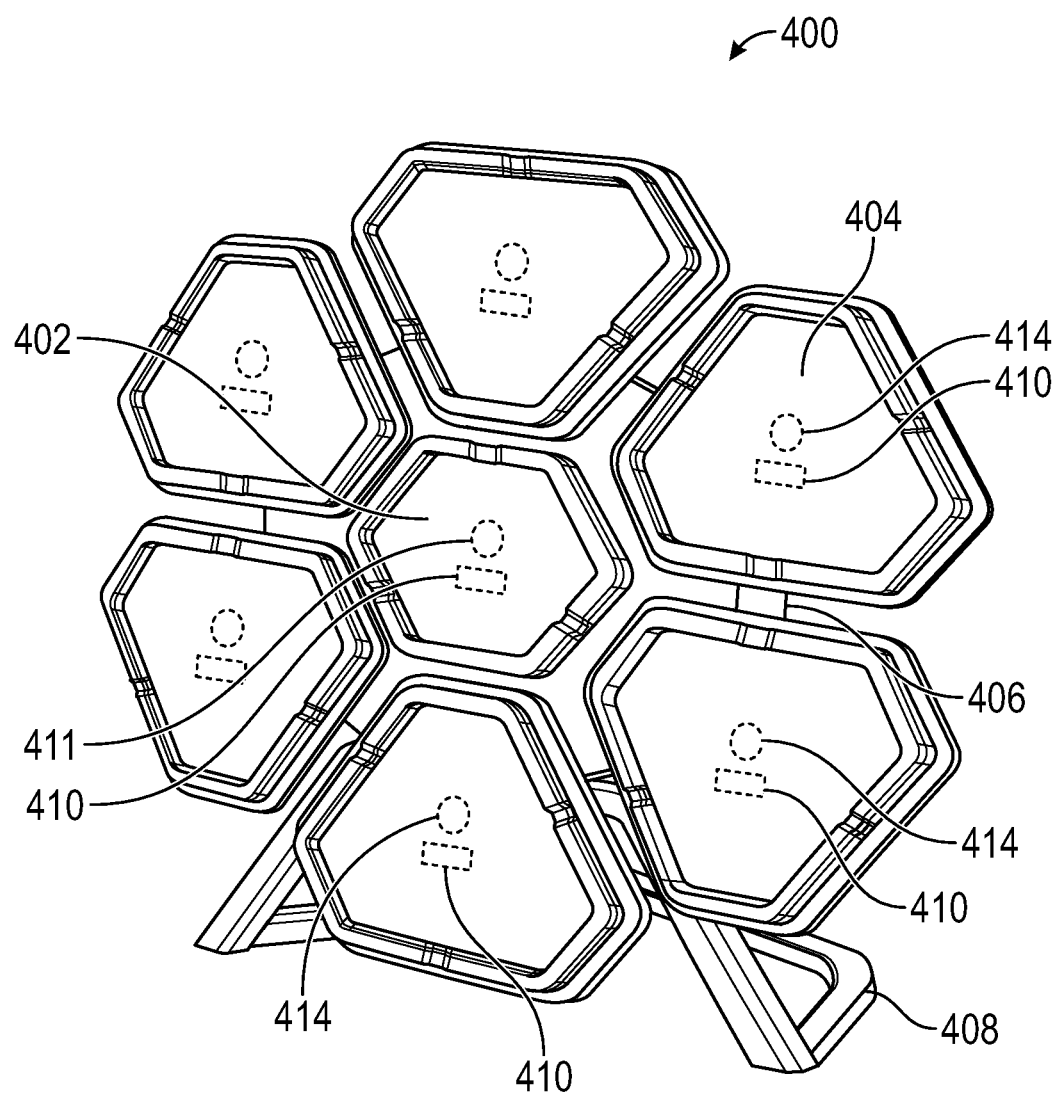
FIG. 9 is a perspective view of one or more smart targets in accordance with a preferred embodiment of the present invention.

Referring now to FIG. 9, FIG. 9 is a smart target 400 in accordance with a preferred embodiment of the present invention. The smart target 400 is configured to be integrated and utilized with a smart target co-witnessing hit attribution system in accordance with a preferred embodiment of the present invention. In an embodiment, the smart target 400 is a standalone target 108 or a monolithic target 148. The smart target 400 preferably includes a piezoelectric (PE) sensor 410 configured to determine an impact of a particular projectile upon (or near) the smart target. In an embodiment, the smart target 400 is arranged as a "flower." The standalone target 400 includes a pistil portion 402 (e.g., "pistil" of flower) and a plurality of petal portions 404 (e.g., "petals" of flower). As shown in FIG. 9, the smart target 400 includes six petal portions 404, but in other embodiments, the number of petal portions 404 may be greater or fewer than six. Each of the pistil portion 402 and the petal portions 404 are configured to separately determine whether a projectile has impacted that portion of the standalone target 400.

In an embodiment, a PE sensor 410 is embedded or integrated and/or operably coupled with each of the pistil portion 402 and the petal portions 404. In another embodiment, a single PE sensor 410 or two or more PE sensors 410 are utilized to sense impacts on the pistil portion 402 and the petal portions 404. A trained model, as described further herein, is preferably utilized to enable electronic control circuitry to determine when a projectile has impacted a particular portion of the smart target 400. Depending on the application it may be advantageous to provide multiple PE sensors 410 for a single smart target 400. In an embodiment, the same target impact methodology is utilized for the wearable device targets 136 and the central and outer portions 138, 140 of the standalone target 108. The smart target 400 includes support members 406 to support the pistil portion 402 and the petal portions 404. The smart target 400 also includes a stand 408 configured to support the smart target 400 in an upright position. One of ordinary skill in the art would understand that a PE sensor 410 is an electromechanical device that uses the piezoelectric effect to measure changes in pressure, strain, force (or other physiological effects) by converting them to an electrical charge or signal. In smart target parlance, the PE sensor 410 is utilized for hit detection. In other embodiments, sensors other than the PE sensor 410 may be implemented, as described herein.

Figure 10:
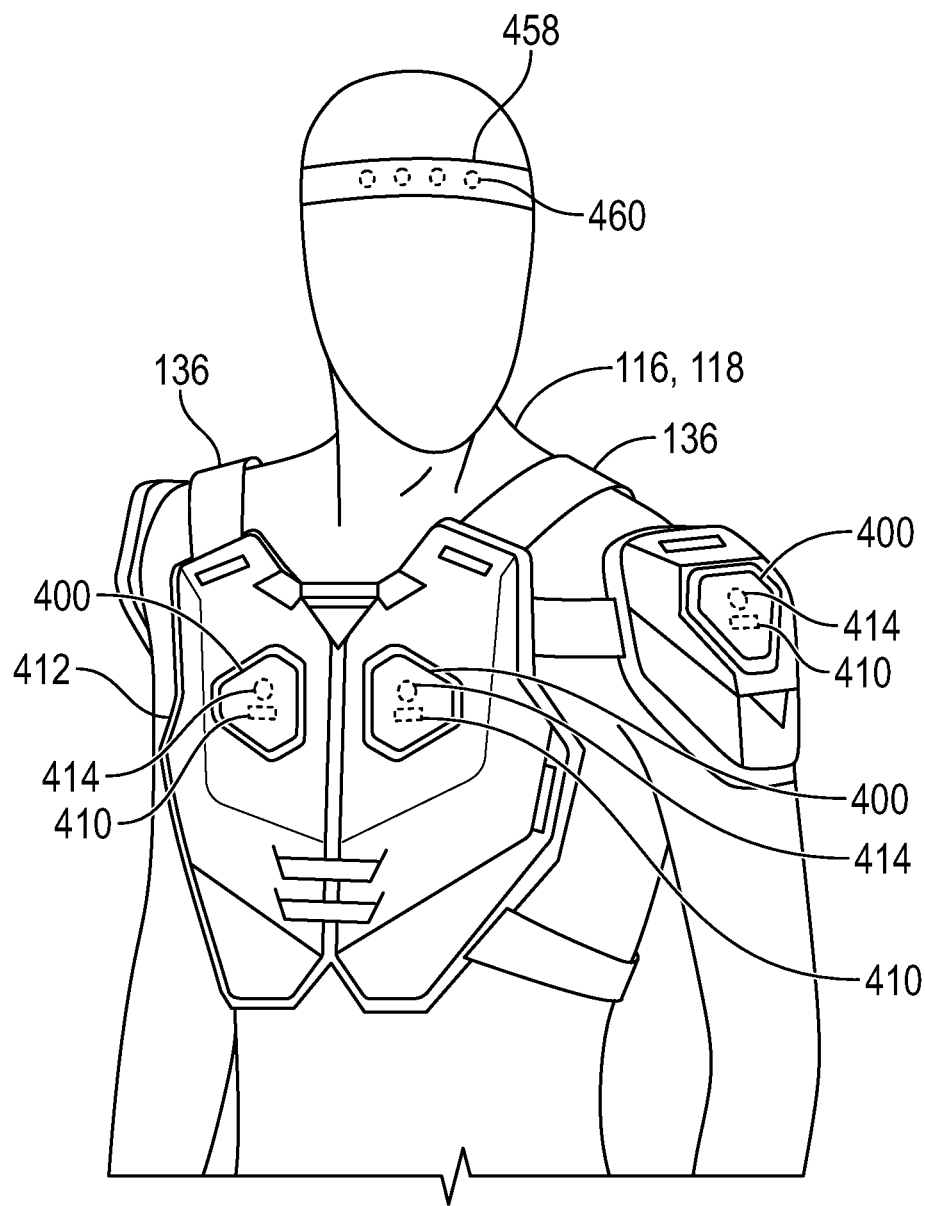
FIG. 10 is a perspective view of a wearable device including smart targets in accordance with a preferred embodiment of the present invention.

As an example, the smart target 400 is affixed to one or more petals of a target system. In an embodiment, the smart target depicted in FIG. 9 includes a central PE sensor 410 and outer "petal" PE sensors 410 configured to detect hit impacts. The same (or similar) modular PE sensor 410 is also configured to be used in connection with wearable vests, for example. Referring now to FIG. 10, FIG. 10 is a perspective view of a wearable device 412 including one or more smart targets 400 in accordance with a preferred embodiment of the present invention. One can see that the PE sensor 410 that forms the center (e.g., central PE sensor 410) and petals (outer "petal" PE sensors 410) of the wearable device 412 are affixed in the central torso portion of the wearable vest depicted in FIG. 2. In addition, the wearable device 412 may include one or more PE sensors 410 on the back of the user's wearable vest or on shoulder portions of the wearable device. In an embodiment, the wearable device 412 is a smart target 400. Depending on the size and sensitivity of the PE sensors, as well as electronic, firmware, or software filtering of the PE sensor's electrical charge (i.e., electrical signal), one or more PE sensors 410 may be trained to determine a successful impact of a projectile (e.g., gellet).

In a preferred embodiment, logic is trained using machine learning (ML) to identify positive strikes against background noise and artifact impacts by identifying the waveform signature (i.e., electrical signal) specific to gellet composition and anticipated material density. For example, logic trained through machine learning obtains training data; a robot (or the like) uses a smart blaster 416 and varies distance, capturing data to understand the waveform signature that a gellet (or other projectile) generates upon a successful hit. In an embodiment, a two-dimensional convolutional ML model may be trained by multiple sensor inputs being provided simultaneously. The captured data provides a model to be utilized by the smart target 400 to detect a successful hit. The hit detection trained model accounts for off-angle impacts, variance of impact pressure, and other physical metrics (i.e., relative location adjacent to the smart target 400) to increase or decrease the amount of "damage" points given to the user upon a successful hit. The machine learning element obtains data for the trained model used by the PE sensor to understand the angle of impact and range of a gellet impact, as but one example.

More specifically, the trained model is generated using machine-learning-assisted noise reduction (e.g., ambient vibration, non-projectile impacts), which may be implemented in hardware, firmware, software, or a combination thereof. Machine learning also may include identification of different materials that may be advantageous to eliminate or reduce noise reduction and provide a "cleaner" waveform signature to be used in creating filtering or the like. Envelope detection and peak detection circuits may be provided for determining characteristic gellet impact signals. This feature is not limited to gellet projectiles, but can be used for all types of projectiles including airsoft, paintball, bow style projectiles, firearms, etc.

The trained model also reduces the ability for "false positive" impacts or cheating, distinguishing non-truthed impacts from real impacts. The accuracy embodied by the trained model eliminates or reduces the necessity for a referee to determine which individual was hit by a projectile, and attribute the hit to another individual. In an embodiment, the smart target 400 includes a filter and amplifier circuit tuned to impact responses for detecting vibration. For example, the filter and amplifier circuit may be configured to eliminate portions of a signal from the PE sensor 410 that are not attributable to a hit by a projectile. As described above, the trained model permits the designer of the filter and amplifier circuitry to understand, based on many multiple projectiles hitting a target with a PE sensor 410, the waveform signature of a successful hit. Thus, the filter and amplifier circuit is preferably designed to eliminate background noise and non-projectile impacts, able to differentiate between real impacts by a projectile and everything else that may occur during gameplay.

In a preferred embodiment, the smart target 400 includes an IR detection sensor 414. Hit detection may be implemented such that if the PE sensor 410 identifies a hit, but the IR detection sensor 414 does not, then the detected hit is not counted as a real strike. In another embodiment, the PE sensor 410 (i.e., hit detection) versus IR sensor 414 (i.e., hit recognition) may be expressed as a ratio and a successful hit is not counted unless the ratio exceeds a particular threshold.

In an embodiment, the IR detection sensor 414 may also confirm the angle at which a projectile hit the target, which in a gameplay environment, may adjust "damage" or "hit points" up or down depending upon the angle of impact, tracked and calculated by the application.

In an embodiment, The IR sensor 414 can be embedded with PE sensor 410. In other embodiments, the IR sensor 414 could be in a different location from the PE sensor 410. Depending on the application; i.e., wearable device 412 vs standalone smart target 410, it may be advantageous to locate the IR sensor 414 near the PE sensor 410, or distanced apart. For example, the distance between the IR sensor 414 and the PE sensor 410 preferably is from ½ centimeter to 2 meters. In addition, there may be advantages to the location of the IR sensor 414 versus the PE sensor 410 at varying ranges. For example, logic trained with machine learning may indicate that optimum distances between the sensors is achievable at ranges in accordance with the application. For example, in a blaster-based gaming environment, it may be advantageous to train logic at distances most likely to be experienced during gameplay (e.g., 50 feet or less).

Referring still to the IR sensor 414, any combination of carrier frequency, emitter LED, and receiver module can be used. IR messaging modules are preferably universal and included to interface with other IR devices. IR modules preferably consist of a high power infrared LED meant for line of sight transmission systems, and an infrared receiver module with matched optical characteristics. The IR modules combined with application features include IR-based universal interaction with the application for actions such as shoot to interact, shoot to pair.

Other sensors or methodologies may be utilized alternatively or in combination with the PE sensor 410 and IR sensor 414 co-witnessing techniques. For example, a brain-computer interface (BCI) based impact detection system may include skin contact electroencephalogram (EEG) sensors (or others) read players' physiological response to being hit by a projectile count it as a hit in the system. The BCI technique may be utilized in combination with IR cowitnessing or other confirmation methods. In addition, computer-vision (CV) aided hit detection may be utilized. For example, cameras or other RF sensitive equipment may watch for projectile impact and use machine learning (ML) to filter noise and false positives. The CV-aided hit detection methodology may be best suited to controlled arena play where external cameras/sensors can be permanently mounted, and cost concerns are mitigated. The CV-aided hit detection methodology utilizes video and/or photo recognition technology to help accuracy and gameplay experience.

Referring still to FIG. 10, a BCI sensor 458 is depicted encircling the head of the user 116, 118. the BCI sensor 458 includes EEG sensors 460 configured to record an electrogram of spontaneous electrical activity of the brain. While the EEG sensors 460 are depicted in certain areas of the BCI sensor 458, they are placed for illustrative purposes only, and one of ordinary skill in the art would recognize that the EEG sensors 460 would be optimally placed in order to accurately monitor and record electrical activity of the brain. For example, a MyndBand EEg headset may be configured to be used in connection with the system disclosed herein. Other headsets or devices are within the scope of the present invention. In other embodiments, a full or partial "helmet" may be utilized to facilitate placement of the EEG sensors 460 on portions of the head of the user 116, 118 that are not covered by the "headband" style headset depicted in FIG. 10.

As with the PE sensor 410, the BCI sensor 458 preferably is configured to filter or reduce noise of the EEG sensors 460 signals by utilizing a trained model. Similar to the descriptions of ML-trained models herein, a blaster 104 is shot multiple times from varying distances and angles to a smart target 400 and data is gathered from the BCI sensor 458 in the form of EEG sensors 460 signals. A trained model can assist the control circuitry of the smart target 400 (or distributed/remote software application and/or circuitry) to filter out false positives by isolating portions or bands of frequencies. This will assist the system in quickly and efficiently determining whether an object that hits the user is a projectile, and may further allow the system to determine impact angle and distance. For example, the signal from the EEG sensors 460 may appear different (e.g., different distribution of frequencies, or reduced intensity at certain frequency bands) at an impact angle of 0° versus 45°. Likewise, the signal from the EEG sensors 460 may appear different at close ranges versus farther ranges (e.g., different intensity or reduced intensity at greater distances).

In a study using a MyndBand EEG headset, EEG monitoring as a means of hit tracking and co-witnessing was researched. The MyndBand, as well as other EEG systems, uses thin and flexible electrodes (e.g., EEG sensors 460) in direct skin contact with areas of the user's head. The flexible electrodes may be mounted in hats, headbands, Gel Blaster masks, or other wearables. The EEG sensors 460 were connected to a small computing device with a Bluetooth transmitter. The resulting data (e.g., signals from the EEG sensors 460) were read and displayed in real-time on a computer or mobile device. The EEG sensors 460 produced signals that was parsed to indicate brainwave changes associated with being hit by a gellet (e.g., projectile).

The study utilized a surprise impact methodology such that the participants were not anticipating being hit by a gellet. The participants were instructed to proceed with routine tasks until a tester used a blaster 104 to hit the users with a gellet. The study results showed a significant change in the EEG sensors 460 signal using different participants upon being hit by a gellet.

In a second phase of the study, the participants were again struck by gellets by surprise, but only half of the time. The other half of the time, the participants would experience the tester shooting the gellet near the participant, but not actually hit the participant. The data from the EEG sensors 460 signals reveals that additional significant brain activity occurred only when the gellet actually made contact.

In addition, the participants were test shot both to the front of the body and the back of the body to ensure the element of surprise. The EEG sensors 460 signals were recorded in real-time. The results indicated that almost all shots captured at short range over a significant amount of time (e.g., 1-2 minutes) successfully showed significant brain activity.

At varying ranges and thus, varying intensities, the EEG sensors 460 signals may vary in their intensity. It may be advantageous to utilize the BCI sensor 458 data as a primary or secondary co-witnessing element (e.g., along with the PE sensor 410, the IR sensor 414, or other suitable co-witnessing elements) depending on the range and reliability of the EEG sensors 460 signals at those ranges. The control circuitry or remote computing device can prioritize the BCI sensor 458 data depending on the gameplay environment, ranges, and other factors.

Still further, a fabric deformation hit detection methodology may be utilized to provide co-witnessing of an impact. "Smart" textile wearables may detect changes in electrical current when deformed from projectile impact. For example, optical fibers or conductive fabrics embedded or weaved into a wearable device 412 or other wearable shirt or vest are within the scope of the present invention. As with the above methodologies, the fabric deformation hit detection methodology may be an additional form of co-witnessing a hit, and may also be utilized with ML for noise (false positive) reduction. In other embodiments, the fabric deformation hit detection methodology may be implemented through use of electronic textiles in which microcontrollers, sensors, and actuators may be integrated into wearable items.

In an embodiment, when one player is closer than a threshold close-quarters distance, the application can turn off gellet (projectile) firing and utilize IR only for hit attribution.

Figure 11:
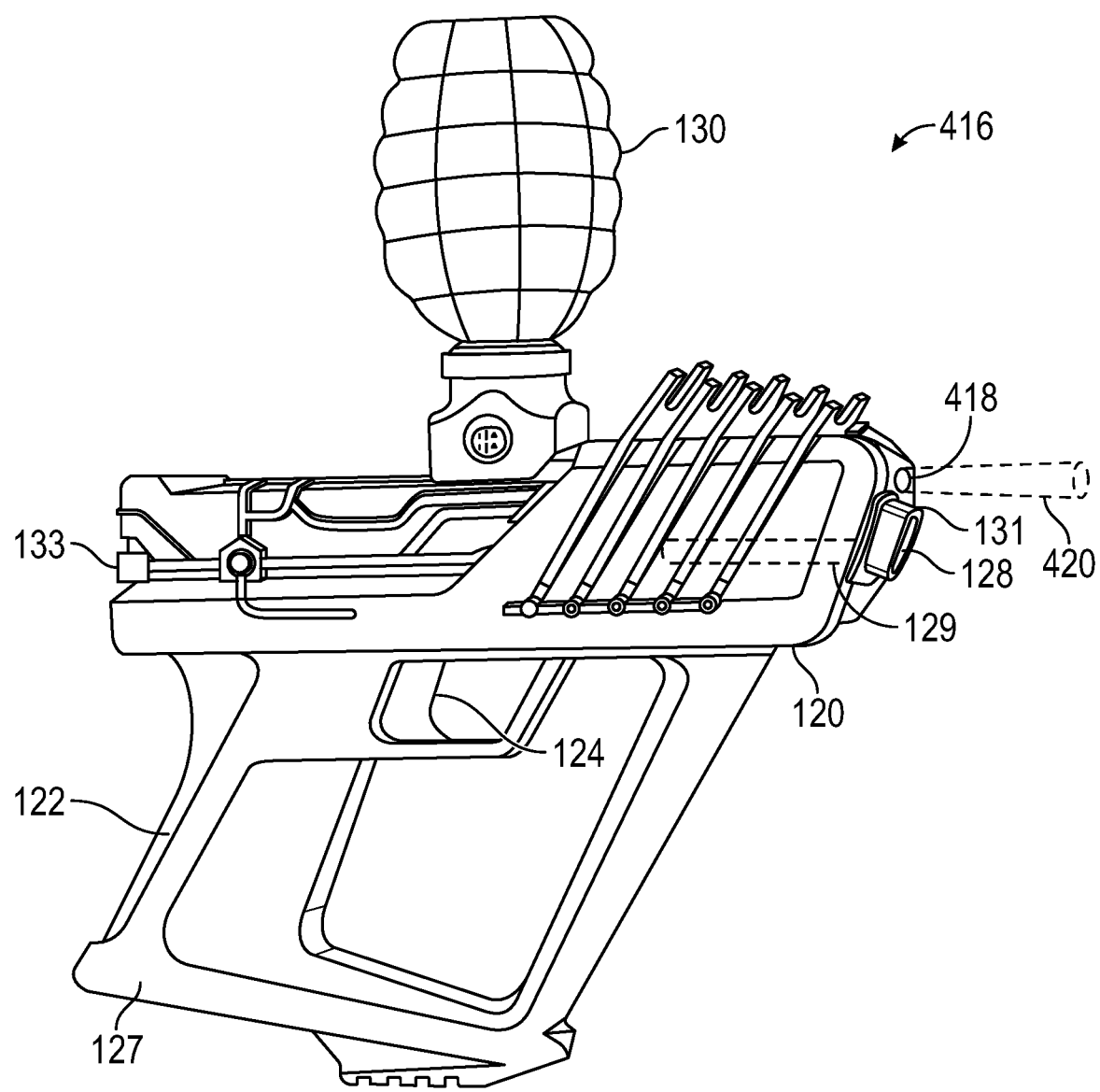
FIG. 11 is a smart blaster in accordance with a preferred embodiment of the present invention.

FIG. 11 is a smart blaster 416 in accordance with a preferred embodiment of the present invention. The smart blaster 416 includes the mechanical and electronic structures described herein to shoot gellets and project IR radiation. The smart blaster 416 preferably includes a wireless networking device configured to transmit and receive data as a node in a wireless network (e.g., mesh network, as described herein). In other embodiments, Hit attribution, in a preferred embodiment, is a combination of hit detection and hit recognition. For example, hit detection includes the ability for a physical object with a PE sensor 410 to detect when the physical object was hit, as described above. In an embodiment, hit detection determines whether an object that strikes at or near the PE sensor 410 is a projectile. Hit detection may also include timer logic between smart blaster 416 and target to associate time of impact to distance of shooter. In addition, triangulation utilizing a mesh network (as more fully described herein) improves higher accuracy in hit detection. These features are used either independently or in combination to verify a correct strike by a correct individual and/or smart blaster 416 associated with the individual.

Hit recognition, in a preferred embodiment, enables co-witnessing of hit detection such that even greater accuracy in hit attribution may be achieved. For example, the smart target 400 includes embedded infrared (IR) detection sensors 414 that may detect hits from multiple angles. The smart blaster 416 (or other projectile-firing device) includes the ability to generate and project (e.g., emit) IR radiation in a beam 420 from an IR emitter 418. The IR emitter 418 includes a beam angle at which the IR radiation is projected that provides a spread/angle over distance. For example, the range of an IR emitter 418 is 50 feet and the optics allow a spread of about 2 degrees, which preferably provides a beam spread of 2 feet at a distance of 50 ft. In another embodiment, the IR emitter 418 spread may be defined as a wider diameter meant to illuminate at an angle where the top of the beam cone corresponds to a straight trajectory, and the bottom of the beam cone corresponds to a smart blaster 416 pointed towards the sky at a certain angle that makes the projectiles have a longer range, and thus the IR beam 420 accounts for projectile drop. A combination of these techniques could be used to accommodate different game modes and play styles. In an embodiment, the smart blaster 416 may include a modifiable emitter 418 that includes two beams 420 having different spread angles. A point blank shot may be a wider beam spread (e.g., 3 degrees) with a larger spread angle while a longer range shout may be a narrower beam spread (e.g., 2 degrees) with a smaller spread angle. The emitter 418 may be configured to automatically switch between the different spread angles IR-based hit detection sensors 414 embedded in the smart target 400, when coupled with smart blasters 416, can maintain bidirectional communication across multiple players and use timer-based co-witnessing to identify, arbitrate, and attribute hits to the corresponding shooter. The smart target technology may be implemented on smart blasters 416 (e.g., emitters 418) and all other objects, including wearables and standalone targets (e.g., receivers 414).

Figure 12:
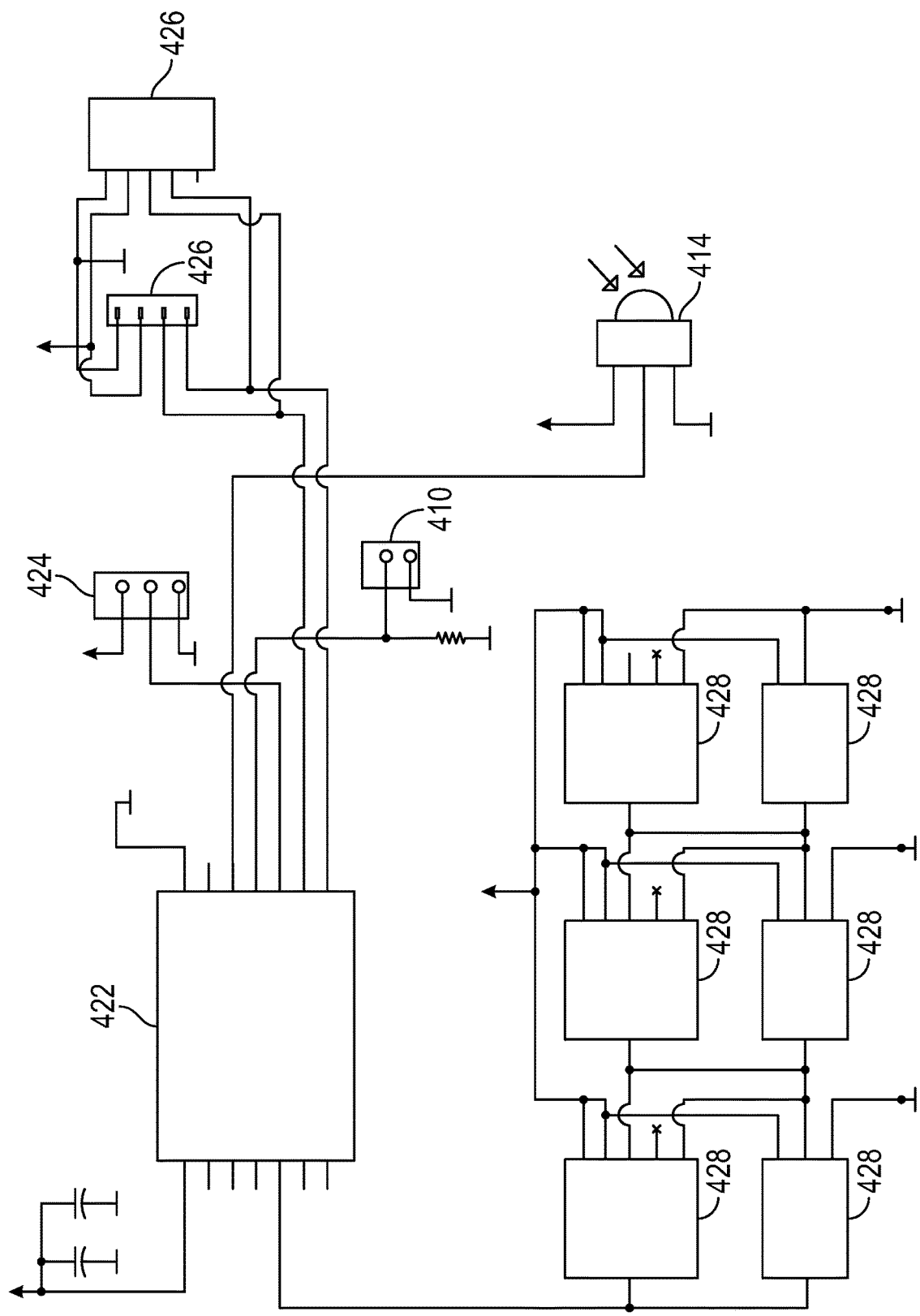
FIG. 12 is a schematic diagram of a circuit for a smart target co-witnessing hit attribution system in accordance with a preferred embodiment of the present invention.

FIG. 12 is a schematic diagram of a circuit for the smart target co-witnessing hit attribution system in accordance with a preferred embodiment of the present invention. The circuit of FIG. 12 is configured to be utilized in connection with the petal portion 404, the outer petals of the smart target 400 depicted in FIG. 9. The circuit depicted in FIG. 11 includes a microcontroller 422 (e.g., ATTINY404SSMCSOIC), a PE sensor 410, a programming chip (e.g., UPDI programming chip) 424, interfaces 426 (e.g., SD1 and SM04B-SRSS-TB(LF)(SN) interfaces), an array of addressable LEDs 428 (e.g., WS2812s), and an IR sensor 414.

The microcontroller 422 depicted in FIG. 11 is a Microchip ATtiny404SSMC-type microcontroller. One of ordinary skill in the art would understand that other microcontrollers are within the scope of the present invention without departing from the present invention. The ATtiny404SSMC microcontroller utilizes high-performance, low-power AVR® RISC architecture. The microcontroller 422 is capable of running up to 20 MHz, with up to 2/4 KB Flash, 128/256 bytes of SRAM, and 64/128 bytes of EEPROM in a 14-pin package. The microcontroller 422 utilizes a flexible and low-power architecture including Event System and Sleep-Walking, accurate analog features, and advanced peripherals. The microcontroller 422 includes PIEZO_IN and IR_SENSOR for piezo sensor 410 and IR sensor 414 inputs.

The PE sensor 410 is a piezoelectric sensor configured to detect impacts at or near the physical location of the PE sensor 410. The programming chip 424 is a Microchip Unified Program and Debug Interface (UPDI) configured for external programming and debugging of the device. The interfaces 426 are SD1 and SM04B-SRSS-TB(LF)(SN) interfaces that are configured to receive I2C SCL and SDA signals. The SCL and SDA signals are data and clock signals, respectively. The array of addressable LEDs 428 is configured to drive LEDs or LED strips to light up portions of the petal portions 404. One of ordinary skill in the art would understand that other components may be utilized to achieve the electronic circuit and functionality represented by the circuit of FIG. 12, including a different programming chip 424, interfaces 426, and addressable LEDs 428.

Figures 1, 13:
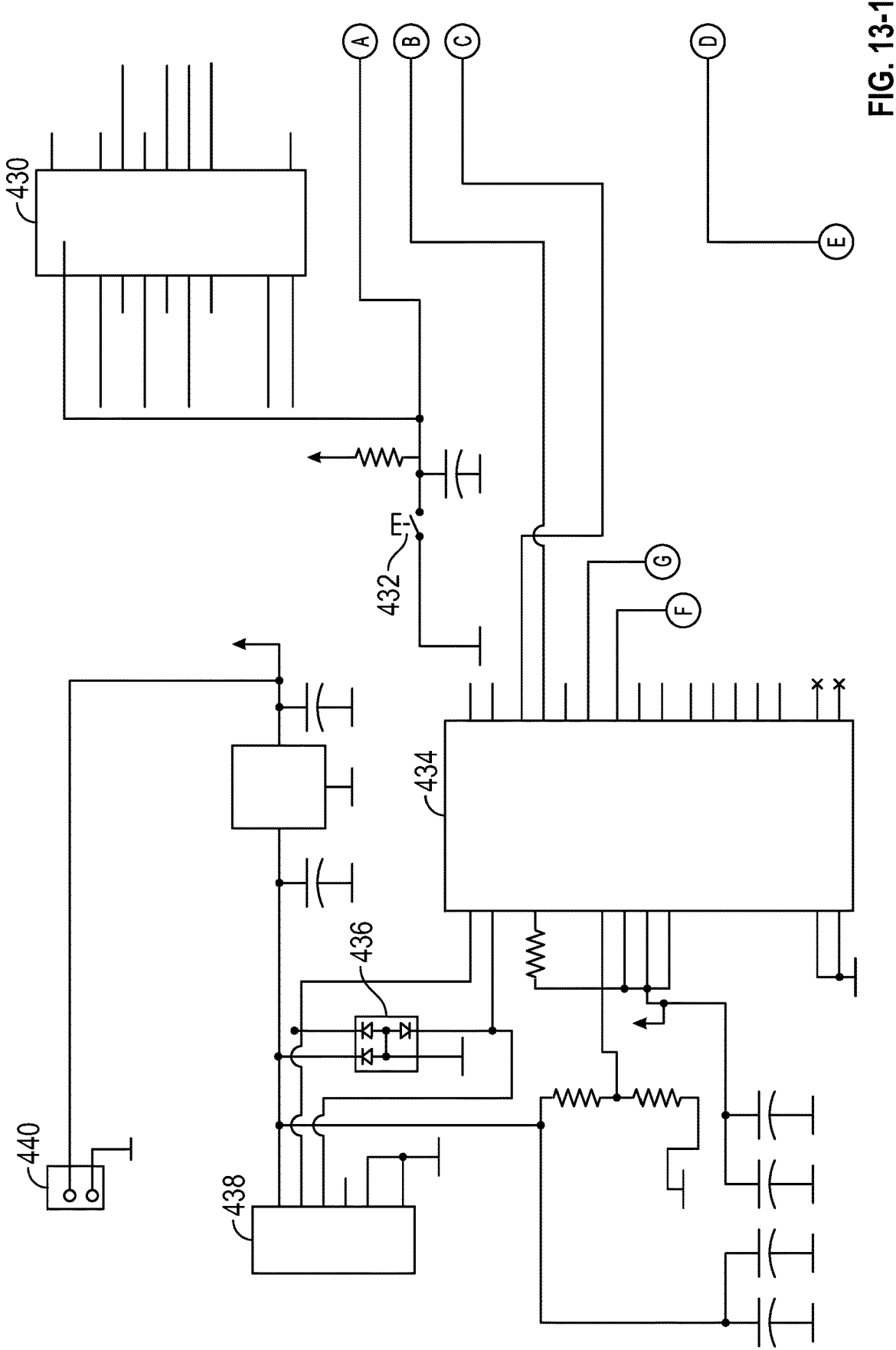
Figures 2, 13:
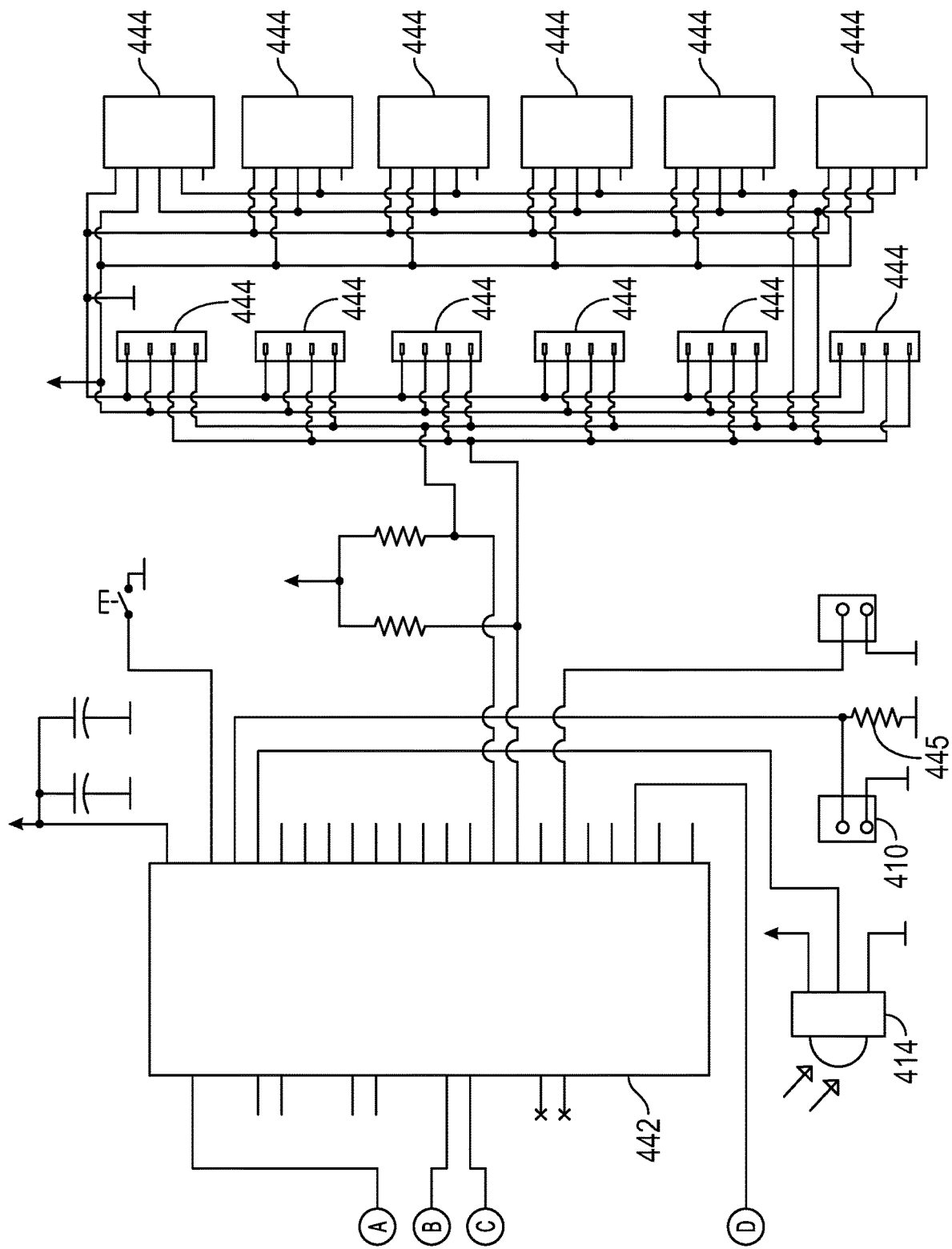

FIGS. 13-1, 13-2, and 13-3 depict portions of a schematic diagram of a circuit for a smart target co-witnessing hit attribution system in accordance with a preferred embodiment of the present invention. The circuit of FIGS. 13-1, 13-2, 13-3 is configured to be utilized in connection with a "pistil," the center portion 402 of the smart target 400 of FIG. 1. The circuit of FIGS. 13-1, 13-2, and 13-3 include a microcontroller 430, a switch 432, a USB driver 434, a fuse 436, a USB receptacle 438, an external battery 440, an alternate microcontroller 442, an IR sensor 414, a PE sensor 410, interfaces 444, and an array of addressable LEDs 446. Instead of an ATTINY404SSMCSOIC microcontroller 422, an ESP32-WROOM-32E microcontroller 430 is shown in FIG. 13-1. The ESP32-WROOM-32E microcontroller 430 is a Wi-Fi+Bluetooth+Bluetooth LE MCU module that is configured for low-power sensor networks and voice encoding, music streaming and MP3 decoding. The ESP32-WROOM-32E includes a PCB antenna. One of ordinary skill in the art would understand that other microcontrollers are within the scope of the present invention without departing from the present invention. The microcontroller 430 includes PIEZO_IN and IR_SENSOR for the PE sensor 410 and the IR sensor 414 inputs. FIG. 13-1 also depicts the switch 432, configured to switch between the microcontroller 430 and the alternate microcontroller 442, the USB driver 434 configured to provide power to the circuit, a fuse 436 in connection with power operation, the USB receptacle 438 configured to receive a USB power input, and an external battery 440 configured to power the device when not connected to USB power. Designations of A-G indicate connections of the circuit to the components shown on FIGS. 13-2 and 13-3.

FIG. 13-2 shows an alternate microcontroller 442 (e.g., ESP32-C3-WROOM-02-N4) in place of the previously described microcontroller 430. The ESP32-C3-WROOM-02 microcontroller 442 includes Wi-Fi and Bluetooth LE modules, 4 MB external SPI flash, and an on-board PCB antenna. FIG. 13-2 also depicts the PE sensor 410 and the IR sensor 414 as well as the array of interfaces 444 (as opposed to single SD1 and SM04B-SRSS-TB(LF)(SN)) interfaces).

The portion of the circuit depicted in FIG. 13-2 also includes a filtering resistor 445 to filter the PE sensor 410 signal before it is input into the microcontroller 442. In an embodiment, the filtering resistor 445 to filter the PE sensor 410 signal in FIG. 13-2 is chosen so that the peak of the detected signal output is set to a certain voltage. If the value of this resistor is changed, the peak voltage shown by the projectile impact will change as well. Filtering to increase detection accuracy may involve including a circuit that allows changing this resistor value in real time to decrease or increase the device sensitivity. In another embodiment, the IR emitter 418 spread may be defined as a wider diameter meant to illuminate at an angle where the top of the beam cone corresponds to a straight trajectory, and the bottom of the beam cone corresponds to a smart blaster 416 pointed towards the sky at a certain angle that makes the projectiles have a longer range, and thus the IR beam 420 accounts for projectile drop. A combination of these techniques could be used to accommodate different game modes and play styles.

Other filtering techniques could be implemented in the circuit or in firmware/software. For example, an envelope detector to wrap a gellet waveform may be utilized. A peak detector circuit may also be utilized, in which an output only would be provided to the microcontroller as a high signal when the voltage is above a peak voltage threshold. The output of a "high" signal may also reduce sampling requirements. A bandpass filter may also be utilized to tune the circuit and isolate the waveform signature. Combinations of these filtering techniques could be utilized. The ML trained logic is utilized to determine the best filtration techniques to fit the particular application (e.g., gellet impact on a stand-alone target).

Hit attribution technologies embedded in the smart target and associated circuitry, firmware, and software can be expanded to include other input sources such as smartphone microphones (or standalone microphones). For example, identification and inventory of gellet acoustic signatures may be differentiated against background noise and artifacts for increased accuracy. The acoustic signatures may be added to the PE sensor 410/IR sensor 414 logic to achieve increased accuracy, or any combination of these hit attribution sources of data may be used separately to provide an appropriate level of accuracy, depending on a variety of factors including complexity of the device, cost, manufacturing difficulty, or other factors. A smartphone could also provide other sources of data to the application, including GPS or other sensor data to integrate to achieve increased accuracy of hit attribution. In place of a smartphone, or in combination, a wearable or standalone device could implement the other sensor data to increase accuracy. For example, a standalone device at a known location relative to the impact location may be utilized to determine distance (e.g., echos), to provide additional sensor data for the application to utilize to increase accuracy.

Figures 3, 13:
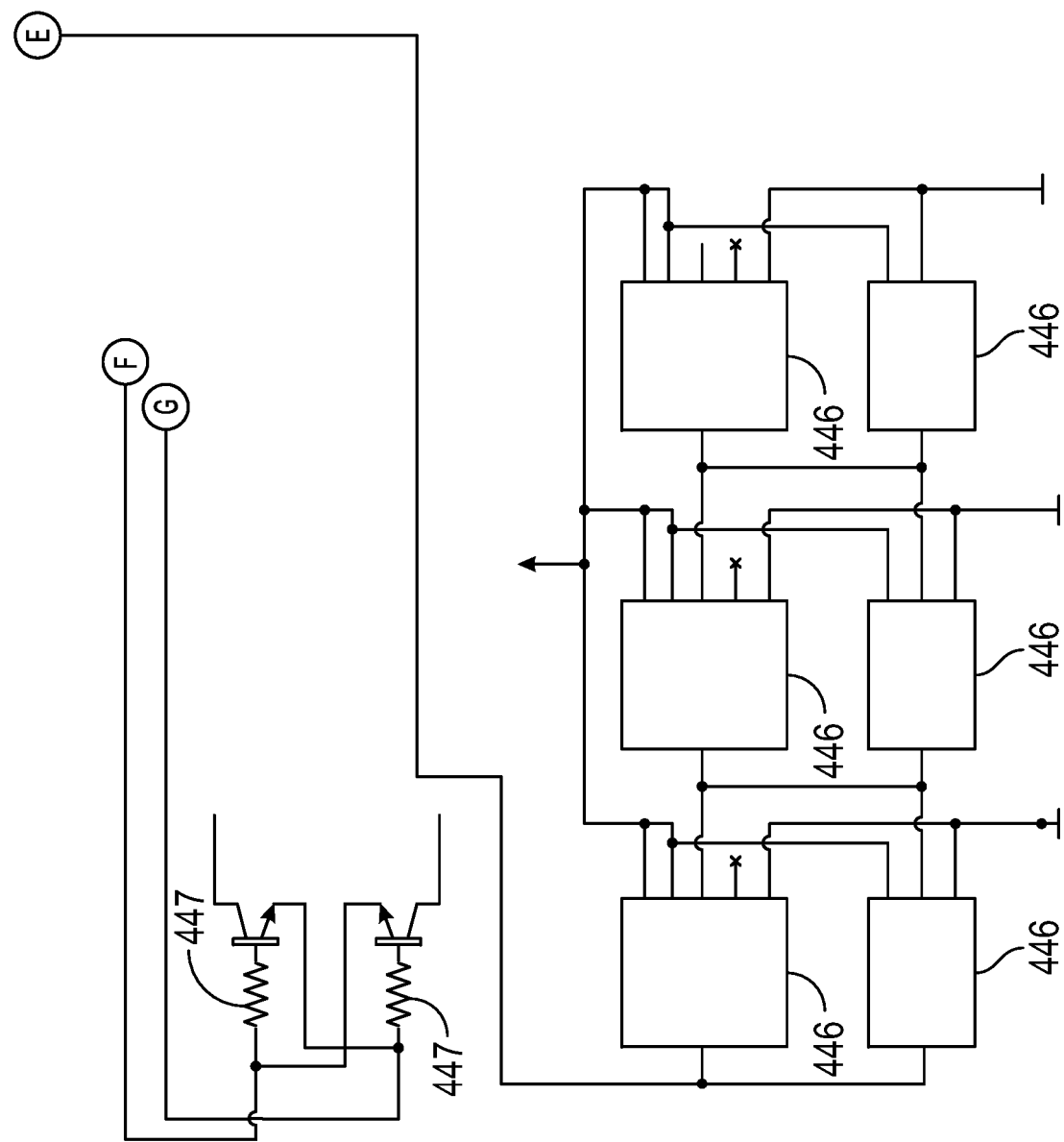

FIG. 13-3 shows the array of addressable LEDs 446 (e.g., WS2812s) and transistors 447 coupled to the data control input/output of the USB driver 434.

In a preferred embodiment, to provide real-time or near-real-time score tracking, it is advantageous to categorize the trained model from ML datasets as a key from a database and efficiently broadcast the key as a hexadecimal identifier over low-latency communications. This "minimal" approach achieves efficient transmission and reception of data to be utilized by the application to track scores and provide scoring data to players in a gaming environment.

FIGS. 14-17 depict exemplary smart target 400 mesh networks in accordance with preferred embodiments of the present invention. The target mesh networks depicted in FIGS. 14-17 may be utilized independently or in combination with each other. The target mesh networks of FIGS. 14A and 14B are built around a Bluetooth Low Energy (BLE) topology/protocol. The BLE protocol may utilize mesh networking to implement many-to-many communication. FIG. 14A depicts a basic BLE mesh network including a router 448, phone 450, root 452, and a plurality of nodes 454. The BLE mesh network in connection with an embodiment of the present invention is configured to control multiple Bluetooth-enabled devices from a single root 452. In the network topology represented in FIG. 14A, the root 452 controls all three nodes 454 by use of a publish/subscription model. The child nodes 454 are subscribed to the parent node 454 and the parent node 454 is publishing messages to the child nodes 454.

Figure 14B:
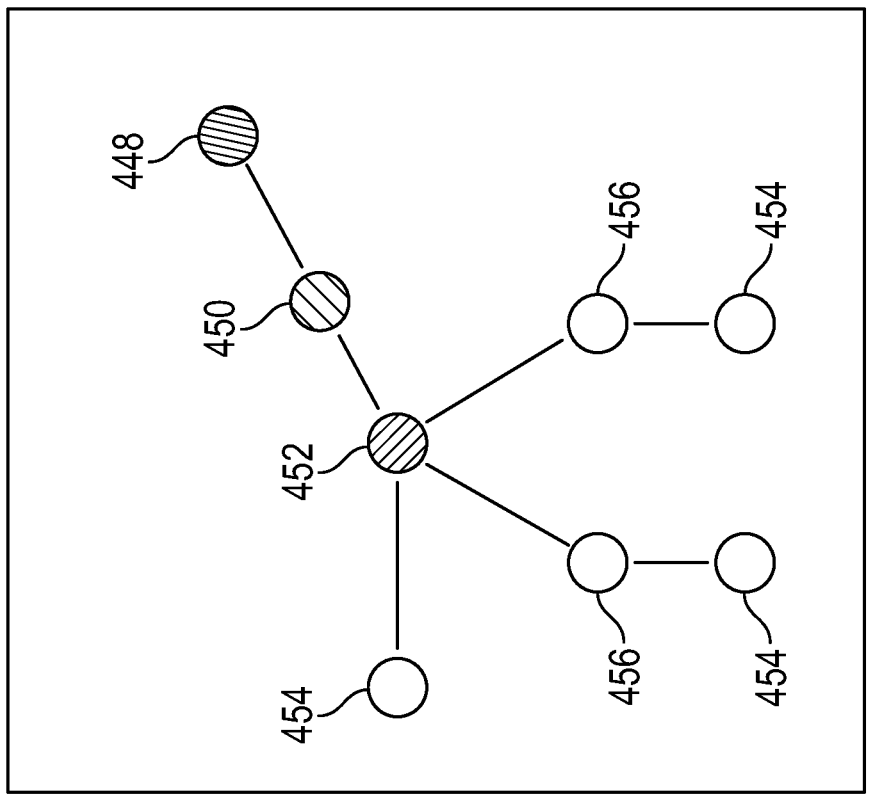
FIG. 14B is a diagram of an exemplary smart target mesh network in accordance with a preferred embodiment of the present invention.
Figure 14A:
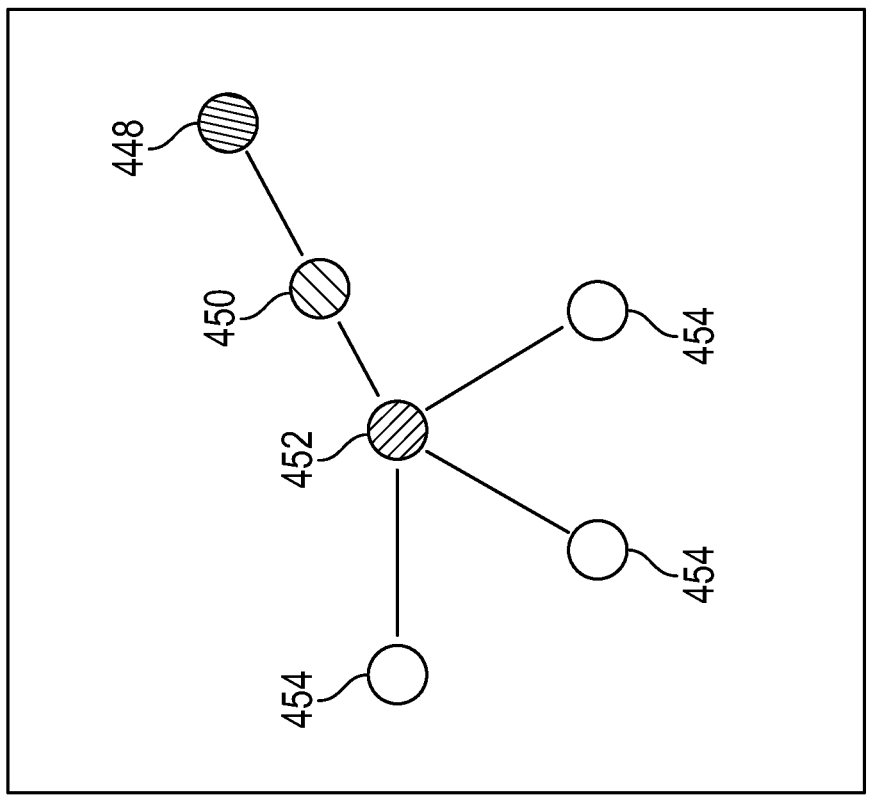
FIG. 14A is a diagram of an exemplary smart target mesh network in accordance with a preferred embodiment of the present invention.

FIG. 14B also depicts a basic BLE mesh network with a router 448, a phone 450, a root 452, nodes 454, and relay nodes 456. The relay nodes 456 are utilized to propagate child nodes 454 and move data downstream.

Figure 15C:
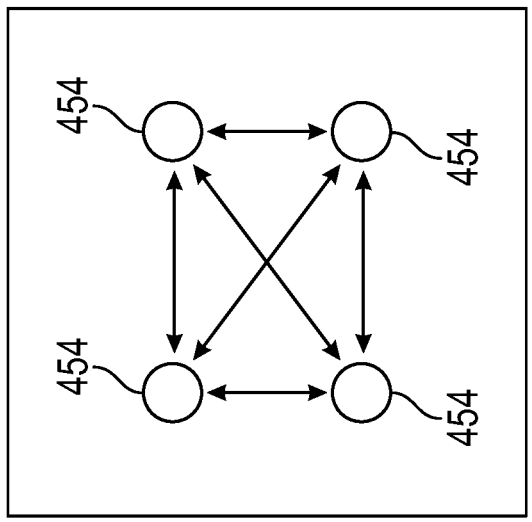
FIG. 15C is a diagram of an exemplary smart target mesh network in accordance with a preferred embodiment of the present invention.
Figure 15B:
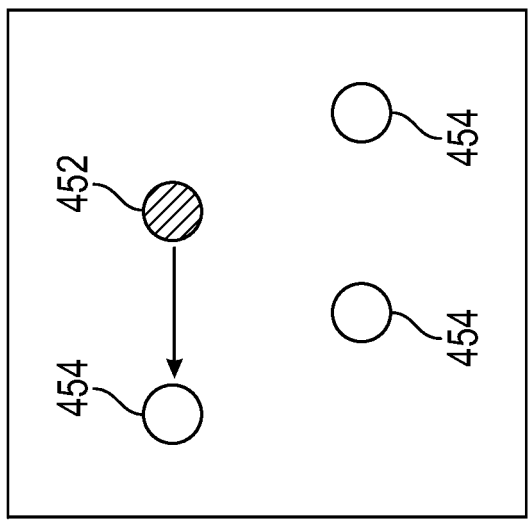
FIG. 15B is a diagram of an exemplary smart target mesh network in accordance with a preferred embodiment of the present invention.
Figure 15A:
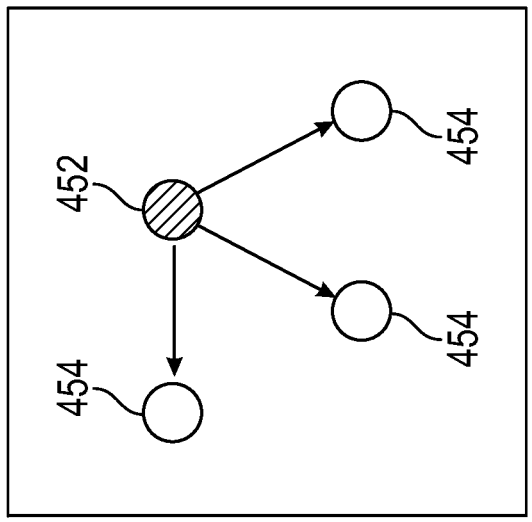
FIG. 15A is a diagram of an exemplary smart target mesh network in accordance with a preferred embodiment of the present invention.

The target mesh networks of FIGS. 15A, 15B, 15C are built around an ESP-NOW topology/protocol. The ESP-NOW protocol enables multiple devices to communicate with one another without using Wi-Fi, and is similar to low-power 2.4 GHz wireless connectivity utilized in certain low-power devices. In FIG. 15A, there is shown a Broadcast Mode in which small packet messages are broadcast to all devices from the root 452 to the nodes 454. The message packets include sender ID and payload. In FIG. 15B, there is shown a Direct Message mode in which a direct message is sent from a root 452 to a device (e.g., node 454). In FIG. 15C, there is shown a Game State Broadcast mode in which a game state broadcast is sent from each device (node 454) in accordance with a predetermined interval. The current game state payload contains target hit counts and target miss counts. When receiving a Game State Broadcast message, the smart target 400 sets its active state after comparing the incoming message with its current state. The higher counts are then set as the target's active state. The target then sends a Game State Broadcast.

Figure 16C:
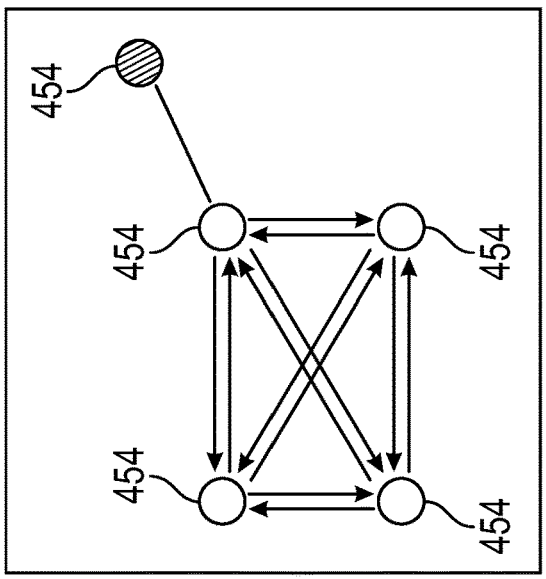
FIG. 16C is a diagram of an exemplary smart target mesh network in accordance with a preferred embodiment of the present invention.
Figure 16B:
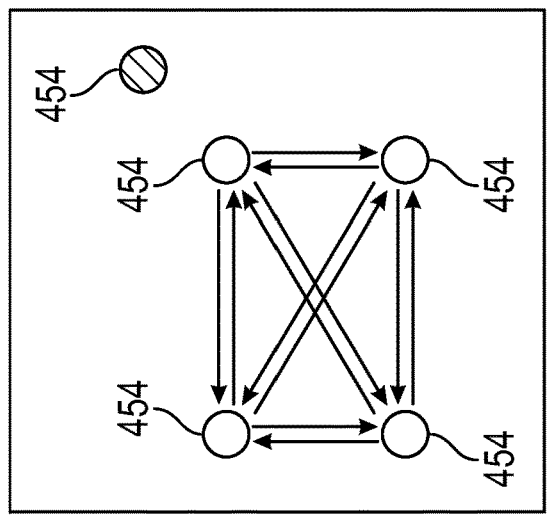
FIG. 16B is a diagram of an exemplary smart target mesh network in accordance with a preferred embodiment of the present invention.
Figure 16A:
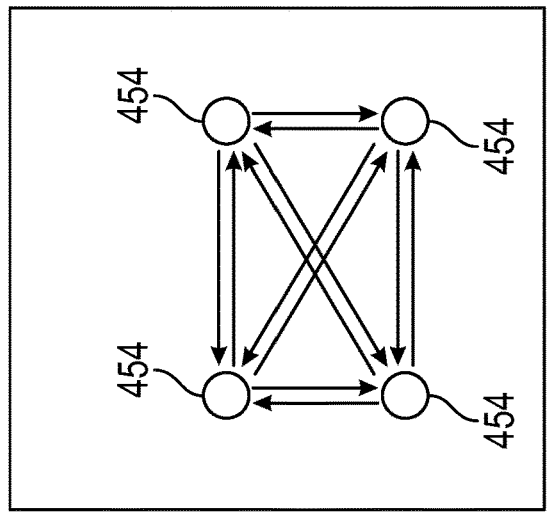
FIG. 16A is a diagram of an exemplary smart target mesh network in accordance with a preferred embodiment of the present invention.

The target mesh networks of FIGS. 16A, 16B, 16C consist of a self-organizing and self-healing WiFi mesh network. FIG. 16A illustrates a self-organizing mesh network in which a node 454 is configured to connect with other nodes autonomously. In an example, each of the nodes 454 depicted in FIG. 16A are communicating with each other within the mesh network. The mesh network depicted in FIG. 16A permits multiple devices (i.e., nodes 454) to communicate with each other without the need for a router 448 through a wireless local area network. FIG. 16B illustrates a node 454 that is out of range (shown as a shaded node 454), and thus, not connected to the mesh network. When the node 454 comes back into range, communication with the node 454 is reestablished because of the constant provisioning protocol (as more fully described herein). FIG. 16C shows a connection to a node 454 (shown as a shaded node 454) that was out of range and lost connection, but reestablishes communication with a node 454 when it is within range of that particular node 454. Once communication is reestablished, the formerly out of range node 454 is able to transmit and receive data with the mesh network. This methodology is referred to as "self-healing" and can be maintained within a self-organizing mesh network autonomously.

Figure 17C:
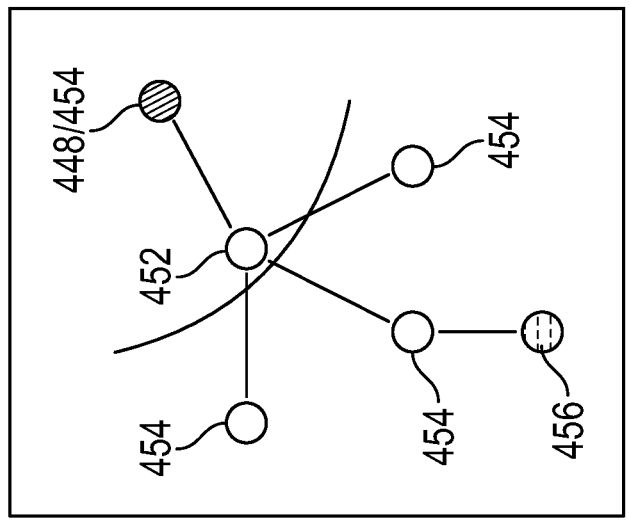
FIG. 17C is a diagram of an exemplary smart target mesh network in accordance with a preferred embodiment of the present invention.
Figure 17B:
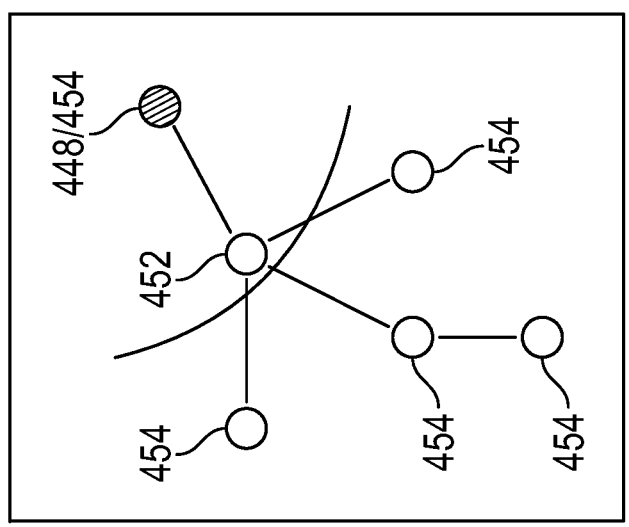
FIG. 17B is a diagram of an exemplary smart target mesh network in accordance with a preferred embodiment of the present invention.
Figure 17A:
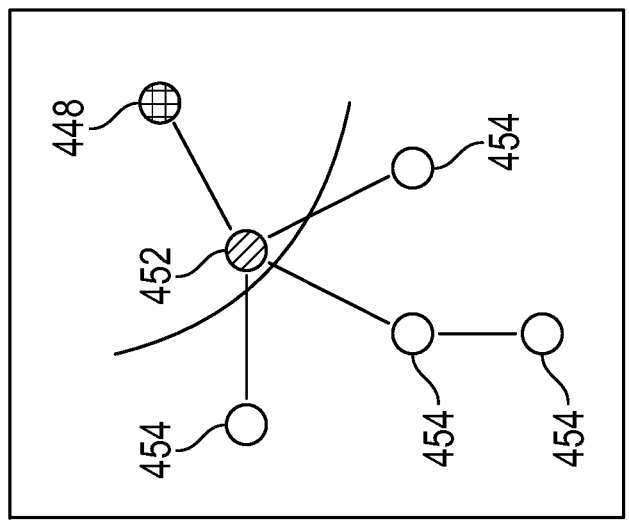
FIG. 17A is a diagram of an exemplary smart target mesh network in accordance with a preferred embodiment of the present invention.

The target mesh networks of FIGS. 17A, 17B, 17C are WiFi mesh networks. FIG. 17A illustrates a basic WiFi mesh network in which the effective range of a router 448 is extended. Multiple nodes 454 within the network permit data to be transferred across the entire network, even if a particular node 454 may have been out of range of the router 448. The line depicted in the graphic illustrates the range of the router 448, in which only the root 452 is within range; however, the nodes 454 are configured to be connected to the root 452 (and other nodes 454) within the network to maintain connectivity and the exchange of data. FIG. 17B illustrates a mesh network where the router 448 and root 452 are integrated, thereby eliminating the necessity for a separate router 448. FIG. 17C illustrates a mesh network with a backup router 456, configured such that a node 454 of the network is also configured to be a router 448. Thus, if the first router 448 in the network loses functionality, the backup router/node 456 may be utilized to continue to facilitate communication with the nodes 454.

FIGS. 14-17 illustrate preferred embodiments of the present invention. Preferably, the smart target 400 system will adapt a wireless connection module-type that allows for multiple smart targets 400 to be connected to the same network and function as nodes 454 to selectively increase gameplay complexity, as well as expand the network coverage area, thus increasing the gameplay area size. Mesh networking will also uniquely allow for the low-latency broadcast of messages and commands to all players 116, 118 and devices in the network despite line-of-sight limitations existent in other systems.

In preferred embodiments, achieving real-time or near-real-time communication via a mesh network may include WiFi without traditional TCP/IP protocol, simplified message IDs, and/or device IDs. For example, simple messaging transmits single packets blindly, or until an acknowledgement is received on its complementary receiver. Data link messaging may establish a connection through simple messaging, then begins to transmit continuously through an error-corrected protocol.

In a preferred embodiment, low-latency communications may be implemented through a unique protocol. For example, the smart target system (and blasters) make use of a unique protocol to transmit information throughout the network with minimal data package size. The reduction of bandwidth required and usage of high-throughput wireless networks can broadcast information that pertains to gameplay in a number of different factors and controls.

FIG. 18 is a table of a message protocol 458 in accordance with a preferred embodiment of the present invention. The message protocol 458 depicted in FIG. 18 includes "Dev Mode" 460 and "Game Mode" 462 for smart targets 400 and the application 464. "Dev Mode" 460 is a developer's mode 460 that includes Commands 466 for the smart targets 400 such as Set Target Index 468, Clear All Hit Count 470, Time Between Cycles 472, Cycles Between Hits 474, Start Slice Min Value 476, Minimum Read Value 478, and Hit Read Value 480. Commands for the application 464 include Sensor Hit Count 482, Dev App Settings 484, and Dev Sensor Readings 486. The "Game Mode" 462 is a mode used to facilitate communication between nodes 454 during a gameplay session that includes Commands 466 for the smart targets 400 such as Reset All Targets 488, Activate Target 490, and Color Test 492. Commands 466 for the application 466 include Hit Message 494, Miss Message 496, and Active State 498. The Dev Mode 460 is for developers or programmers of the gameplay environment and development of features for gameplay. The Dev Mode 460 is also utilized to develop future physical functions of the smart targets and smart target systems. The Dev Mode 460 is preferably configured to develop ML trained logic for use with the PE sensor 410 or other sensors as described herein.

The Game Mode 462, as described herein, includes separate Target 400 and App 464 protocols 458. Referring to the Game Mode 462 for the App 464, in a preferred embodiment, once a smart target 400 is hit, the target 400 will broadcast a message with an ID 500/Parameters 502 structure (i.e., the Hit Message Command 494). For example, the hexadecimal ID 500 for a Hit Message Command 494 is 0xAA, identifying the message type. The Parameters 502 portion of the protocol 458 is an array of hexadecimal values (indices) configured to keep track of a hit count for each of the seven targets' hit counts 504 in the gameplay mode (e.g., Target 1 Hit Count . . . Target 7 Hit Count; Target 1 Miss Count . . . Target 7 Miss Count). The Player ID 506 portion of the Parameters 502 portion of the protocol 458 identifies a player associated with the target hit. The application/client 464 is configured to recognize each ID 500 type of the protocol 458 and configured to receive and recognize a particular number of Parameters 502 and process them accordingly. For example, the Hit Message 494 displays the number of times each designated panel has been hit by gellets on the mobile app. The Miss Message 496 displays the number of times gellets were fired but did not hit the designated (and connected) panel on the mobile app. The Target Miss Count 508 Command 466 is needed for scoring in individual game modes as some games will take into account the accuracy of a user's 116, 118 fired gellets. The Active State 498 shows which of the panels are activated or not. The App 464 Game Mode 462 therefore is configured to receive and display the Hit Message 494, Miss Message 406, and Active State 498 in accordance with embodiments of the present invention as described herein.

Referring still to FIG. 18, the Target 400 Game Mode 462 includes Reset All Targets 488, Activate Target 490, and Color Test 492 Commands 466. The Reset All Targets 488 Command 466 resets each of the connected panels to the null or a deactivated state. The Activate Target 490 Command 466 activates all of the connected panels to be ready for the game to begin. The Color Test 492 Command 466 lights up the panels in a connected smart target with a custom color from individual Red, Blue, and Green hex values. In a preferred embodiment, the custom colors are determined in accordance with the Target States of FIG. 19.

The Activate Target 490 Command 466 includes Target State 510 Parameters 502 Target 0 State 510, Target 1 State 510 . . . Target 6 State 510. FIG. 19 is a table of smart target 400 Target States 510 in accordance with a preferred embodiment of the present invention. In accordance with FIG. 19, there is disclosed 256 possible Target States 510 each specified by an ID 512 in a hex value. For example, the "Off" 516 Target State 510 is associated with the ID 512 0x00 hex value. Each ID 512 and Target State 510 are also associated with a Color 514; for example, the ID 512 of 0x00 and Target State 510 "Off" 516 is associated with Color 514 #000000 (i.e., no color). FIG. 19 identifies other Target States 510 (i.e., State column) of Hit 518, Miss 520, BT (i.e., Bluetooth) not connected 522, BT connected 524, Player 1 527, and Player 2 528. Other Target States 510 are possible in accordance with embodiments of the present invention. The Color 514 column of the Target States 510 protocol identifies the hex value (e.g., hex code) of the color, and in parentheses, the actual color associated with the hex value. For example, Magenta 530 is ascribed a hex value of #FF00FF, Green 532 is ascribed a hex value of #00F00, Red 534 is ascribed a hex value of #FF0000, Yellow 536 is ascribed a hex value of #FFFF00, Cyan 538 is ascribed a hex value of #00FFFF, and Blue 540 is ascribed a hex value of #0000FF. For example, each hex value indicates amounts of Red/Green/Blue. The hex value #FF00FF specifies an RGB value of R=255, G=0, and B=255. In an embodiment, the Color Test 492 Command 466 is a way to test specific colors by providing the red, green, and blue hex values. The Target States 510 in FIG. 19 have a predefined color assignment and only give information about the current state of each panel. Target State 510 will tell the app 464 whether the panel has received a miss or a hit, it will also communicate the Bluetooth connection state of the smart target 400 device as a whole, among other states.

The Parameters 502 portion of the App 464 Game Mode 462 for the Activate Target 488 Command 466 includes Target 1 State 510 . . . Target 7 State 510, and Player ID 506. The Target 1 State 510 . . . Target 7 State 510 identifies the current Target State 510 in accordance with FIG. 19. The Player ID 506 is the identifier for each connected smart blaster 416.

Still referring to FIG. 19, there is illustrated the target states 510 of a smart target 400 in accordance with a preferred embodiment of the present invention. In an embodiment, the 'Off' 516 state represents the panel is turned off and not detecting impacts. The 'Hit' 518 state is communicated when the panel is hit by a gellet. The 'Miss' 520 state is communicated when the panel is missed by a gellet (by time out or by hitting another panel). The 'BT not connected' state 522 is communicated when the smart target 400 is not connected to a user's phone with Bluetooth. The 'BT connected' state 524 is communicated when the smart target 400 is connected to a user's phone with Bluetooth. The 'Player 1' state 526 is communicated when the smart target 400 is connected to a user's phone and the user is denoted as Player 1 in the mobile app. The 'Player 2' state 528 is communicated when the smart target is connected to a user's phone and the user is denoted as Player 2 in the mobile app.

FIG. 20 is a table of a message protocol 542 in accordance with a preferred embodiment of the present invention. FIG. 20 depicts a message protocol 542 that is an alternative embodiment to the message protocol 458 of FIG. 18. In FIG. 20, the "Game Mode" 462 is a mode used to facilitate communication between nodes 454 during a gameplay session that includes Commands 466 for the smart targets 400 such as Reset All Targets 488, Activate Target 490, similar to those same commands depicted and described in connection with FIG. 18. Commands 466 for the application 464 include Hit Message 494, Miss Message 496, and Active State 498. The Commands 466, ID 500, and Parameters 502 portions of the message protocol 542 generally function similarly to the same portions of the message protocol 458, as further described herein. Notably, however, the Parameters 502 portion of the message protocol 542 use the nomenclature "Pad" instead of "Target." However, the nomenclature "Pad" can be substituted for the term "Target"

as the "Pad" is a portion or area of the smart target 400 such as the pistil portion 402 and the petal portions 404.

In addition, the message protocol 542 includes additional Commands 466 relating to the Target 400 portion of the protocol 542 such as Deactivate Target 544, Activate Pad 546, Activate Hidden Pad 548, Set All Color 550, Set Color State 552, Set Device Name 554, and Set Device Mode 556. The Deactivate Target 544 Command 466 is configured to deactivate the smart target 400, conceivably in a scenario in which, according to the gameplay configuration, the target has been taken out by gellet hits and is no longer active. The Activate Pad 546 Command 466 is configured to activate a portion or area of the smart target 400, such as only the pistil portion 402 or one of the petal portions 402. The Activate Hidden Pad 548 Command 466 is configured to activate a pad (e.g. pistil or petal portions 402, 404) that has previously been hidden in accordance with the gameplay configuration by the software application. The Set All Color 550 Command 466 is configured to set the color of each of the pads to a specified RGB hex value. The Set Color State 552 is configured to set the color of specified pads (e.g., Pad 0 State) to a particular color. The Set Device Name 554 Command 466 is configured to specify a particularized name for a device (e.g., node 454 or smart target 400) using an array of hex values. The Set Device Mode 556 Command 466 is configured to set a Device Target Mode 560 in accordance with the Target Modes 560 depicted in the table of FIG. 21B.

The message protocol 542 includes the additional Command 466 relating to the App 464 portion of the protocol 542 of Display State 558. The Display State 558 Command 466 is configured to display the particular Target State 510. In an embodiment, the Target State 510 is displayed on the application 464 to the user 116, 118.

FIG. 21A is a table of smart target 400 Target States 510 in accordance with a preferred embodiment of the present invention. In accordance with FIG. 21A, there is disclosed 256 possible Target States 510 each specified by an ID 512 in a hex value. For example, the "Off" 516 Target State 510 is associated with the ID 512 0x00 hex value. Each ID 512 and Target State 510 are also associated with a Color 514; for example, the ID 512 of 0x00 and Target State 510 "Off" 516 is associated with Color 514 #000000 (i.e., no color). FIG. 21A identifies other Target States 510 (i.e., State column) of Hit 518, Miss 520, BT (i.e., Bluetooth) not connected 522, BT connected 524, Player 1 527, and Player 2 528. Other Target States 510 are disclosed as "(Active)" states. The Color 514 column of the Target States 510 protocol identifies the hex value (e.g., hex code) of the color, and in parentheses, the actual color associated with the hex value. Each of the colors depicted in FIG. 19 are repeated in FIG. 21A. In addition, Orange 562 is ascribed a hex value of #FF4000, Light Green 564 is ascribed a hex value of #C9FF00, and Teal 566 is ascribed a hex value of #00FF2A.

FIG. 21B is a table of smart target 400 Target Modes 560 in accordance with a preferred embodiment of the present invention. The Target Modes 560 are configured to operate the colors of the smart targets 400 in accordance with a prescribed animation or gameplay configuration. For example, an ID 568 and State 570 indicate the specific hex value and associated information about the state of the Target Mode 560. A Rainbow Animation 572 is configured to display a rainbow display of color on the smart target 400. A Flipper Game 574, a Eliminator Game 576, and a IR Dev Game 578 are all configured to operate colors and timing of the colors in connection with a particular gameplay configuration. One of ordinary skill in the art would understand that a variety of animations and gameplay configurations are within the scope of the present invention and those depicted in FIG. 21B are exemplary.

Figure 22A:
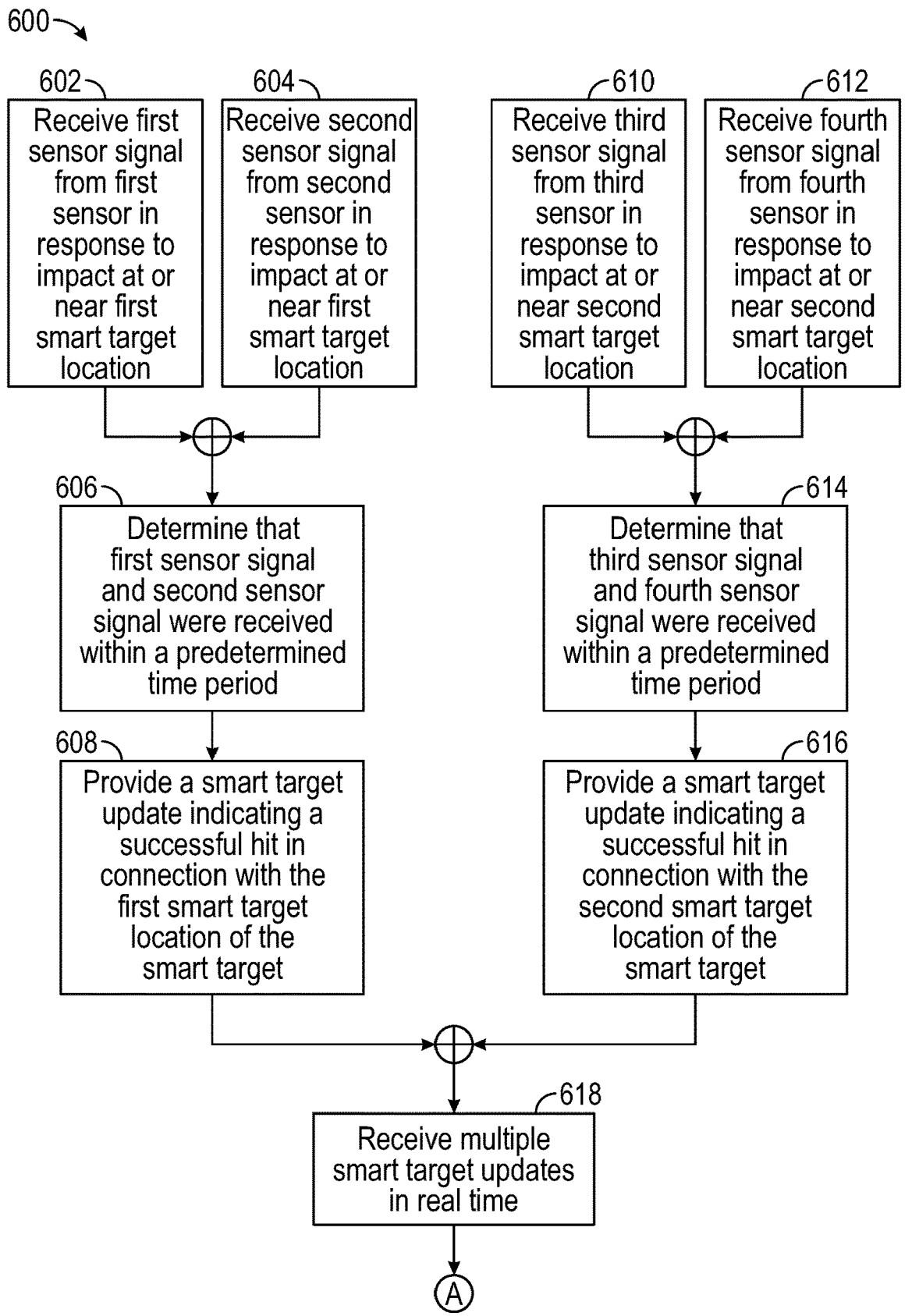
FIG. 22A is a first portion of a flow diagram of a smart target co-witnessing hit attribution method in accordance with a preferred embodiment of the present invention.
Figure 22B:
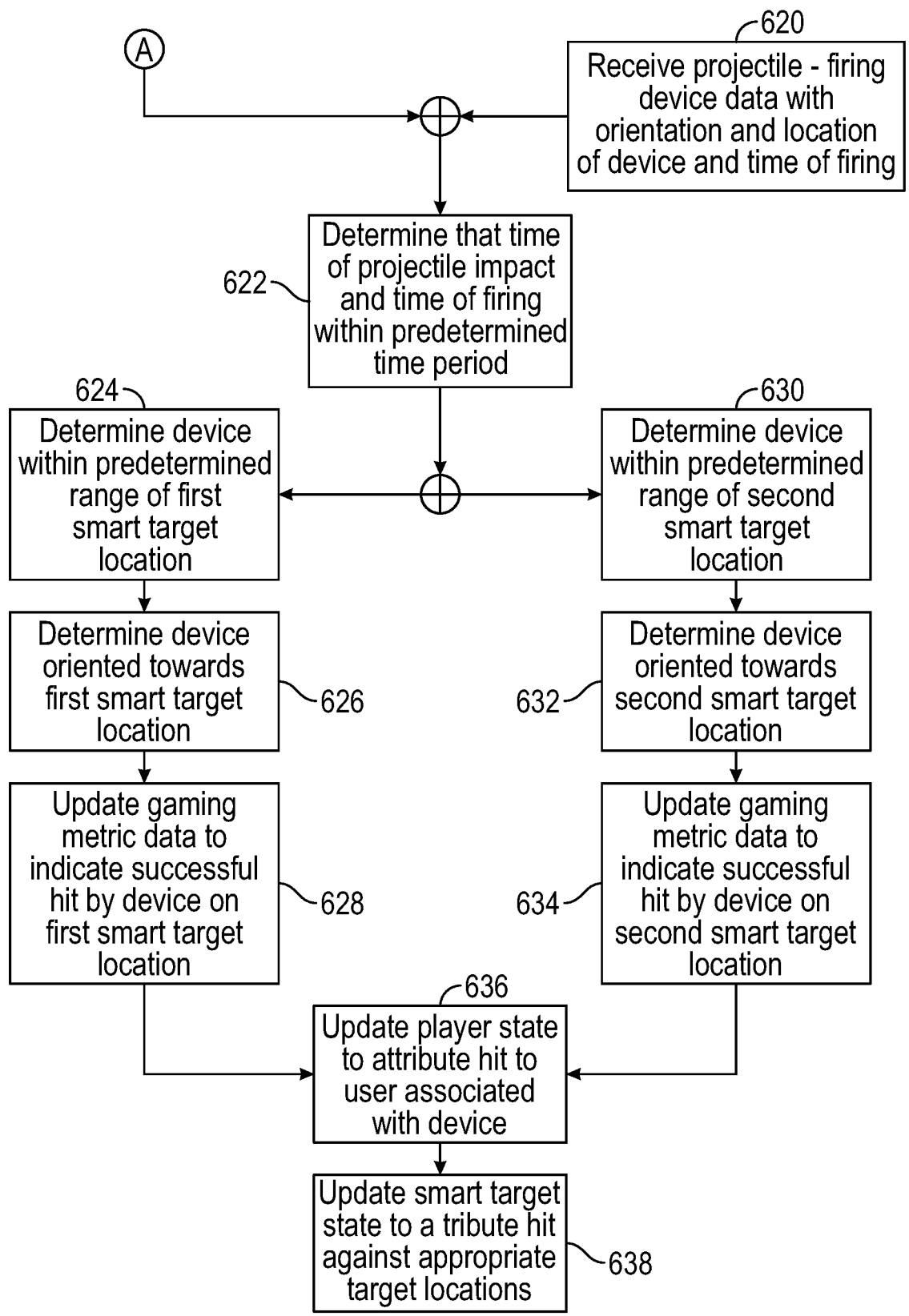
FIG. 22B is a second portion of a flow diagram of a smart target co-witnessing hit attribution method in accordance with a preferred embodiment of the present invention.

FIG. 22A, 22B is a flow diagram of a smart target co-witnessing hit attribution method 600 in accordance with a preferred embodiment of the present invention. At Step 602, a first sensor signal from a first sensor is received in response to an impact at or near a first smart target location. For example, the first sensor is the PE sensor 410. In other embodiments, the first sensor is an IR sensor 414, an EEG sensor 460 (or BCI sensor 458), a computer-vision sensor, a radio-frequency sensor, or a smart textile sensor. While the first sensor is specified to be a single sensor, other embodiments in which multiple PE sensors 410 or IR sensors 414 or combinations of the above-referenced sensors are provided. The first sensor signal is triggered to be transmitted to and received by control circuitry preferably integrated with the first sensor upon sensing an impact. As disclosed herein, a PE sensor 410 generates an electrical charge or signal that corresponds to the physical act that it sensed, and provides the signal for processing. The impact may be the impact of any object, including any type of projectile. In an embodiment, it is determined whether the impact occurs at or near a predetermined distance (e.g., an area) from a predetermined location (e.g., the first smart target location). The predetermined distance may be set such that impacts only on the first smart target location (e.g., a pistil portion 402 or petal portion 404) are provided to the control circuitry. In another embodiment, the predetermined distance may encompass a larger area than the first smart target location. In a case in which the first sensor senses an impact on a second smart target location, that data may be utilized to confirm impact on the second smart target location.

The control circuitry may be configured to determine that the first sensor signal corresponds to a successful impact. For example, the PE sensor 410 may be configured through circuitry (or otherwise) to provide only signals beyond a peak threshold to the control circuitry. In an embodiment, the control circuitry is integrated with a peak detector and threshold. Alternatively, the first sensor may simply provide all signals in response to an impact at or near the first smart target location. In this embodiment, other methods such as software or firmware manipulation or filtration may be provided to assure that the first sensor signal is an appropriate detection of a hit in association with the first smart target location. Still further, filtration techniques as described herein may be utilized to isolate and assist the control circuitry in determining that the impact was a projectile associated with the gameplay configuration and environment rather than another type of impact. For example, the projectile is a gellet.

The first smart target location preferably is a pistil portion 402 or petal portion 404. The PE sensor 410 alone, or in combination with control circuitry, may be configured to sense more than one smart target 400 location. For example, a single first sensor may be utilized to sense impacts of projectiles at two locations on the smart target 400. The first smart target location may also be a smart target 400 located on the wearable device 412.

At Step 604, a second sensor signal from a second sensor is received in response to an impact at or near the first smart target location. Step 604 is configured to co-witness the same impact event as that identified in connection with Step 602. As with Step 602, the second sensor may be any of a variety of sensors including a PE sensor 410, an IR sensor 414, an EEG sensor 460 (or BCI sensor 458), a computer-vision sensor, a radio-frequency sensor, or a smart textile sensor. Preferably, if the first sensor is a PE sensor 410 then the second sensor is an IR sensor 414, or another type of sensor as described above. However, in an embodiment the first and second sensors are both PE sensors 410.

As with Step 602, at Step 604, the second sensor signal is generated based in response to an impact at or near the first smart target location. If the second sensor signal is an IR sensor 414 signal, and the first sensor signal is a PE sensor 410 signal, then the IR sensor 414 may be configured to provide an IR signal should it receive radiation at a particular wavelength. For example, the wavelength is 940 nanometers. Other wavelengths are suitable for use as an IR sensor 414. The IR sensor 414 in an embodiment does not utilize infrared radiation, but rather, utilizes frequencies and wavelengths outside of the infrared band. One of ordinary skill in the art would understand that while certain wavelengths are theoretically possible, one should provide safe solutions that prevent dangerous situations for a user's eyes and other body parts sensitive to certain types of radiation.

At Step 606, the first sensor signal and the second sensor signal were determined to be received within a predetermined time period. In an embodiment, the first and second sensor signals are presumed to arrive almost instantly from their respective sensors. One of ordinary skill in the art would understand how to provide the first and second sensor signals to control circuitry, or the like, to ensure that the time between sensing the impact and the time the signals are received is the same or substantially the same between the sensors. The predetermined time period preferably is set to be sufficiently small (e.g., fractions of seconds/milliseconds) to ensure that the signals were generated at or about the same time. This is important to ensure that the first and second sensors co-witnessed the same impact at the same time. For example, if the first sensor and the second sensor are the same (e.g., two IR sensors 414), then the signals would typically be generated at around the same time. However, if the first sensor is the PE sensor 410 and the second sensor is the IR sensor 414, then the predetermined time period would necessarily be longer due to the time the projectile takes to impact a smart target 400. Preferably, a predetermined time period depends upon several factors including circuitry delay, the relative delays caused by the circuitry for different types of sensors, the time the projectile takes to impact a target, and the velocity of the device 416, all of which are within the scope of the present invention.

At Step 608, a smart target update is provided indicating a successful hit in connection with the first smart target location of the smart target 400. For example, the smart target update is configured to identify the target state of each smart target location of the smart target. Preferably, utilization of the target mesh networks and protocols described herein ensure sufficiently fast communication to ensure real-time or near-real-time updates to the smart target states.

At Step 610, a third sensor signal from a third sensor is received in response to an impact at or near a second smart target location. For example, the third sensor is the PE sensor 410. In other embodiments, the third sensor is an IR sensor 414, an EEG sensor 460 (or BCI sensor 458), a computer-vision sensor, a radio-frequency sensor, or a smart textile sensor. While the third sensor is specified to be a single sensor, other embodiments in which multiple PE sensors 410 or IR sensors 414 or combinations of the above-referenced sensors are provided. The third sensor signal is triggered to be transmitted to and received by control circuitry preferably integrated with the third sensor upon sensing an impact. As disclosed herein, a PE sensor 410 generates an electrical charge or signal that corresponds to the physical act that it sensed, and provides the signal for processing. The impact may be the impact of any object, including any type of projectile.

The control circuitry may be configured to determine that the third sensor signal corresponds to a successful impact of a projectile. For example, the PE sensor 410 may be configured through circuitry (or otherwise) to provide only signals beyond a peak threshold to the control circuitry. In an embodiment, the control circuitry is integrated with a peak detector and threshold. Alternatively, the third sensor may simply provide all signals in response to an impact at or near the second smart target location. In this embodiment, other methods such as software or firmware manipulation or filtration may be provided to assure that the third sensor signal is an appropriate detection of a hit in association with the second smart target location. Still further, filtration techniques as described herein may be utilized to isolate and assist the control circuitry in determining that the impact was a projectile associated with the gameplay configuration and environment rather than another type of impact. For example, the projectile is a gellet.

The second smart target location preferably is a pistil portion 402 or petal portion 404. The PE sensor 410 alone, or in combination with control circuitry, may be configured to sense more than one smart target 400 location. For example, a single third sensor may be utilized to sense impacts of projectiles at two locations on the smart target 400. The second smart target location may also be a smart target 400 located on the wearable device 412.

At Step 612, a fourth sensor signal from a fourth sensor is received in response to an impact at or near the second smart target location. Step 612 is configured to co-witness the same impact event as that identified in connection with Step 610. As with Step 610, the second sensor may be any of a variety of sensors including a PE sensor 410, an IR sensor 414, an EEG sensor 460 (or BCI sensor 458), a computer-vision sensor, a radio-frequency sensor, or a smart textile sensor. Preferably, if the third sensor is a PE sensor 410 then the fourth sensor is an IR sensor 414, or another type of sensor as described above. However, in an embodiment the third and fourth sensors are both PE sensors 410.

As with Step 610, at Step 612, the fourth sensor signal is generated based in response to an impact at or near the second smart target location. If the fourth sensor signal is an IR sensor 414 signal, and the third sensor signal is a PE sensor 410 signal, then the IR sensor 414 may be configured to provide an IR signal should it receive radiation at a particular wavelength. For example, the wavelength is 940 nanometers. Other wavelengths are suitable for use as an IR sensor 414. The IR sensor 414 in an embodiment does not utilize infrared radiation, but rather, utilizes frequencies and wavelengths outside of the infrared band. One of ordinary skill in the art would understand that while certain wavelengths are theoretically possible, one should provide safe solutions that prevent dangerous situations for a user's eyes and other body parts sensitive to certain types of radiation.

The second smart target location is preferably distinct from the first smart target location, but located on the same smart target 400. However, in other embodiments, the first and second smart target locations are located on different smart targets 400. The first through fourth sensors and control circuitry are preferably configured such that a single impact at or near both the first and second smart target locations will generate signals in which either the first and second sensor signals confirm an impact or the third and fourth sensors confirm an impact, but not both. Stated otherwise, the sensors should be sophisticated enough so that impacts of projectiles on first and second smart target locations may be distinguished.

At Step 614, the third sensor signal and the fourth sensor signal were determined to be received within a predetermined time period. In an embodiment, the third and fourth sensor signals are presumed to arrive almost instantly from their respective third and fourth sensors. One of ordinary skill in the art would understand how to provide the third and fourth sensor signals to control circuitry, or the like, to ensure that the time between sensing the impact and the time the signals are received is the same between the sensors. The predetermined time period preferably is sufficiently small (e.g., fractions of seconds/milliseconds) to ensure that the signals were generated at or about the same time. This is important to ensure that the third and fourth sensors co-witnessed the same impact at the same time. For example, if the third sensor and the forth sensor are the same (e.g., two IR sensors 414), then the signals would typically be generated at around the same time. However, if the third sensor is the PE sensor 410 and the fourth sensor is the IR sensor 414, then the predetermined time period would necessarily be longer due to the time the projectile takes to impact a smart target 400. Preferably, a predetermined time period depends upon several factors including circuitry delay, the relative delays caused by the circuitry for different types of sensors, the time the projectile takes to impact a target, and the velocity of the device 416, all of which are within the scope of the present invention.

At Step 616, a smart target update is provided indicating a successful hit in connection with the second smart target location of the smart target 400. For example, the smart target update is configured to identify the target state of each smart target location of the smart target. Preferably, utilization of the target mesh networks and protocols described herein ensure sufficiently fast communication to ensure real-time or near-real-time updates to the smart target states.

At Step 618, multiple smart target updates are received in real-time or near-real-time. In an embodiment, the smart target updates are provided in Steps 608 and 616 by control circuitry in connection with a wireless network in accordance with one or more protocols. For example, the target mesh networks disclosed herein and the protocols identified as communicating via hexadecimal values may be utilized to provide or transmit the smart target updates. Preferably, the smart target updates are target state updates in accordance with the protocols disclosed in FIGS. 18-21B. The smart target updates are configured to be received by an extended-reality gaming application. The extended-reality gaming application is, for example, the application 464.

FIG. 22B is a second portion of a flow diagram of a smart target co-witnessing hit attribution method 600 in accordance with a preferred embodiment of the present invention. FIG. 22B shows the continuation of FIG. 22A, indicating "A" from Step 218. At Step 620, projectile-firing device data is received, the data including orientation and location of the device 416, and the time of firing of the device 416. In an embodiment, the device 416 includes a smart target 400. The device 416 preferably includes an IR emitter 418 that emits IR radiation in a beam 420. The IR emitter 418 module or other components in the device 416 may supply the orientation and location of the device 416.

At Step 622, the time of projectile impact and the time of firing the device 416 is determined to be within a predetermined time period. Depending on the speed of the network, it is possible to determine at Step 622 whether the particular smart target update and the projectile-firing device data were received within a predetermined time period, particularly where a target mesh network is utilized in connection with the protocols of FIGS. 18-22B. In other embodiments, a time stamp may be provided along with the first through fourth sensor signals, or a time stamp may be generated by control circuitry and packetized along with the smart target updates. Still further, in other embodiments, a sensor and network latency may be calculated and predetermined such that receipt of the smart target update and the projectile-firing device data include a predetermined time delay from which it is determined whether the time of projectile impact and the time of firing occurred within the predetermined time period. The predetermined time period preferably is sufficiently small (e.g., fractions of seconds/milliseconds) to ensure that the co-witnessing of the impact and the attribution of the hit to the particular device 416 should be correlated. It may be advantageous to determine the predetermined time period based on a relatively immediate time window between emission of IR radiation from the IR emitter 418 and detection by the IR sensor 414. In other embodiments, it may also be advantageous to calculate an expected time a projectile will travel over the distance from the device 416 to the smart target 400 and determine the predetermined time period based on the time window between firing of the projectile and the detection of an impact of an object by the PE sensor 410. For example, with a known distance to the target (e.g., 25 feet) and a known velocity (e.g., 170 FPS), the time to target for the projectile is approximately 147 milliseconds. The predetermined period of time therefore can be set to 147 milliseconds or greater to provide a margin of error (e.g., 150 ms or 160 ms). A timer can be set to expire at the predetermined period of time and a successful hit attributed both to the device 416 and the portion of the smart target 400 hit by the projectile if the time of impact is within the predetermined period of time. One of ordinary skill in the art would understand that a variety of methodologies to determine the predetermined time period are within the scope of the present invention.

A variety of methods are within the scope of the present invention to determine shooter identity. In an embodiment, impact detection by the PE sensor 410 is turned off, or in "sleep mode," and the portion of the smart target 400 in question is set to only actively detect IR radiation. When the IR radiation is received, a timer is started on the processor associated with the smart target 400 circuitry and the impact detection is activated. The timer is permitted to run for a predetermined period of time, usually less than a few seconds, with the most optimal time determined by the physical distance between the device 416 and the PE sensor 410. If the timer runs over the limit set in the code, the impact detection is turned off and the IR message received can be counted as a "miss." If the PE sensor 410 detects an impact of a projectile, then the IR message is correlated with the PE sensor 410 detection and counted as a successful "hit."

In another embodiment, to time the IR message reception with the impact detection, one or more separate sensors are provided to accurately measure distance in real-time or near-real-time. For example, a LIDAR sensor or laser-based sensor capable of measuring distances of up to 50 feet (e.g., a device 416 effective range) is provided. This distance measurement can be used by itself, or in combination with an integrated photogate-based chronograph integrated into the device 416. In a preferred embodiment, the barrel 129 is molded and/or integrated in an infrared wavelength-invisible material with two pairs of an infrared LED pointed across the barrel facing a phototransistor sensitive to that wavelength. These two pairs of sensors will trigger once a projectile passes through them, and a timer is started when the first photogate sensor is triggered, and stopped when the second photogate sensor is triggered. This permits individual projectile muzzle velocity measurement, which can calculate the trajectory characteristics, such as horizontal velocity, which together with the distance measurement, can produce an estimation for the time that the Gellet is in flight. This estimation can be used to fine tune the IR detection vs impact detection time window (e.g. predetermined time period).

In another embodiment, in order to identify individual shooters aiming at the same target, a variety of these techniques can be applied. In one embodiment, a hard-coded time threshold can serve as the limiting factor in identifying which shooter achieved the first impact, where two shooters positioned at different distances from the target will have their projectiles arrive at different times, with one arriving after the target's threshold expires, thus not being counted.

In yet another embodiment, if both (or more) shooters are aiming from the same distance at the same target, the target mesh network can relay notices of multiple IR messages (e.g., IR sensor 414 detections) from different devices 416 being received at the same location on the smart target 400 back to the same devices 416 and any other "referee" devices in the target mesh network. A central processor handling hit attribution would then digitally stagger the projectile fire from these devices 416, to give the timing algorithm additional gaps between shots and IR messages across the devices 416, thus increasing shooter identification accuracy.

In another preferred embodiment, the devices 416 can be outfitted with location-tracking sensors such as ultra-wideband (UWB) or Bluetooth Low Energy (BLE) that can selectively turn on or off the IR sensors physically positioned around the smart target 400 or wearable device 412, correlating the localization sensor data with the IR sensor directional data, further increasing accuracy in detecting the correct shooter.

At Step 624, the device 416 is determined to be within a predetermined range of the first smart target location. Given that the projectile-firing device data includes the location of the device 416, a calculation of distance between the device 416 and the first smart target location can be made. The location may be fixed in an arena environment or may be dynamic where the location is on a wearable device 412. The target mesh network may be utilized to provide triangulation between different nodes 454 so that a location may be determined relative to other nodes within the network. Alternative methodologies of location services may be utilized, such as GPS tracking or the like. The predetermined range may be preset based on the battlefield environment and gaming characteristics. For example, the predetermined range may be 50 feet, 40 feet, 25 feet, 10 feet, or other ranges depending upon the range of the device 416 and the distances of the smart targets 400. The predetermined range may also be determined based on a calculation of time between a time the device 416 is shot and a time the smart target 400 (or a location on the smart target 400) is impacted by a projectile. Using a known device 416 velocity (e.g., 90 FPS), a calculation of the distance to the target may be determined. Once the distance is known, a predetermined range may be the distance plus an additional amount of range (e.g., as a margin of error). Other methodologies to determine distance (and therefore, predetermined range) are disclosed herein, such as using a LIDAR sensor. One of ordinary skill in the art would understand that a variety of methodologies to predetermine the range are within the scope of the present invention.

At Step 626, the device 416 is determined to be oriented towards the first smart target location. Using the orientation information from the projectile-firing device data, and the relative location of the first smart target location, the application 464 determines if a vector based on the orientation of the device 416 is aligned with a predetermined area of the first smart target location. For example, IR detection of the device 416 IR emitter 418 may occur at the first smart target location if the smart target 400 includes an IR sensor 414. In that case, the IR emitter 418 emits radiation in a beam 420 that spreads over distance, as more fully described herein. Thus, if the beam 420 is detected by the IR sensor 414 of the smart target 400 at the first smart target location, then a match between the particular device 416 and the first smart target location of the smart target 400 is achieved. The predetermined area may be 2 feet, as the typical range of an IR emitter 418 is 50 feet and the optics allow a spread of about 2 degrees, which preferably provides a beam spread of 2 feet at a distance of 50 ft. The predetermined area may also be larger or smaller depending on the beam spread of the IR emitter 418. For example, a wider beam spread would typically mean a larger predetermined area while a narrower beam spread would typically mean a smaller predetermined area.

At Step 628, gaming metric data is updated to indicate a successful hit by the device 416 on the first smart target location of the smart target 400. The updated gaming metric data preferably is configured to be updated and usable by the application 464. Steps 630, 632, and 634 are substantively similar to Steps 624, 626, and 628, except that instead of the first smart target location a second smart target location is an object of the determinations. It should be understood that the same device 416 may be utilized to hit both the first smart target location and the second smart target location. However, preferably the same projectile may not be determined to hit both the first and second smart target locations simultaneously. If different projectiles hit the first and second smart target locations, respectively, then those impacts will have occurred at slightly different times, thereby matching the correct projectile impact with the correct smart target location. One of skill in the art would understand that only Step 622 may be utilized to match projectile impacts with a particular smart target location. However, when Step 622 is utilized also with Steps 624, 626, 628 or Steps 630, 632, 634, then higher accuracy may be accomplished. One of ordinary skill in the art would also understand that a variety of other sensors (e.g., three or more) may be provided to achieve higher accuracy. It is also the case that certain sensors may be better suited for particular ranges, gaming configurations, or devices. For example, it may be advantageous to use the BCI sensor 458 only at certain ranges to ensure that sufficient impacts occur on the user's 116, 118 body. In addition, at low-impact gaming configurations in which the barrel tip 131 is in a reduced velocity mode, it may be advantageous to utilize sensor types other than the BCI sensor 458. In addition, it may be advantageous to co-witness a first impact with an IR sensor 414, since certain gaming modes may automatically turn off the ability to fire a projectile at a distance closer than 5 feet from any users 116, 118, for example.

At Step 636, a player state is updated to attribute the hit to a user associated with the device 416. The application 464 is configured to update the gaming metric data and display the data to a user (and on particular smart targets 400). For example, the hit may increment a hit count by 1 unit; in other embodiments, as described herein, the hit may count for a particular amount of hit points. The application 464 is configured to take the angle of impact and range into account, as well as the gaming configuration and "ammo" type used, to calculated and attribute a certain amount of hit points to the user.

At Step 638, a smart target state is updated to attribute the hit against an appropriate target location of the smart target 400. The application 464 is configured to update the gaming metric data and display the data to a user (and on particular smart targets 400). For example, the hit may increment a hit count against the first and/or second smart target locations associated with a smart target 400. As above with Step 636, in Step 638, application 464 is configured to take the angle of impact and range into account, as well as the gaming configuration and "ammo" type used, to calculated and attribute a certain amount of hit points against a particular location on a target. As described herein, the locations may be pistil portions 402, petal portions 404, or standalone smart targets 400 affixed to the wearable device 412. Other embodiments with smart targets 400 affixed or located on other battlefield objects are within the scope of the present invention.

In addition to the foregoing, an IR sensor 414 is configured to provide an IR signal that represents a particular angle of detection and an intensity of the infrared radiation. Based on the angle of detection and the intensity of the infrared radiation, the method 600 may further determine whether the device 416 is within a predetermined margin of error with respect to the location of the first smart target location and the orientation of the device 416. Stated otherwise, the IR sensor 414 may provide the pertinent information correlating the first smart target location and the device 416 to increase the accuracy of the hit attribution between a user and a smart target 400. In addition, it may be possible to eliminate a need to obtain orientation and location information from the device 416 each time it is fired, so long as the angle of detection and intensity information is sufficient to gauge the orientation and location of the device 416 relative to the first smart target location.

In a preferred embodiment of the present invention, functionality is implemented as software executing on a server that is in connection, via a network, with other portions of the system, including databases and external services. The server comprises a computer device capable of receiving input commands, processing data, and outputting the results for the user. Preferably, the server consists of RAM (memory), hard disk, network, central processing unit (CPU). It will be understood and appreciated by those of skill in the art that the server could be replaced with, or augmented by, any number of other computer device types or processing units, including but not limited to a desktop computer, laptop computer, mobile or tablet device, or the like. Similarly, the hard disk could be replaced with any number of computer storage devices, including flash drives, removable media storage devices (CDs, DVDs, etc.), or the like.

The network can consist of any network type, including but not limited to a local area network (LAN), wide area network (WAN), and/or the internet. The server can consist of any computing device or combination thereof, including but not limited to the computing devices described herein, such as a desktop computer, laptop computer, mobile or tablet device, as well as storage devices that may be connected to the network, such as hard drives, flash drives, removable media storage devices, or the like.

The storage devices (e.g., hard disk, another server, a NAS, or other devices known to persons of ordinary skill in the art), are intended to be nonvolatile, computer readable storage media to provide storage of computer-executable instructions, data structures, program modules, and other data for the mobile app, which are executed by CPU/processor (or the corresponding processor of such other components). The various components of the present invention, are stored or recorded on a hard disk or other like storage devices described above, which may be accessed and utilized by a web browser, mobile app, the server (over the network), or any of the peripheral devices described herein. One or more of the modules or steps of the present invention also may be stored or recorded on the server, and transmitted over the network, to be accessed and utilized by a web browser, a mobile app, or any other computing device that may be connected to one or more of the web browser, mobile app, the network, and/or the server.

References to a "database" or to "database table" are intended to encompass any system for storing data and any data structures therein, including relational database management systems and any tables therein, non-relational database management systems, document-oriented databases, NoSQL databases, or any other system for storing data.

Software and web or internet implementations of the present invention could be accomplished with standard programming techniques with logic to accomplish the various steps of the present invention described herein. It should also be noted that the terms "component," "module," or "step," as may be used herein, are intended to encompass implementations using one or more lines of software code, macro instructions, hardware implementations, and/or equipment for receiving manual inputs, as will be well understood and appreciated by those of ordinary skill in the art. Such software code, modules, or elements may be implemented with any programming or scripting language such as C, C++, C#, Java, Cobol, assembler, PERL, Python, PHP, or the like, or macros using Excel or other similar or related applications with various algorithms being implemented with any combination of data structures, objects, processes, routines or other programming elements.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

Although the operations of any method(s) disclosed or described herein either explicitly or implicitly are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A smart target comprising:
a housing for receiving at least two sensors configured to co-witness an impact of an object at or near a predetermined distance from a predetermined location,
a first sensor of the at least two sensors configured to detect a physical impact of an object at or near a predetermined distance from a predetermined location and generate a first sensor signal corresponding to the detected impact, wherein the first sensor is a piezoelectric sensor,
a second sensor of the at least two sensors configured to receive information relating to the detected impact and generate a second sensor signal corresponding to the detected impact, wherein the second sensor comprises an infrared sensor, an electroencephalogram sensor, a computer-vision sensor, a radio frequency sensor, or a LIDAR sensor, and
control circuitry configured to receive the first sensor signal and the second sensor signal, confirm whether the first sensor and the second sensor signals have co-witnessed the same impact of the object by determining whether they were received within a predetermined period of time, and provide a target state update via a network in accordance with at least one protocol.

2. The smart target of claim 1 wherein the control circuitry is further configured to confirm, from the first sensor signal, whether the object comprises a projectile based on a trained model configured to recognize impacts of projectiles, and generate projectile impact data when the object is confirmed to be a projectile, wherein the target state update includes the projectile impact data.

3. The smart target of claim 1 wherein the second sensor signal comprises one of an infrared signal from the infrared sensor, a brain-computer interface signal from the electroencephalogram sensor, a computer-vision signal from the computer-vision system, a radio-frequency signal from the radio frequency sensor, or a LIDAR signal from the LIDAR sensor.

4. A smart target comprising:
a first target location,
a first piezoelectric sensor configured to detect an impact of an object on or within a predetermined distance from the first target location and generate a first piezoelectric sensor signal corresponding to the detected impact,
a first infrared sensor configured to detect infrared radiation at a predetermined wavelength and generate a first infrared sensor signal,
control circuitry configured to confirm a successful projectile impact on the first target location when the object is determined to be a projectile by comparing the first piezoelectric sensor signal with a piezoelectric impact signal model trained to detect impact of the projectile and when an impact time of the object and a detection time of the infrared radiation each occurred within a first predetermined period of time, generate first target location state data indicating that the first target location was successfully impacted by the projectile, and transmit the first target location state data via a network in accordance with at least one protocol.

5. The smart target of claim 4 wherein the first piezoelectric sensor signal is filtered before it is compared with the piezoelectric impact signal model.

6. The smart target of claim 4 wherein the first infrared sensor signal comprises an angle of detection and an intensity of infrared radiation.

7. The smart target of claim 4 wherein the first piezoelectric sensor is further configured to detect the impact of the object on or within a predetermined distance from a second target location.

8. The smart target of claim 4 further comprising
a second target location,
a second piezoelectric sensor configured to detect an impact of an object on or within a predetermined distance from the second target location and generate a second piezoelectric sensor signal corresponding to the detected impact, and
a second infrared sensor configured to detect infrared radiation at a predetermined wavelength and generate a second infrared sensor signal.

9. The smart target of claim 8 wherein the control circuitry is further configured to confirm a successful projectile impact on the second target location when the object is determined to be a projectile by comparing the second piezoelectric sensor signal with the piezoelectric impact signal model trained to detect impact of the projectile and when an impact time of the object and a detection time of the infrared radiation each occurred within the first predetermined period of time, generate second target location state data indicating that the second target location was successfully impacted by the projectile, and transmit the second target location state data via a network in accordance with at least one protocol.

10. The smart target of claim 4 further comprising a frame configured to receive the first target location.

11. The smart target of claim 4 wherein the first target location is located on a wearable device.

12. The smart target of claim 4 wherein the first target location state data is configured to be received by an extended-reality gaming application configured to
control a projectile-firing device and the smart target in accordance with a gaming session having a gameplay configuration for providing an extended-reality environment,
receive projectile-firing device data from the projectile-firing device, the projectile-firing device data comprising a time at which the projectile-firing device was fired,
update gaming metric data to indicate a successful impact of the fired projectile on the first target location and attribute a successful hit to the projectile-firing device on the first target location when the time the impact occurred on the first target location and the time the projectile-firing device was fired occur within a second predetermined period of time.

13. The smart target of claim 12 wherein the projectile-firing device data further comprises a location of the projectile-firing device, and wherein the gaming metric data is updated to indicate the successful impact of the fired projectile on the first target location and the successful hit is attributed to the projectile-firing device on the first target location when the location of the projectile-firing device is within a predetermined range from the first target location.

14. The smart target of claim 12 wherein the updated gaming metric data is configured to be displayed to a user.

15. The smart target of claim 12 wherein the projectile-firing device data further comprises an orientation of the projectile-firing device, and wherein the gaming metric data is updated to indicate the successful impact of the fired projectile on the first target location and the successful hit is attributed to the projectile-firing device on the first target location when the orientation of the projectile-firing device is aligned at a predetermined area associated with the first target location.

16. A smart target co-witnessing hit attribution system comprising:
a network configured to provide communication and control connectivity in accordance with at least one protocol,
a projectile-firing device comprising a projectile repository and an infrared emitter configured to emit infrared radiation at a predetermined wavelength and beamwidth,
a smart target comprising
a piezoelectric sensor configured to detect an impact of an object at or near a predetermined distance from a predetermined location relative to the smart target and generate a piezoelectric sensor signal corresponding to the detected impact,
an infrared sensor configured to detect infrared radiation at a predetermined wavelength and generate an infrared sensor signal,
control circuitry configured to confirm a successful projectile impact on the smart target when the object is determined to be a projectile by comparing the piezoelectric signal with a predetermined piezoelectric impact signal model trained to detect impact of the projectile and the impact of the object and the detection of the infrared radiation occurred within a first predetermined period of time, generate target state data comprising the successful projectile impact, and provide the target state data via the network,
an extended-reality gaming application configured to
control the projectile-firing device and the wearable device in accordance with a gaming session having a gameplay configuration for providing an extended-reality environment,
receive projectile-firing device data from the projectile-firing device, the projectile-firing device data comprising a time at which the projectile-firing device was fired,
receive the target state data from the smart target, the target state data comprising a time the smart target was impacted by the projectile,
update gaming metric data to indicate a successful impact of the fired projectile on the smart target and attribute a successful hit to the projectile-firing device on the smart target when the time the impact occurred on the smart target and the time the projectile-firing device was fired occur within a second predetermined period of time.

17. The smart target co-witnessing hit attribution system of claim 16 wherein the gaming metric data is updated to indicate the successful impact of the fired projectile on the smart target and the successful hit is attributed to the projectile-firing device on the smart target when a location of the projectile-firing device is within a predetermined range from the smart target.

18. The smart target co-witnessing hit attribution system of claim 16 wherein the network is a target mesh network configured to transmit messages including the target state data to the extended-reality gaming application.

19. The smart target co-witnessing hit attribution system of claim 16 wherein the at least one protocol is configured to effectuate transmission and reception of data to nodes within the network using hexadecimal values.

20. The smart target co-witnessing hit attribution system of claim 19 wherein the hexadecimal values specify data concerning a status of the target.

21. The smart target co-witnessing hit attribution system of claim 19 wherein the hexadecimal values specify data concerning a status of a user.

22. The smart target co-witnessing hit attribution system of claim 16 wherein the gaming metric data is updated to indicate the successful impact of the fired projectile on the smart target and the successful hit is attributed to the projectile-firing device on the smart target when an orientation of the projectile-firing device is aligned at a predetermined area associated with the smart target.

23. A smart target co-witnessing hit attribution method, the method comprising the steps of:
receiving a first sensor signal corresponding to detection of an impact of an object at or near a predetermined distance from a predetermined location relative to a first smart target location,
receiving a second sensor signal relating to the detected impact;
determining that the first sensor signal and the second sensor signal were received within a first predetermined period of time,
providing a target state update via a network in accordance with at least one protocol,
receiving the target state update,
receiving projectile-firing device data from a projectile-firing device, the projectile-firing device data comprising an orientation and location of the projectile-firing device and a time at which the projectile-firing device was fired,
updating gaming metric data to indicate a successful impact of the fired projectile on the first smart target location and attribute a successful hit to the projectile-firing device on the first smart target location when the time the impact occurred on or near the first smart target location and the time the projectile-firing device was fired occur within a second predetermined period of time.

24. The method of claim 23 further comprising
determining, from the first sensor signal, that the object comprises a projectile based on a trained model configured to recognize impacts of projectiles, and
generating projectile impact data, wherein the target state update includes the projectile impact data.

25. The method of claim 23 wherein the second sensor signal comprises one of an infrared sensor signal, a brain-computer interface sensor signal, a computer-vision sensor signal, a radio-frequency sensor signal, or a fabric-deformation sensor signal.

26. The method of claim 23 wherein the network is a target mesh network configured to transmit messages including the target state update.

27. The method of claim 23 wherein the at least one protocol is configured to effectuate transmission and reception of data to nodes within the network using hexadecimal values.

28. The method of claim 27 wherein the hexadecimal values specify data concerning a status of the target.

29. The method of claim 27 wherein the hexadecimal values specify data concerning a status of a user.

30. The method of claim 23 wherein the gaming metric data is updated to indicate the successful impact of the fired projectile on the first smart target location and the successful hit is attributed to the projectile-firing device on the first smart target location when the orientation of the projectile-firing device is aligned at a predetermined area associated with the first smart target location.

31. The method of claim 23 wherein the gaming metric data is updated to indicate the successful impact of the fired projectile on the first smart target location and the successful hit is attributed to the projectile-firing device on the first smart target location when the location of the projectile-firing device is within a predetermined range from the smart target.

32. A smart target comprising:
a housing for receiving at least two sensors configured to co-witness an impact of an object at or near a predetermined distance from a predetermined location,
a first sensor of the at least two sensors configured to detect a physical impact of an object at or near a predetermined distance from a predetermined location and generate a first sensor signal corresponding to the detected impact,
a second sensor of the at least two sensors configured to receive information relating to the detected impact and generate a second sensor signal corresponding to the detected impact, wherein the second sensor comprises an electroencephalogram sensor, a computer-vision sensor, or a LIDAR sensor, wherein the second sensor is of a different type than the first sensor, and
control circuitry configured to receive the first sensor signal and the second sensor signal, confirm whether the first sensor and the second sensor signals have co-witnessed the same impact of the object by determining whether they were received within a predetermined period of time, and provide a target state update via a network in accordance with at least one protocol.

* * * * *